US006940512B2

(12) United States Patent
Yamaguchi et al.

(10) Patent No.: US 6,940,512 B2
(45) Date of Patent: Sep. 6, 2005

(54) IMAGE PROCESSING APPARATUS AND METHOD OF SAME

(75) Inventors: Yuji Yamaguchi, Tokyo (JP); Jin Satoh, Tokyo (JP); Masahiro Igarashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 300 days.

(21) Appl. No.: 10/441,546

(22) Filed: May 20, 2003

(65) Prior Publication Data

US 2004/0075661 A1 Apr. 22, 2004

(30) Foreign Application Priority Data

May 22, 2002 (JP) ....................................... 2002-148419

(51) Int. Cl.[7] ................................................ G06F 15/80
(52) U.S. Cl. ....................................... 345/505; 345/506
(58) Field of Search ................................ 345/501–506, 345/561–564, 582, 589, 591, 559, 418, 530, 536–538, 557, 552, 572; 709/201, 253, 238–242; 710/305, 317

(56) References Cited

U.S. PATENT DOCUMENTS 5,046,027 A * 9/1991 Taaffe et al. ................ 345/557
5,956,744 A * 9/1999 Robertson et al. .......... 711/122
2003/0059110 A1 * 3/2003 Wilt ........................... 382/168

* cited by examiner

*Primary Examiner*—Kee M. Tung
(74) *Attorney, Agent, or Firm*—Frommer Lawrence & Haug LLP; William S. Frommer

(57) ABSTRACT

An image processing apparatus able to efficiently utilize a large amount of operation processing elements, having a high degree of freedom of algorithms, and having a high flexibility, provided with a rasterizer for generating pixel data or addresses; a graphics unit for generating graphics data based on texture coordinates; a pixel operation processor for performing operations based on the graphics data and performing image processing with respect to the image data in accordance with source addresses at the time of image processing; a pixel engine for performing operations with respect to the operation data of the pixel operation processor set in a register based on the color data; and a write unit for performing processing required for pixel writing based on window coordinates and the operation data of the pixel engine set in the register at the time of graphics processing and writing the processing results into a memory according to need and writing the operation data of the pixel operation processor set in the register at a destination address of the memory at the time of image processing, and a method of the same.

79 Claims, 30 Drawing Sheets

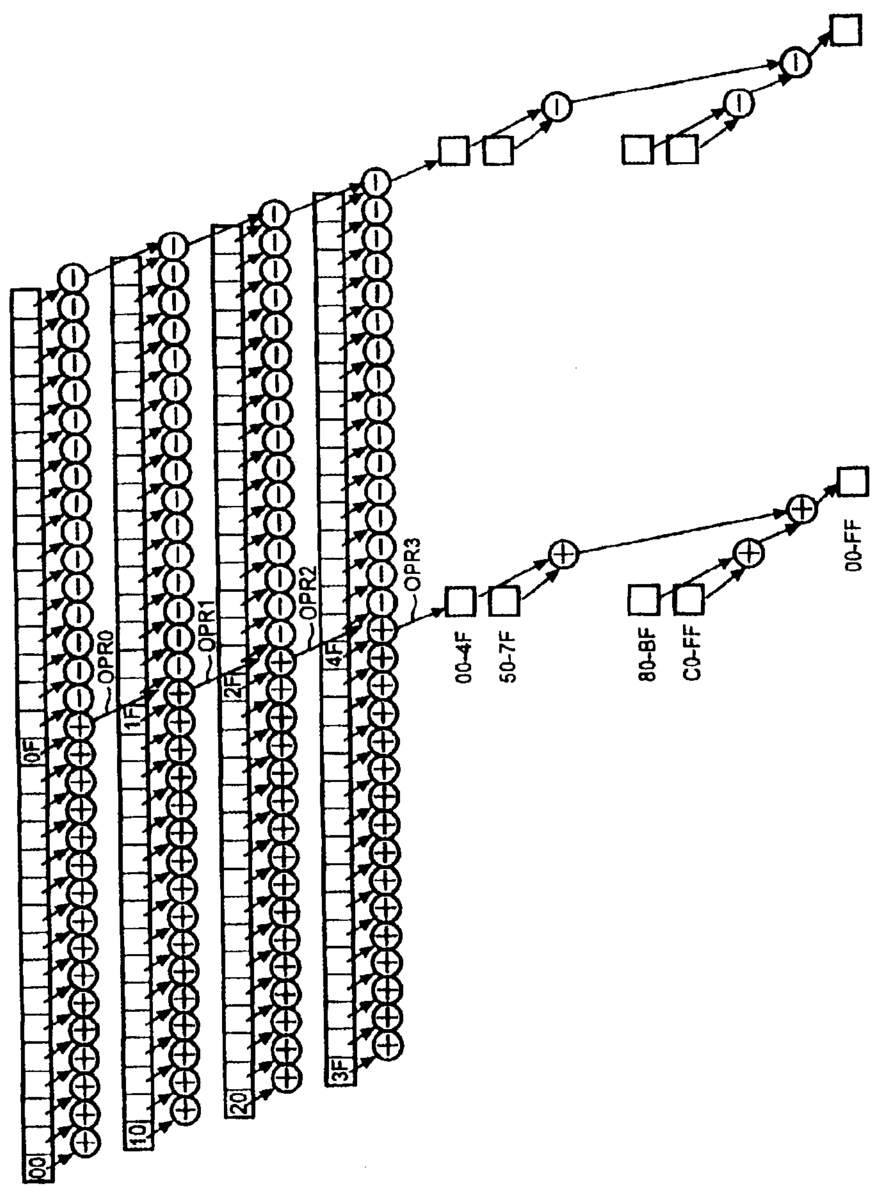
FIG. 19A POPE0 IN
FIG. 19B POPE0 ALU
FIG. 19C POPE1 IN
FIG. 19D POPE1 ALU
FIG. 19E POPE2 IN
FIG. 19F POPE2 ALU
FIG. 19G POPE3 IN
FIG. 19H POPE3 ALU
FIG. 19I POP0 OUT
FIG. 19J POP1 OUT
FIG. 19K PXE ALU0
FIG. 19L POP2 OUT
FIG. 19M POP3 OUT
FIG. 19N PXE ALU1
FIG. 19O PXE ALU2
FIG. 19P PXE OUT

IMAGE PROCESSING APPARATUS AND METHOD OF SAME

BACKGROUND OF THE INVENTION

1. Field of the Invention

The present invention relates to an image processing apparatus having a graphic processing function and an image processing function and sharing a plurality of strings of processing data for parallel processing and a method of the same.

2. Description of the Related Art

Along with the improvement of operating speeds and strengthening of drawing functions in recent computer systems, computer graphics (CG) technology for preparing and processing graphics and images using computer resources is being actively researched and developed and put into practical use.

For example, in three-dimensional graphics, the optical phenomenon where a three-dimensional object is illuminated by a predetermined light source is expressed by a mathematical model and the surface of the object is given shading or brightness or further given a texture based on this model so as to generate a more realistic, three-dimensional-like two-dimensional high definition image.

Such computer graphics is now being increasingly actively used in CAD/CAM and other fields of application in science, engineering, manufacturing, etc.

Three-dimensional graphics is generally comprised by a "geometry sub-system" positioned as the front end and a "raster sub-system" positioned as the back end.

The geometry sub-system is a step of geometric processing of the position, posture, etc. of a three-dimensional object displayed on a display screen. In the geometry sub-system, an object is generally treated as an aggregate of a large number of polygons. Geometric processings such as "coordinate conversion", "clipping", and "light source computation" are carried out in units of polygons.

On the other hand, the raster sub-system is a step of painting each pixel composing the object. Rasterization is realized by for example interpolating image parameters of all pixels included inside a polygon based on the image parameters found for every vertex of the polygon. The image parameters referred to here include color (drawing color) data expressed by the so-called RGB format or the like, a z-value expressing a distance in a depth direction, and so on. Further, in recent high definition three-dimensional graphics processing, "f" (fog) for giving a perspective feeling, a texture for expressing the feeling of a material or texture of the object surface to impart reality, etc. are included as image parameters.

Here, the processing for generating the pixels inside a polygon from the vertex information of the polygon is executed by using a linear interpolation technique frequently referred to as a "digital differential analyzer" (DDA). In the DDA process, the inclination of data to a side direction of the polygon is found from the vertex information, the data on the side is calculated by using this inclination, then the inclination of a raster scan direction (X-direction) is calculated. The change of the parameter found from this inclination is added to the parameter value of a start point of the scan so as to generate an internal pixel.

In order to improve performance of the graphics LSI, it is effective to not only raise the operation frequency of the LSI, but also to utilize the technique of parallel processing. The technique of parallel processing may be roughly classified as follows. First is a parallel processing method by area division, second is a parallel processing method at a primitive level, and third is a parallel processing method at a pixel level.

The above classification is based on a particle size of the parallel processing. The particle size of the area division parallel processing is the roughest, and the particle size of the pixel level parallel processing is the finest. Summaries of the techniques will be given below.

Parallel Processing by Area Division

This is a technique for dividing a screen to a plurality of rectangular areas and performing the parallel processing while assigning areas which individual plurality of processing units are to take charge of.

Parallel Processing at Primitive Level

This is a technique for imparting different primitives (for example triangles) to the plurality of processing units and making them to perform parallel operation.

Parallel Processing at Pixel Level

This is a technique of parallel processing with the finest particle size. FIG. 1 is a view conceptually showing parallel processing at the primitive level based on the technique of parallel processing at the pixel level. As in FIG. 1, in the technique of parallel processing at the pixel level, when rasterizing a triangle, pixels are generated in units of rectangular areas referred to as pixel stamps PS each comprised by pixels arrayed in a 2×8 matrix. In the example of FIG. 1, eight pixel stamps in total from pixel stamp PS0 to pixel stamp PS7 are generated. Sixteen pixels at the maximum included in these pixel stamps PS0 to PS7 are simultaneously processed. This technique is more efficient in parallel processing by the amount of fineness of the particle size in comparison with other techniques.

In the case of parallel processing by the area division, however, in order to make processing units efficiently operate in parallel, it is necessary to classify the object to be drawn in each area in advance, so the load of the scene data analysis is heavy. Further, when generating graphics in the so-called immediate mode of not starting to generate graphics after one frame's worth of the scene data is all completed, but starting to generate the graphics immediately after the object data is given, the parallel property cannot be derived.

Further, in the case of parallel processing at the primitive level, in actuality, there is variation in the sizes of the primitives composing the object, so there is a difference in the time for processing one primitive among the processing units. When this difference becomes large, the areas for drawing by the processing units become very different and the locality of the data is lost, therefore a "page miss" of for example the DRAM configuring the memory module frequently occurs and the performance falls. Further, in the case of this technique, there is also the problem of a high interconnect cost. In general, in the hardware for the graphics processing, in order to broaden the band width of the memory, a plurality of memory modules are used for memory interleaving. At this time, it is necessary to connect all processing units and built-in memory modules.

On the other hand, in the case of the parallel processing at the pixel level, as explained above, there is the advantage that the efficiency of parallel processing is better by the amount of fineness of the particle size, so the processing is performed as actual processing including filtering by the routine shown in FIG. 2.

Namely, it calculates DDA parameters such as the inclination of various types of data (Z, texture coordinates, colors, etc.) required for rasterization for example (ST1). Next, it reads the texture data from the memory (ST2), performs sub-word rearrangement by a first processing unit including a plurality of operation processing elements (ST3), then concentrates the data at a second processing unit including a plurality of operation processing elements by a crossbar circuit (ST4). Next, it performs texture filtering (ST5). In this case, the second processing unit performs filtering such as four neighbor interpolation using the read texture data and the decimal portion obtained at the time of calculation of a (u, v) address. Next, it performs processing at the pixel level (per-pixel operation), specifically processing in units of pixels using the texture data after filtering and various types of data after rasterization (ST5). Then, it draws the pixel data passing various tests in processing at the pixel level in a frame buffer and a Z-buffer on a plurality of memory modules.

The above related image processing apparatus is a dedicated processor designed for not usual image processing, but graphics processing. In the prior art, a processor designed for image processing and a processor designed for graphics processing are known, but when realizing a processor having both the functions of image processing and graphics processing together, it may be considered to configure one image processing apparatus simply by using functional blocks of the processor designed for image processing and the processor designed for graphics processing. Simple combination of two processors, however, gives rise to the disadvantages of for example the circuit scale increasing and an increase of the cost being induced.

Further, as a processor designed for image processing and graphics processing, for example a VLIW type media processor or digital signal processor (DSP) or a dedicated processor using hard-wired logic are known.

A VLIW type media processor and DSP improve the processing capability by the approach of more efficiently using a plurality of operation processing elements by parallel processing at the command level. This approach enables control of branching by a fine particle size and can flexibly handle even a program able to perform having a complex processing sequence. In parallel processing at the command level, however, there is a limit in parallelism, so this is not suited for efficient utilization of a large number of operation processing elements.

A typical example of a dedicated processor using hard-wired logic is a related type three-dimensional (3D) rendering processor. A related type 3D rendering processor takes advantage of the point that the processing latency does not become a problem (latency tolerant) and mounts a fixed algorithm by a very deep pipeline using dedicated hardware to thereby achieve a high through-put. This approach gives a high ratio of performance to area since the connections among operation processing elements are fixed and the interconnect overhead is small, but has the disadvantages that there is no freedom in the algorithms and the flexibility is low.

SUMMARY OF THE INVENTION

An object of the present invention is to provide an image processing apparatus able to efficiently utilize a large number of operation processing elements, having a high degree of freedom in algorithms, having a high flexibility, and able to realize image processing and graphics processing without inducing an increase of the circuit scale and an increase of costs and a method of the same.

To attain the above object, according to a first aspect of the present invention, there is provided an image processing apparatus having a graphics processing function and an image processing function, comprising a memory for storing processing data relating to an image; a rasterizer for generating graphics pixel data including at least coordinate data and color data based on image parameters of a primitive at the time of the graphics processing and generating at least a source address for reading the processing data relating to the image stored in the memory at the time of the image processing; and at least one core for performing predetermined graphics processing or image processing based on the data generated at the rasterizer, wherein the core includes a register unit having a plurality of registers for setting at least the pixel data and address data generated by the rasterizer, a first function unit for performing predetermined graphics processing with respect to the coordinate data among graphics pixel data from the rasterizer set in a register of the register unit and performing predetermined operation processing based on the generated graphics data and the color data from the rasterizer set in the register of the register unit to generate first operation data at the time of graphics processing, performing predetermined image processing with respect to the image data read from the memory or the image data supplied from the outside in accordance with the source address set in the register of the register unit to generate second operation data at the time of the image processing, a second function unit for performing processing required for pixel writing based on the window coordinate data among the graphics pixel data from the rasterizer set in the register of the register unit and the first operation data generated by the first function unit and writing the predetermined result into the memory according to need at the time of the graphics processing, and a crossbar circuit switched in accordance with the processing and connecting the rasterizer, register unit, first function unit, and second function unit to each other.

In the first aspect, preferably provision is further made of a means for transferring the second operation data generated by the first function unit to the second function unit or an external device in accordance with need.

In the first aspect, preferably the rasterizer generates a destination address for storing the processing results in the memory and the source address at the time of the image processing, and the second function unit writes the second operation data generated by the first function unit at the destination address from the rasterizer set in the register of the register unit of the memory according to need at the time of the image processing.

In the first aspect, preferably each register of the register unit has an input connected to the crossbar circuit and has an output directly connected to the input of either of the first function unit and second function unit; at least coordinate data and source address data among the graphics pixel data from the rasterizer are set in a predetermined register, and the set data is supplied to the first function unit; the first function unit performs the predetermined graphics processing with respect to the supplied graphics pixel data; the first operation data from the first function unit is transferred through the crossbar circuit and set in a predetermined register of the register unit, and the set data is directly supplied to the second function unit; the register unit includes a specific register having an output connected to the input of the second function unit; and the window coordinates among the graphics pixel data from the rasterizer are set in the specific register of the register unit, and the set data is directly supplied to the second function unit.

In the first aspect, preferably the same supply line is shared for the texture coordinates generated at the time of the graphics processing by the rasterizer and the source addresses generated at the time of the image processing.

According to a second aspect of the present invention, there is provided an image processing apparatus having a graphics processing function and an image processing function comprising a memory for storing processing data relating to an image; a rasterizer for generating graphics pixel data including at least coordinate data and color data based on image parameters of a primitive at the time of the graphics processing and generating a source address for reading the processing data relating to the image stored in the memory and a destination address for storing processing results in the memory at the time of the image processing; and at least one core for performing predetermined graphics processing or image processing based on the data generated at the rasterizer, wherein the core includes a register unit having a plurality of registers for setting at least the pixel data and address data generated by the rasterizer, a first function unit for performing predetermined graphics processing with respect to the coordinate data among graphics pixel data from the rasterizer set in the register of the register unit and performing predetermined operation processing based on the generated graphics data and the color data from the rasterizer set in the register of the register unit to generate first operation data at the time of the graphics processing, performing predetermined image processing with respect to the image data read from the memory or the image data supplied from the outside in accordance with the source address set in the register of the register unit to generate second operation data at the time of the image processing, a second function unit for performing processing required for pixel writing based on the window coordinate data among the graphics pixel data from the rasterizer set in the register of the register unit and the first operation data generated by the first function unit and writing the predetermined result into the memory according to need at the time of the graphics processing, and writing the second operation data generated by the first function unit at the destination address from the rasterizer set in the register of the register unit of the memory according to need at the time of the image processing, and a crossbar circuit switched in accordance with the processing and connecting the rasterizer, register unit, first function unit, and second function unit to each other.

In the first or second aspect, preferably each register of the register unit has an input connected to the crossbar circuit and an output connected to the input of either of the first function unit and second function unit.

In the first or second aspect, preferably at least coordinate data and source address data among the graphics pixel data from the rasterizer are set in a predetermined register, the set data is supplied to the first function unit, and the first function unit performs the predetermined graphics processing with respect to supplied graphics pixel data.

In the first or second aspect, preferably the register unit includes a specific register having an output connected to the second function unit, window coordinates and destination address for image processing among the graphics pixel data from the rasterizer are set in a specific register of the register unit, and the set data is directly supplied to the second function unit.

In the first or second aspect, preferably the first operation data from the first function unit is transferred through the crossbar circuit and set in a predetermined register of the register unit, and the set data is directly supplied to the second function unit.

Further, in the second aspect, preferably each register of the register unit has an input connected to the crossbar circuit and has an output directly connected to the input of either of the first function unit and second function unit, at least coordinate data and source address data among the graphics pixel data from the rasterizer are set in a predetermined register, the set data is supplied to the first function unit, the first function unit performs the predetermined graphics processing with respect to the supplied graphics pixel data, the first operation data from the first function unit is transferred through the crossbar circuit and set in a predetermined register of the register unit, the set data is directly supplied to the second function unit, the register unit includes a specific register having an output connected to the input of the second function unit, the window coordinates among the graphics pixel data from the rasterizer and the destination address for the image processing are set in the specific register of the register unit, and the set data is directly supplied to the second function unit.

In the first or second aspect, preferably the first function unit includes an operation processing element having an output connected to at least the crossbar circuit, the register unit includes a plurality of registers each having an input connected to the crossbar circuit and an output directly connected to the input of the first function unit, and outputs of a plurality of registers of the register unit and inputs of operation processing elements of the first function unit are in a one-to-one correspondence.

In the first or second aspect, preferably the output of at least one operation processing element of the first function unit is connected to also the input of another operation processing element.

In the first or second aspect, preferably the rasterizer generates at least window coordinates, texture coordinates, and color data at the time of the graphics processing and supplies the texture coordinates via the register unit to the first function unit, the first function unit performs predetermined graphics processing based on the texture coordinates, the register unit includes a first register having an output connected to the input of the first function unit and a second register having an output connected to the input of the second function unit, the color data is set in the first register of the register unit and directly supplied from the first register to the first function unit, and the window coordinates are set in the second register of the register unit and directly supplied from the second register to the second function unit.

In the first or second aspect, preferably the first function unit includes a plurality of operation processing elements provided corresponding to a plurality of ports of the memory, generates an address for reading texel data required for the predetermined operation processing based on the graphics data from the first function unit, and then finds operation parameters and supplies the same to the plurality of operation processing elements, and the plurality of operation processing elements perform parallel operation processing based on the operation parameters and the processing data read from the memory and generate continuous stream data.

In the first or second aspect, preferably a plurality of operation processing elements of the first function unit perform predetermined operation processing with respect to element data read from the ports of the memory, add operation results at one operation processing element among the plurality of operation processing elements, and output an addition result data of the one operation processing element.

In the first or second aspect, preferably provision is further made of a cache for storing at least the processing data read from each port of the memory and supplying the stored data to each operation processing element of the first function unit.

Further, in the second aspect, preferably the same supply line is shard for the window coordinates generated at the time of the graphics processing by the rasterizer and the destination address generated at the time of the image processing, and the same supply line is shared for the texture coordinates and the source address.

According to a third aspect of the present invention, there is provided an image processing apparatus having a graphics processing function and an image processing function comprising a memory for storing processing data relating to an image; a rasterizer for generating graphics pixel data including at least coordinate data and color data based on image parameters of a primitive at the time of the graphics processing and generating at least a source address for reading the processing data relating to the image stored in the memory at the time of the image processing; and at least one core for performing predetermined graphics processing or image processing based on the data generated at the rasterizer, wherein the core includes a register unit having a plurality of registers for setting at least the pixel data and address data generated by the rasterizer, a first function unit for performing predetermined graphics processing with respect to the coordinate data among graphics pixel data from the rasterizer set in the register of the register unit and outputting graphics data, a second function unit for performing, at the time of the graphics processing, predetermined operation processing based on the graphics data generated at the first function unit to generate first operation data and performing, at the time of the image processing, predetermined image processing with respect to image data read from the memory or image data supplied from the outside in accordance with the source address set in the register of the register unit to generate second operation data, a third function unit for performing, at the time of the graphics processing, predetermined operation processing with respect to the first operation data from the second function unit based on the color data from the rasterizer set in the register of the register unit to generate third operation data and performing, at the time of the image processing, predetermined operation processing with respect to the second operation data from the second function unit according to need to generate fourth operation data, a fourth function unit for performing, at the time of the graphics processing, processing required for pixel writing based on the window coordinate data among the graphics pixel data from the rasterizer set in the register of the register unit and the third operation data generated at the third function unit, and writing predetermined results into the memory according to need, and a crossbar circuit switched in accordance with the processing and connecting the rasterizer, register unit, first function unit, third function unit, and fourth function unit to each other.

In the third aspect, preferably provision is further made of a means for transferring the second operation data generated at the second function unit or the fourth operation data generated at the third function unit to the second function unit or external device according to need.

In the third aspect, preferably the rasterizer generates a destination address for storing processing results in the memory in addition to the source address at the time of the image processing, and the fourth function unit writes the second operation data generated at the second function unit or the fourth operation data generated at the third function unit at the destination address from the rasterizer set in the register of the register unit according to need at the time of the image processing.

In the third aspect, each register of the register unit has an input connected to the crossbar circuit and an output directly connected to the input of any of the first function unit, second function unit, third function unit, and fourth function unit, the output of the first function unit and the input of the second function unit are directly connected by an interconnect, at least the coordinate data and source address data among the graphics pixel data from the rasterizer are set in a predetermined register, the set data is supplied to the first function unit, the first function unit performs the predetermined graphics processing with respect to the supplied graphics pixel data and outputs the source address for the image processing straight through, the output data is directly supplied to the second function unit, the first operation data from the second function unit is transferred through the crossbar circuit and set in a predetermined register of the register unit, the set data is directly supplied to the third function unit, the third operation data from the third function unit is transferred through the crossbar circuit and set in a predetermined register of the register unit, the set data is directly supplied to the fourth function unit, the register unit includes a specific register having an output connected to the input of the fourth function unit, and the window coordinates among the graphics pixel data from the rasterizer are set in the specific register of the register unit, and the set data is directly supplied to the fourth function unit.

In the third aspect, preferably the same supply line is shared for the texture coordinates generated at the time of the graphics processing by the rasterizer and the source address generated at the time of the image processing.

According to a fourth aspect of the present invention, there is provided an image processing apparatus having a graphics processing function and an image processing function comprising a memory for storing processing data relating to an image; a rasterizer for generating graphics pixel data including at least coordinate data and color data based on image parameters of a primitive at the time of the graphics processing and generating a source address for reading the processing data relating to the image stored in the memory and a destination address for storing processing results in the memory at the time of the image processing; and at least one core for performing predetermined graphics processing or image processing based on the data generated at the rasterizer, wherein the core includes a register unit having a plurality of registers for setting at least the pixel data and address data generated by the rasterizer, a first function unit for performing predetermined graphics processing with respect to the coordinate data among graphics pixel data from the rasterizer set in the register of the register unit and outputting graphics data, a second function unit for performing, at the time of the graphics processing, predetermined operation processing based on the graphics data generated at the first function unit to generate first operation data and performing, at the time of the image processing, predetermined image processing with respect to image data read from the memory or image data supplied from the outside in accordance with the source address set in the register of the register unit to generate second operation data, a third function unit for performing, at the time of the graphics processing, predetermined operation processing with respect to the first operation data from the second function unit based on the color data from the rasterizer set in the register of the register unit to generate third operation data and performing, at the time of the image processing, predetermined operation processing with respect to the second operation data from the second function unit according to need to generate fourth operation data, a fourth function unit for performing, at the time of the graphics processing, processing required for pixel writing based on the window coordinate data among the graphics pixel data from the rasterizer set in the register of the register unit and the third operation data generated at the third function unit and writing predetermined results into the memory according to need and writing, at the time of the image processing, the second operation data generated at the second, function unit or the fourth operation data generated at the third function unit at the destination address from the rasterizer set in the register of the register unit of the memory according to need, and a crossbar circuit switched in accordance with the processing and connecting the rasterizer, register unit, first function unit, third function unit, and fourth function unit to each other.

In the third or fourth aspect, preferably each register of the register unit has an input connected to the crossbar circuit, and an output directly connected to the input of either of the first function unit, second function unit, third function unit, and fourth function unit.

In the third or fourth aspect, preferably at least the coordinate data and source address data among the graphics pixel data from the rasterizer are set in a predetermined register, the set data is supplied to the first function unit, and the first function unit performs the predetermined graphics processing with respect to the supplied graphics pixel data, and outputs the source address for the image processing straight through.

In the third or fourth aspect, preferably the output of the first function unit and the input of the second function unit are directly connected by an interconnect, and the output data of the first function unit is directly supplied to the second function unit.

In the third or fourth aspect, preferably the register unit includes a specific register having an output connected to the fourth function unit, the window coordinates and destination address for the image processing among the graphics pixel data from the rasterizer are set in the specific register of the register unit, and the set data is directly supplied to the fourth function unit.

In the third or fourth aspect, preferably the first operation data from the second function unit is transferred through the crossbar circuit and set in a predetermined register of the register unit, the set data is directly supplied to the third function unit, the third operation data from the third function unit is transferred through the crossbar circuit and set in a predetermined register of the register unit, and the set data is directly supplied to the fourth function unit.

Further, in the fourth aspect, preferably each register of the register unit has an input connected to the crossbar circuit and an output directly connected to the input of any of the first function unit, second function unit, third function unit, and fourth function unit, the output of the first function unit and the input of the second function unit are directly connected by an interconnect, at least the coordinate data and the source address data among the graphics pixel data from the rasterizer are set in a predetermined register, the set data is directly supplied to the first function unit, the first function unit performs the predetermined graphics processing with respect to the supplied graphics pixel data and outputs the source address for the image processing straight through, the output data is directly supplied to the second function unit, the first operation data from the second function unit is transferred through the crossbar circuit and set in a predetermined register of the register unit, the set data is directly supplied to the third function unit, the third operation data from the third function unit is transferred through the crossbar circuit and set in a predetermined register of the register unit, the set data is directly supplied to the fourth function unit, and further the register unit includes a specific register having an output connected to the input of the fourth function unit, the window coordinates among the graphics pixel data and the destination address for the image processing from the rasterizer are set in a specific register of the register unit, and the set data is directly supplied to the fourth function unit.

In the third or fourth aspect, preferably the second function unit and third function unit include operation processing elements each having an output connected to at least the crossbar circuit, the register unit includes a plurality of registers each having an input connected to the crossbar circuit and an output directly connected to the inputs of the second function unit and the third function unit, and the outputs of a plurality of registers of the register unit and inputs of the operation processing elements of the second function unit and third function unit are in a one-to-one correspondence.

In the third or fourth aspect, preferably the output of at least one operation processing element of the third function unit is connected to also the input of the other operation processing element.

In the third or fourth aspect, preferably the rasterizer generates at least window coordinates, texture coordinates, and color data at the time of the graphics processing and supplies the texture coordinates via the register unit to the first function unit, the first function unit performs predetermined graphics processing based on the texture coordinates and supplies the same to the second function unit, the register unit includes a first register having an output connected to the input of the third function unit and a second register having an output connected to the input of the fourth function unit, the color data is set in the first register of the register unit and directly supplied from the first register to the third function unit, and the window coordinates are set in the second register of the register unit and directly supplied from the second register to the fourth function unit.

In the third or fourth aspect, preferably the output of the first function unit and the input of the second function unit are directly connected by an interconnect, and the output data of the first function unit is directly supplied to the second function unit.

In the third or fourth aspect, preferably the second function unit includes a plurality of operation processing elements provided corresponding to a plurality of ports of the memory, generates an address for reading texel data required for the predetermined operation processing based on the graphics data from the first function unit, and then finds operation parameters and supplies the same to the plurality of operation processing elements, and the plurality of operation processing elements perform parallel operation processing based on the operation parameters and the processing data read from the memory to generate continuous stream data.

In the third or fourth aspect, preferably a plurality of operation processing elements of the second function unit perform predetermined operation processing with respect to element data read from the ports of the memory, add operation results at one operation processing element among the plurality of operation processing elements, and output the addition result data of the one operation processing element.

In the third or fourth aspect, preferably provision is further made of a cache for storing at least the processing data read from the ports of the memory and supplying the storage data to the operation processing elements of the second function unit.

Further, in the fourth aspect, the same supply line is shared for the window coordinates generated at the time of the graphics processing and the destination address generated at the time of the image processing by the rasterizer, and the same supply line is shared for the texture coordinates and the source address.

According to a fifth aspect of the present invention, there is provided an image processing apparatus having a graphics processing function and an image processing function comprising a memory for storing processing data relating to an image; a rasterizer for generating graphics pixel data including at least coordinate data and color data based on image parameters of a primitive at the time of the graphics processing and generating a source address for reading the processing data relating to the image stored in the memory and a destination address for storing processing results in the memory at the time of the image processing; and at least one core for performing predetermined graphics processing or image processing based on the data generated at the rasterizer, wherein the core includes a register unit having a plurality of registers for holding data processed in function units, a first function unit for receiving as input the coordinate data among the graphics pixel data from the rasterizer set in at least one first register of the register unit, performing predetermined graphics processing with respect to the input data and outputting the graphics data, receiving as input the source address for the image processing from the rasterizer set in the second register of the register unit and outputting the same as is, a second function unit for performing predetermined operation processing based on the graphics data generated at the first function unit at the time of the graphics processing to generate first operation data, and performing predetermined image processing with respect to the image data read from the memory or the image data supplied from the outside in accordance with the source address passing straight through the first function unit at the time of the image processing to generate second operation data, a third function unit for performing, at the time of the graphics processing, predetermined operation processing with respect to at least the first operation data from the second function unit set in at least one fourth register of the register unit based on the color data set in the third register of the register unit to generate third operation data, and performing, at the time of the image processing, predetermined operation processing with respect to the second operation data from the second function unit set in the fourth register according to need to generate fourth operation data, a fourth function unit for performing, at the time of the graphics processing, processing required for pixel writing based on the window coordinate data among the graphics pixel data from the rasterizer set in the fifth register of the register unit and the third operation data generated by the third function unit set in at least one sixth register of the register unit, writing predetermined results into the memory according to need, and writing, at the time of the image processing, the second operation data generated by the second function unit set in at least one seventh register of the register unit or the fourth operation data generated at the third function unit at the destination address of the memory from the rasterizer set in an eighth register of the register unit, and a crossbar circuit switched in accordance with the processing and performing the input of the graphics pixel data from the rasterizer to the first register, the input of the source address from the rasterizer to the second register, the input of the color data from the rasterizer to the third register, the input of the first operation data from the second function unit to the fourth register, the input of the graphics pixel data from the rasterizer to the fifth register, the input of the third operation data generated by the third function unit to the sixth register, the input of the second operation data generated by the second function unit to the seventh register, and the input of the destination address from the rasterizer to the eighth register.

According to a sixth aspect of the present invention, there is provided an image processing apparatus where a plurality of modules share operation processing data for parallel processing, wherein the apparatus has a global module and a plurality of local modules each having a graphics processing function and an image processing function, the global module is connected in parallel to the plurality of local modules and, when receiving a request from a local module, outputs processing data to the local module issuing the request in accordance with the request, each of the plurality of local modules has a memory for storing processing data relating to an image, a rasterizer for generating graphics pixel data including at least coordinate data and color data based on image parameters of a primitive at the time of the graphics processing, and generating at least a source address for reading the processing data relating to the image stored in the memory at the time of the image processing, and at least one core for performing predetermined graphics processing or image processing based on the data generated at the rasterizer, and the core includes a register unit having a plurality of registers for setting at least the pixel data and address data generated by the rasterizer, a first function unit for performing predetermined graphics processing with respect to the coordinate data among graphics pixel data from the rasterizer set in the register of the register unit and performing predetermined operation processing based on the generated graphics data and the color data from the rasterizer set in the register of the register unit to generate first operation data at the time of the graphics processing, performing predetermined image processing with respect to image data read from the memory or image data supplied from the outside in accordance with the source address set in the register of the register unit to generate second operation data at the time of the image processing, a second function unit for performing processing required for pixel writing based on the window coordinate data among the graphics pixel data from the rasterizer set in the register of the register unit and the first operation data generated by the first function unit and writing the predetermined result into the memory according to need at the time of the graphics processing, and a crossbar circuit switched in accordance with the processing and connecting the rasterizer, register unit, first function unit, and second function unit to each other.

According to a seventh aspect of the present invention, there is provided an image processing apparatus where a plurality of modules share processing data for parallel processing, wherein the apparatus has a global module module and a plurality of local modules each having a graphics processing function and an image processing function, the global module is connected in parallel to the plurality of local modules and, when receiving a request from a local module, outputs processing data to the local module issuing the request in accordance with the request, each of the plurality of local modules has a memory for storing processing data relating to an image, a rasterizer for generating graphics pixel data including at least coordinate data and color data based on image parameters of a primitive at the time of the graphics processing and generating a source address for reading the processing data relating to the image stored in the memory and a destination address for storing processing results in the memory at the time of the image processing, and at least one core for performing predetermined graphics processing or image processing based on the data generated at the rasterizer, and the core includes a register unit having a plurality of registers for setting at least the pixel data and address data generated by the rasterizer, a first function unit for performing predetermined graphics processing with respect to the coordinate data among graphics pixel data from the rasterizer set in the register of the register unit and performing predetermined operation processing based on the generated graphics data and the color data from the rasterizer set in the register of the register unit to generate first operation data at the time of the graphics processing, performing predetermined image processing with respect to the image data read from the memory or the image data supplied from the outside in accordance with the source address set in the register of the register unit to generate second operation data at the time of the image processing, a second function unit for performing processing required for pixel writing based on the window coordinate data among the graphics pixel data from the rasterizer set in the register of the register unit and the first operation data generated by the first function unit and writing the predetermined result into the memory according to need at the time of the graphics processing, and writing the second operation data generated by the first function unit at the destination address from the rasterizer set in the register of the register unit of the memory according to need at the time of the image processing, and a crossbar circuit switched in accordance with the processing and connecting the rasterizer, register unit, first function unit, and second function unit to each other.

According to an eighth aspect of the present invention, there is provided an image processing apparatus where a plurality of modules share processing data for parallel processing, wherein the apparatus has a global module module and a plurality of local modules each having a graphics processing function and an image processing function, the global module is connected in parallel to the plurality of local modules and, when receiving a request from a local module, outputs processing data to the local module issuing the request in accordance with the request, each of the plurality of local modules has a memory for storing processing data relating to an image, a rasterizer for generating graphics pixel data including at least coordinate data and color data based on image parameters of a primitive at the time of the graphics processing and generating at least a source address for reading the processing data relating to the image stored in the memory at the time of the image processing, and at least one core for performing predetermined graphics processing or image processing based on the data generated at the rasterizer, and the core includes a register unit having a plurality of registers for setting at least the pixel data and address data generated by the rasterizer, a first function unit for performing predetermined graphics processing with respect to the coordinate data among graphics pixel data from the rasterizer set in the register of the register unit and outputting graphics data, a second function unit for performing, at the time of the graphics processing, predetermined operation processing based on the graphics data generated at the first function unit to generate first operation data and performing, at the time of the image processing, predetermined image processing with respect to image data read from the memory or image data supplied from the outside in accordance with the source address set in the register of the register unit to generate second operation data, a third function unit for performing, at the time of the graphics processing, predetermined operation processing with respect to the first operation data from the second function unit based on the color data from the rasterizer set in the register of the register unit to generate third operation data and performing, at the time of the image processing, predetermined operation processing with respect to the second operation data from the second function unit according to need to generate fourth operation data, a fourth function unit for performing, at the time of the graphics processing, processing required for pixel writing based on the window coordinate data among the graphics pixel data from the rasterizer set in the register of the register unit and the third operation data generated at the third function unit and writing predetermined results into the memory according to need, and a crossbar circuit switched in accordance with the processing and connecting the rasterizer, register unit, first function unit, third function unit; and fourth function unit to each other.

According to a ninth aspect of the present invention, there is provided an image processing apparatus where a plurality of modules share processing data for parallel processing, wherein the apparatus has a global module module and a plurality of local modules each having a graphics processing function and an image processing function, the global module is connected in parallel to the plurality of local modules and, when receiving a request from a local module, outputs processing data to the local module issuing the request in accordance with the request, each of the plurality of local modules has a memory for storing processing data relating to an image, a rasterizer for generating graphics pixel data including at least coordinate data and color data based on image parameters of a primitive at the time of the graphics processing and generating a source address for reading the processing data relating to the image stored in the memory and a destination address for storing processing results in the memory at the time of the image processing, and at least one core for performing predetermined graphics processing or image processing based on the data generated at the rasterizer, and the core includes a register unit having a plurality of registers for setting at least the pixel data and address data generated by the rasterizer, a first function unit for performing predetermined graphics processing with respect to the coordinate data among graphics pixel data from the rasterizer set in the register of the register unit and outputting graphics data, a second function unit for performing, at the time of the graphics processing, predetermined operation processing based on the graphics data generated at the first function unit to generate first operation data, and performing, at the time of the image processing, predetermined image processing with respect to image data read from the memory or image data supplied from the outside in accordance with the source address set in the register of the register unit to generate second operation data, a third function unit for performing, at the time of the graphics processing, predetermined operation processing with respect to the first operation data from the second function unit based on the color data from the rasterizer set in the register of the register unit to generate third operation data and performing, at the time of the image processing, predetermined operation processing with respect to the second operation data from the second function unit according to need to generate fourth operation data, a fourth function unit for performing, at the time of the graphics processing, processing required for pixel writing based on the window coordinate data among the graphics pixel data from the rasterizer set in the register of the register unit and the third operation data generated at the third function unit and writing predetermined results into the memory according to need and writing, at the time of the image processing, the second operation data generated at the second function unit or the fourth operation data generated at the third function unit at the destination address from the rasterizer set in the register of the register unit of the memory according to need, and a crossbar circuit switched in accordance with the processing and connecting the rasterizer, register unit, first function unit, third function unit, and fourth function unit to each other.

According to a 10th aspect of the present invention, there is provided an image processing apparatus where a plurality of modules share processing data for parallel processing, wherein the apparatus has a global module module and a plurality of local modules each having a graphics processing function and an image processing function, the global module is connected in parallel to the plurality of local modules and, when receiving a request from a local module, outputs processing data to the local module issuing the request in accordance with the request, each of the plurality of local modules has a memory for storing processing data relating to an image, a rasterizer for generating graphics pixel data including at least coordinate data and color data based on image parameters of a primitive at the time of the graphics processing and generating a source address for reading the processing data relating to the image stored in the memory and a destination address for storing processing results in the memory at the time of the image processing, and at least one core for performing predetermined graphics processing or image processing based on the data generated at the rasterizer, and the core includes a register unit having a plurality of registers for holding data processed in function units, a first function unit for receiving as input the coordinate data among the graphics pixel data from the rasterizer set in at least one first register of the register unit, performing predetermined graphics processing with respect to the input data and outputting the graphics data, receiving as input the source address for the image processing by the rasterizer set in the second register of the register unit and outputting the same as is, a second function unit for performing predetermined operation processing based on the graphics data generated at the first function unit at the time of the graphics processing to generate first operation data and performing predetermined image processing with respect to the image data read from the memory or the image data supplied from the outside in accordance with the source address passing straight through the first function unit at the time of the image processing to generate second operation data, a third function unit for performing, at the time of the graphics processing, predetermined operation processing with respect to at least the first operation data from the second function unit set in at least one fourth register of the register unit based on the color data set in the third register of the register unit to generate third operation data and performing, at the time of the image processing, predetermined operation processing with respect to the second operation data from the second function unit set in the fourth register according to need to generate fourth operation data, a fourth function unit for performing, at the time of the graphics processing, processing required for pixel writing based on the window coordinate data among the graphics pixel data from the rasterizer set in the fifth register of the register unit and the third operation data generated by the third function unit set in at least one sixth register of the register unit, writing predetermined results into the memory according to need, and writing, at the time of the image processing, the second operation data generated by the second function unit set in at least one seventh register of the register unit or the fourth operation data generated at the third function unit at the destination address of the memory by the rasterizer set in an eighth register of the register unit, and a crossbar circuit switched in accordance with the processing and performing the input of the graphics pixel data from the rasterizer to the first register, the input of the source address from the rasterizer to the second register, the input of the color data from the rasterizer to the third register, the input of the first operation data from the second function unit to the fourth register, the input of the graphics pixel data from the rasterizer to the fifth register, the input of the third operation data generated by the third function unit to the sixth register, the input of the second operation data generated by the second function unit to the seventh register, and the input of the destination address from the rasterizer to the eighth register.

According to an 11th aspect of the present invention, there is provided an image processing method for performing graphics processing and image processing by a rasterizer, a register unit including a plurality of registers, a first function unit, a second function unit, and a crossbar circuit switched in accordance with the processing and connecting the rasterizer, register unit, first function unit, and second function unit to each other, comprising the steps of, at the time of graphics processing, having the rasterizer generate graphics pixel data including at least window coordinates, texture coordinate data, and color data based on image parameters of a primitive, set generated texture coordinate data via the crossbar circuit in a predetermined register of the register unit and directly supply the set data to the first function unit, set generated color data via the crossbar circuit in a predetermined register of the register unit and directly supply the set data to the first function unit, and set generated window coordinates in a specific register of the register unit and directly supply the set data to the second function unit, having the first function unit perform predetermined graphics processing with respect to the texture coordinate data, perform predetermined operation processing based on the generated graphics data, perform predetermined operation processing with respect to the operation data from the second function unit based on the color data from the rasterizer set in the register of the register unit, set the operation data of the first function unit in a predetermined register of the register unit via the crossbar circuit and directly supply the set data to the second function unit, having the second function unit perform processing required for the pixel writing based on the window coordinate data and the operation data generated at the first function unit, write predetermined results into the memory according to need and, at the time of the image processing, having the rasterizer generate the source address for reading the processing data relating to the image stored in the memory and having the first function unit perform predetermined image processing with respect to the image data read from the memory or the image data supplied from the outside in accordance with the source address and set the processing data from the first function unit in a predetermined register of the register unit via the crossbar circuit.

According to a 12th aspect of the present invention, there is provided an image processing method for performing graphics processing and image processing by a rasterizer, a register unit including a plurality of registers, a first function unit, a second function unit, and a crossbar circuit switched in accordance with the processing and connecting the rasterizer, register unit, first function unit, and second function unit to each other, comprising the steps of, at the time of graphics processing, having the rasterizer generate graphics pixel data including at least window coordinates, texture coordinate data, and color data based on image parameters of a primitive, set generated texture coordinate data via the crossbar circuit in a predetermined register of the register unit and directly supply the set data to the first function unit, set generated color data via the crossbar circuit in a predetermined register of the register unit and directly supply the set data to the first function unit, and set generated window coordinates in a specific register of the register unit and directly supply the set data to the second function unit, having the first function unit perform predetermined graphics processing with respect to the texture coordinate data, perform predetermined operation processing based on the generated graphics data, perform predetermined operation processing with respect to the operation data from the second function unit based on the color data from the rasterizer set in the register of the register unit, and set the operation data of the first function unit in a predetermined register of the register unit via the crossbar circuit and directly supply the set data to the second function unit, and having the second function unit perform processing required for the pixel writing based on the window coordinate data and the operation data generated at the first function unit and write predetermined results into the memory according to need and, at the time of the image processing, having the rasterizer generate the source address for reading the processing data relating to the image stored in the memory and the destination address for storing the processing results in the memory, set a generated source address via the crossbar circuit in a predetermined register of the register unit and directly supply the set data to the first function unit, set a generated destination address in the specific register of the register unit and directly supply the set data to the second function unit, and set a generated source address via the crossbar circuit in the specific register of the register unit and directly supply the set data to the first function unit, having the first function unit perform predetermined image processing with respect to the image data read from the memory or the image data supplied from the outside in accordance with the source address and set the processing data from the first function unit in a predetermined register of the register unit via the crossbar circuit and directly supply the set data to the second function unit, and having the second function unit write the processing data generated at the function unit at the destination address of the memory according to need.

According to a 13th aspect of the present invention, there is provided an image processing method for performing graphics processing and image processing by a rasterizer, a register unit including a plurality of registers, a first function unit, a second function unit, a third function unit, a fourth function unit, and a crossbar circuit switched in accordance with the processing and connecting the rasterizer, register unit, first function unit, second function unit, third function unit, and fourth function unit to each other, comprising the steps of, at the time of graphics processing, having the rasterizer generate graphics pixel data including at least window coordinates, texture coordinate data, and color data based on image parameters of a primitive, set generated texture coordinate data via the crossbar circuit in a predetermined register of the register unit and directly supply the set data to the first function unit, set generated color data via the crossbar circuit in a predetermined register of the register unit and directly supply the set data to the third function unit, and set generated window coordinates in a specific register of the register unit and directly supply the set data to the fourth function unit, having the first function unit perform predetermined graphics processing with respect to the texture coordinate data and directly supply the graphics data to the second function unit, having the second function unit perform predetermined operation processing based on the graphics data generated at the first function unit, set the operation data of the second function unit via the crossbar circuit in a predetermined register of the register unit and directly supply the set data to the third function unit, having the third function unit perform predetermined operation processing with respect to the operation data from the second function unit based on the color data from the rasterizer set in the register of the register unit and set the operation data of the third function unit via the crossbar circuit in a predetermined register of the register unit and directly supply the set data to the fourth function unit, having the fourth function unit perform processing required for pixel writing based on the window coordinate data and the operation data generated at the third function unit and write predetermined results into the memory according to need and, at the time of the image processing, having the rasterizer generate a source address for reading the processing data relating to the image stored in the memory, set generated source address in a predetermined register of the register unit via the crossbar circuit, directly supply the set data to the first function unit, and pass the same straight through the first function unit and supply the same to the second function unit, and having the second function unit and/or the third function unit perform predetermined image processing by reading the image data in accordance with the source address from the memory and set the processing data from the second function unit or third function unit via the crossbar circuit in a predetermined register of the register unit.

According to a 14th aspect of the present invention, there is provided an image processing method for performing graphics processing and image processing by a rasterizer, a register unit including a plurality of registers, a first function unit, a second function unit, a third function unit, a fourth function unit, and a crossbar circuit switched in accordance with the processing and connecting the rasterizer, register unit, first function unit, second function unit, third function unit, and fourth function unit to each other, comprising the steps of, at the time of graphics processing, having the rasterizer generate graphics pixel data including at least window coordinates, texture coordinate data, and color data based on image parameters of a primitive, set generated texture coordinate data via the crossbar circuit in a predetermined register of the register unit and directly supply the set data to the first function unit, set generated color data via the crossbar circuit in a predetermined register of the register unit and directly supply the set data to the third function unit, and set generated window coordinates in a specific register of the register unit and directly supply the set data to the fourth function unit, having the first function unit perform predetermined graphics processing with respect to the texture coordinate data and directly supply the graphics data to the second function unit, having the second function unit perform predetermined operation processing based on the graphics data generated at the first function unit and set the operation data of the second function unit via the crossbar circuit in a predetermined register of the register unit and directly supply the set data to the third function unit, having the third function unit perform predetermined operation processing with respect to the operation data from the second function unit based on the color data from the rasterizer set in the register of the register unit and set the operation data of the third function unit via the crossbar circuit in a predetermined register of the register unit and directly supply the set data to the fourth function unit, having the fourth function unit perform processing required for pixel writing based on the window coordinate data and the operation data generated at the third function unit and write predetermined results into the memory according to need and, at the time of the image processing, having the rasterizer generate a source address for reading the processing data relating to the image stored in the memory and a destination address for storing the processing results in the memory, set a generated source address in a predetermined register of the register unit via the crossbar circuit, directly supply the set data to the first function unit, pass the same straight through the first function unit and supply the same to the second function unit, and set a generated destination address in a specific register of the register unit and directly supply the set data to the fourth function unit, having the second function unit and/or the third function unit perform predetermined image processing by reading the image data in accordance with the source address from the memory and set the processing data from the second function unit or third function unit via the crossbar circuit in a predetermined register of the register unit and directly supply the set data to the fourth function unit, and having the fourth function unit write the processing data generated at the second function unit at the destination address of the memory.

According to the present invention, for example at the time of the graphics processing, the rasterizer generates the graphics pixel data including at least the window coordinates, texture coordinate data, and color data based on the image parameters of a primitive. The generated texture coordinate data is set in a predetermined register of the register unit via the crossbar circuit. This set texture coordinate data is supplied without going through for example a crossbar circuit but directly supplied to the first function unit. Further, the generated data is set via the crossbar circuit in a predetermined register of the register unit. This set color data is directly supplied to the third function unit without going through the crossbar circuit. Further, the generated window coordinates are set in the specific register of the register unit. This set window coordinate data is directly supplied to the fourth function unit without going through for example the crossbar circuit.

Then, the first function unit performs the predetermined graphics processing with respect to the texture coordinate data and directly-supplies the graphics data to the second function unit without going for example the crossbar circuit. The second function unit performs the predetermined operation processing based on the graphics data generated at the first function unit. The operation data of this second function unit is set via the crossbar circuit in a predetermined register of the register unit. This set data is directly supplied to the third function unit without going throughfor example the crossbar circuit. The third function unit performs predetermined operation processing with respect to the operation data by the second function unit based on the color data. The operation data of this third function unit is set in a predetermined register of the register unit via the crossbar circuit. This set data is directly supplied to the fourth function unit without going through for example a crossbar circuit. The fourth function unit performs processing required for the pixel writing based on window coordinate data and the operation data generated at the third function unit and writes the predetermined results into the memory according to need.

Further, at the time of the image processing, the rasterizer, for example, generates the source address for reading the processing data relating to the image stored in the memory and the destination address for storing the processing results in the memory. The generated source address is set in a predetermined register of the register unit via the crossbar circuit. This set source address data is directly supplied to the first function unit without going through for example a crossbar circuit, but passes straight through the first function unit and is supplied to the second function unit. Further, for example the generated destination address is set in the specific register of the register unit. This set destination address data is directly supplied to the fourth function unit without going through for example a crossbar circuit. The second function unit performs predetermined image processing with respect to the image data read from the memory or the image data supplied from the outside in accordance with the source address. The processing data from this second function unit is set in a predetermined register of the register unit via the crossbar circuit. This set data is directly supplied to the fourth function unit without going through for example a crossbar circuit. Then, the fourth function unit writes the processing data generated at the second function unit at the destination address of the memory.

BRIEF DESCRIPTION OF THE DRAWINGS

These and other objects and features of the present invention will become clearer from the following description of the preferred embodiments given with reference to the attached drawings, wherein:

FIGS. 19A to 19P are timing charts for explaining the operation when performing an operation by a pixel operation processor (POP) group based on the data of the memory and further performing an operation by a pixel engine according to the present embodiment;

DESCRIPTION OF THE PREFERRED EMBODIMENTS

Figure 1:
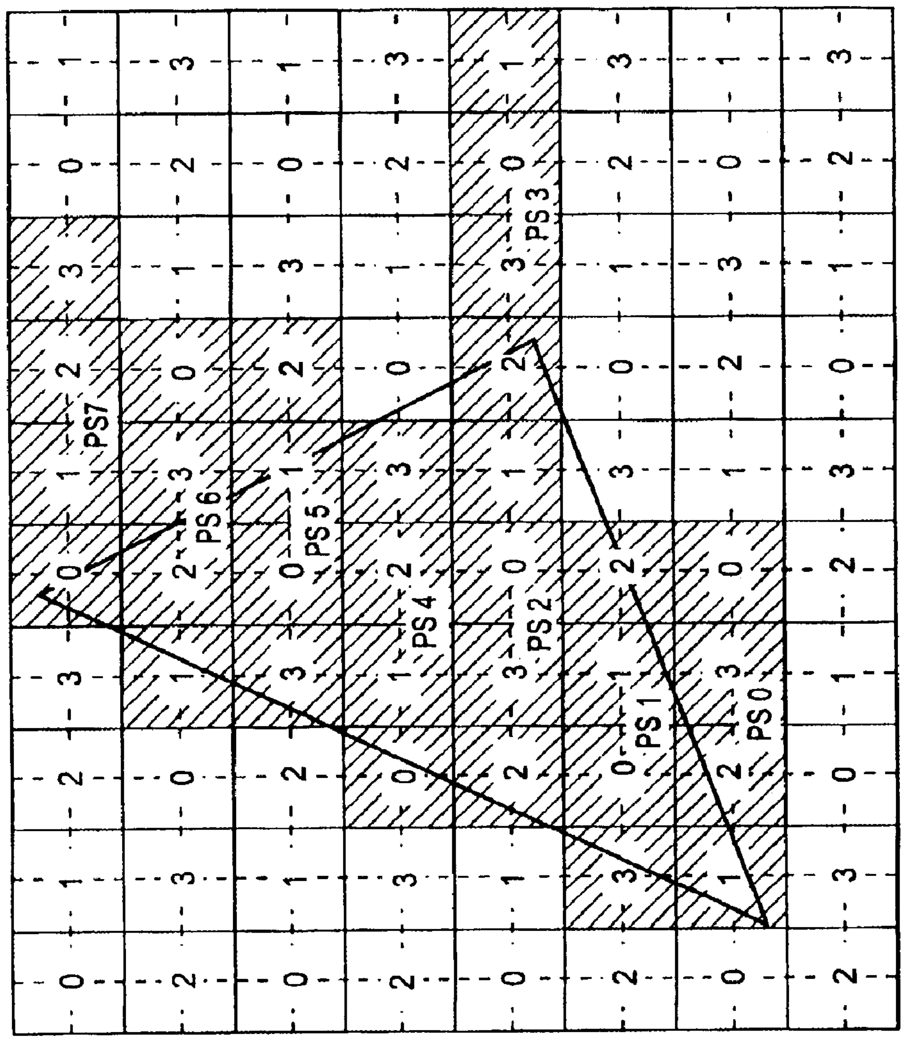
FIG. 1 is a view conceptually showing parallel processing at a primitive level based on the technique of parallel processing at the pixel level.
Figure 2:
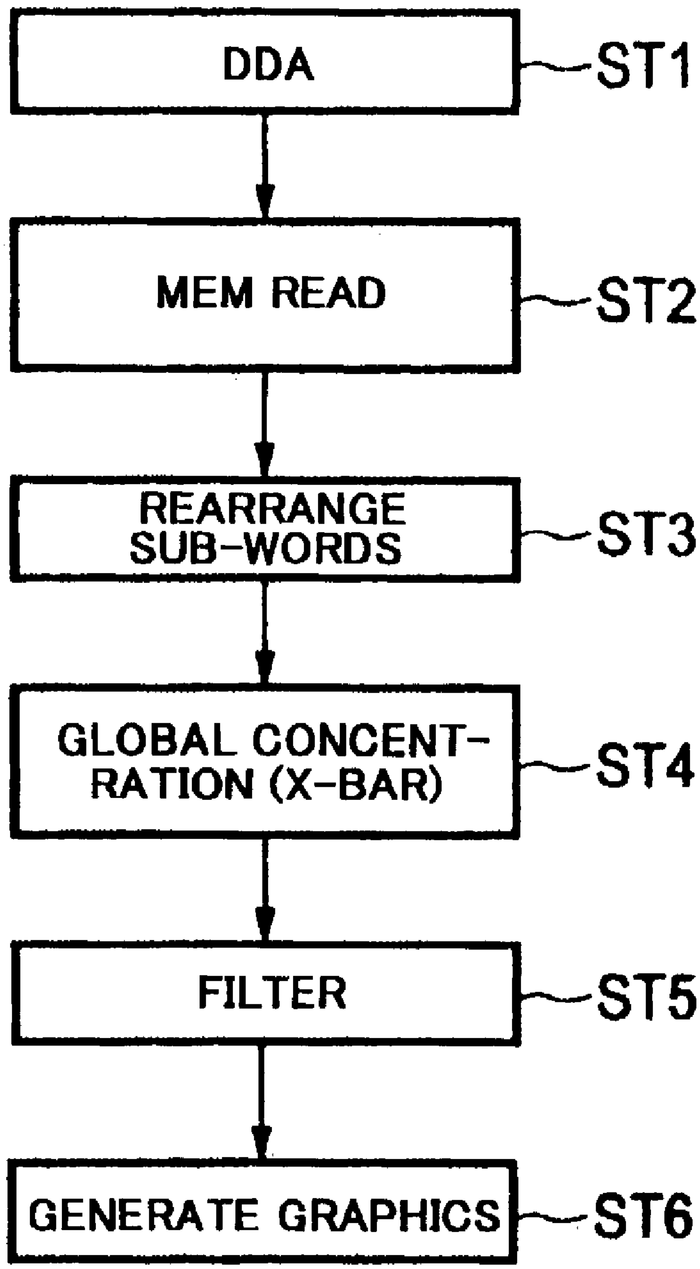
FIG. 2 is a view for explaining a processing routine including texture filtering in a general image processing apparatus.
Figure 3:
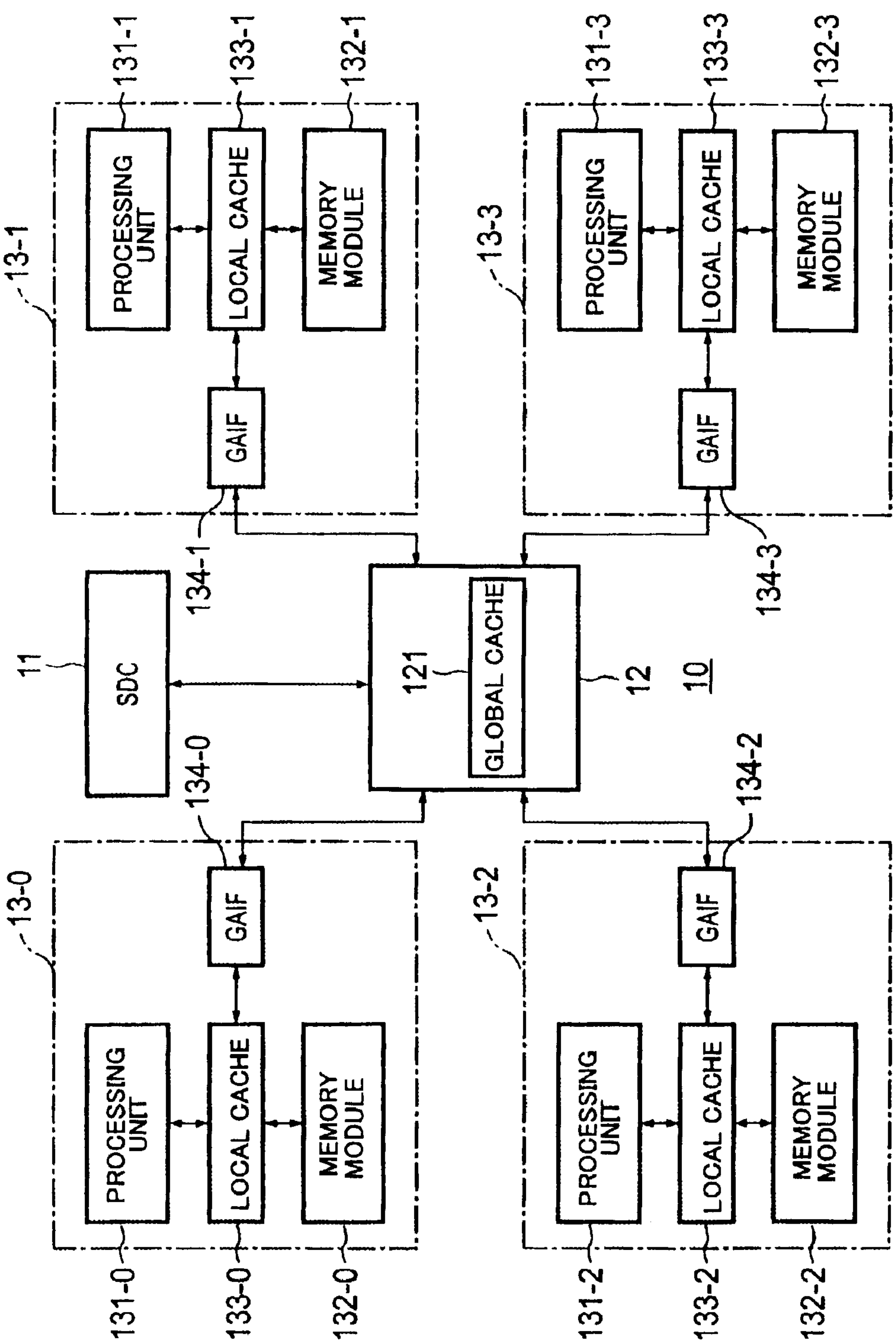
FIG. 3 is a block diagram of the configuration of an embodiment of an image processing apparatus according to the present invention.

FIG. 3 is a block diagram of the configuration of an embodiment of an image processing apparatus according to the present invention. An image processing apparatus 10 according to the present embodiment has, as shown in FIG. 3, a stream data controller (SDC) 11, a global module 12, and a plurality of local modules 13-0 to 13-3.

The present image processing apparatus 10 transfers data between the stream data controller (SDC) 11 and the global module 12. In the present embodiment, local modules 13-0 to 13-n are connected in parallel to one global module 12. A plurality of local modules 13-0 to 13-3 share processing data and process them in parallel. For the texture read system, memory access to other local modules is necessary, but instead of the format of a global access bus, access is performed via one global module 12 having a function as a router. The global module 12 has a global cache, while each of the local modules 13-0 to 13-3 has a local cache. Namely, as the levels of the caches, the present image processing apparatus 10 has two levels of a global cache shared by for example four local modules 13-0 to 13-3 and local caches locally owned by the local modules.

Below, an explanation will be given of the configurations and functions of the components in order in relation to the drawings.

The stream data controller (SDC) 11 controls the transfer of data with the CPU and the external memory and the transfer of data with the global module 12, and performs processing such as operations with respect to the vertex data and the generation of the parameters required for rasterization in the processing units of the local modules 13-0 to 13-3.

Figure 4:
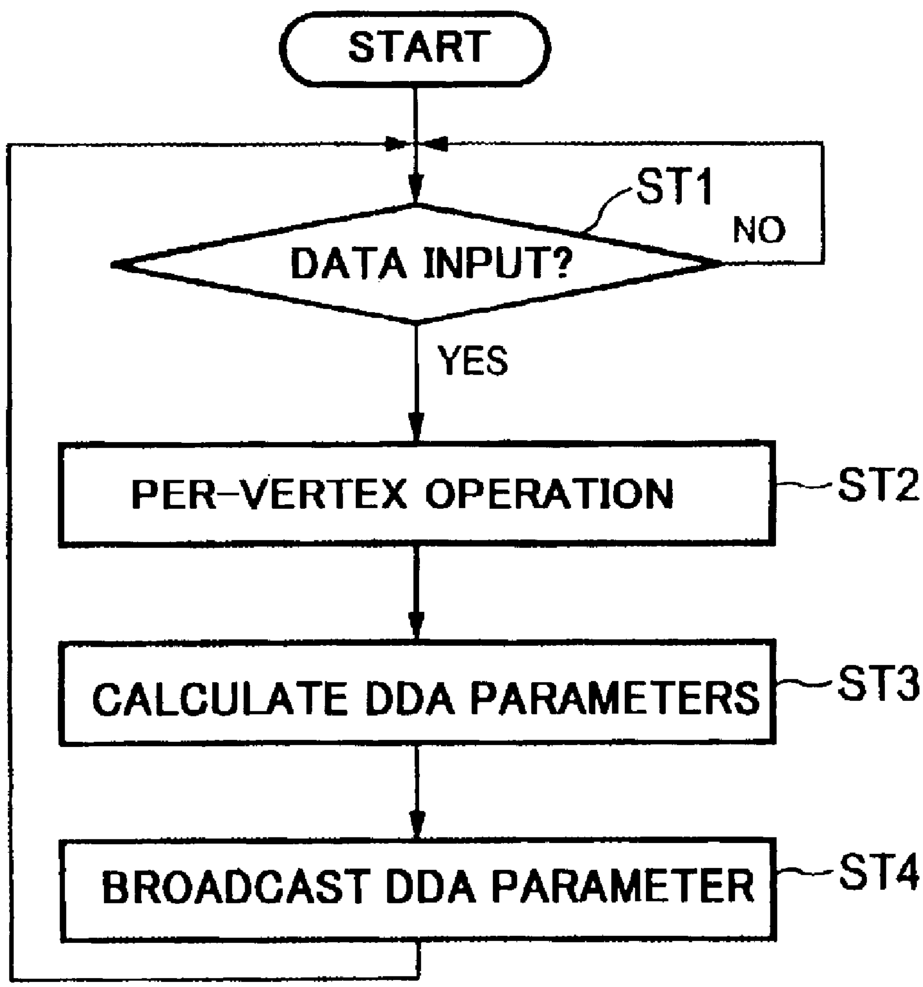
FIG. 4 is a flow chart for explaining main processing of a stream data controller (SDC) according to the present embodiment.

The specific processing content in the stream data controller (SDC) 11 is as follows. Further, the processing routines of the stream data controller (SDC) 11 are shown in FIG. 4.

First, when the data is input (ST1), the stream data controller (SDC) 11 performs a per-vertex operation (ST2). In this processing, when vertex data of three-dimensional coordinates, the normal vector, and texture coordinates are input, the stream data controller (SDC) 11 performs operations with respect to the vertex data. As typical operations, there are the operation of coordinate conversion for deformation of the object, projection of this onto a screen etc., lighting operations, and clipping operations. The processing carried out here corresponds to the execution of a so-called vertex shader.

Next, the stream data controller (SDC) 11 calculates the digital differential analyzer (DDA) parameters (ST3). In this processing, DDA parameters such as inclinations of various data (Z, texture coordinates, colors, etc.) required for the rasterization are calculated.

Next, it broadcasts the calculated DDA parameters to all local modules 13-0 to 13-3 via the global module 12 (ST4). In this processing, the broadcasted parameters are transferred to the local modules 13-0 to 13-3 via the global module 12 by using a channel different from that of a cache fill. However, this does not exert an influence upon the content of the global cache.

The global module 12 has a router function and a global cache 121 shared by all local modules. The global module 12 broadcasts the DDA parameters from the stream data controller (SDC) 11 to all local modules 13-0 to 13-3 connected in parallel.

Figure 5:
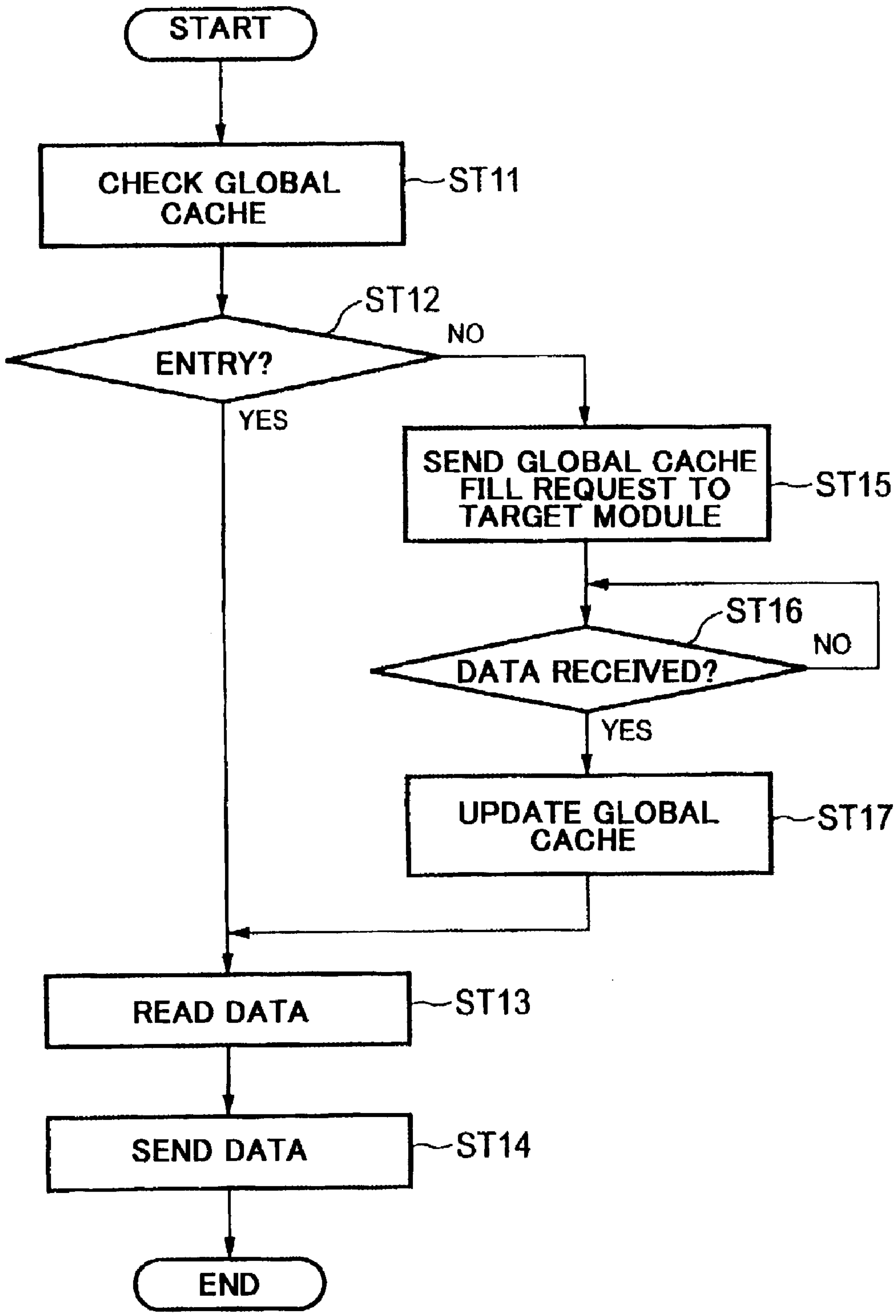
FIG. 5 is a flow chart for explaining the function of a global module according to the present embodiment.

Further, when receiving a request of a local cache fill (LCF) from for example a certain local module, the global module 12 checks the entries of the global cache (ST11) as shown in FIG. 5, where there is an entry (ST12), reads the requested block data (ST13), transmits the read out data to the local module transmitting the request (ST14), and, when there is no entry (ST12), sends a request for global cache fill (GCF) to the target local module for holding the block data (ST15), updates the global cache by the block data sent after that (ST16, ST17), reads out the block data (ST13) and transmits the read out data to the local module sending the request of the local cache fill LCF (ST14).

The local module 13-0 has a processing unit 131-0, a memory module 132-0 configured by for example a DRAM, a local cache 133-0 inherent in the module, and a global interface (GAIF) 134-0 interfacing with the global module 12.

Similarly, the local module 13-1 has a processing unit 131-1, a memory module 132-1 configured by for example a DRAM, a local cache 133-1 inherent in the module, and a global interface (GAIF) 134-1 interfacing with the global module 12 as well. The local module 13-2 has a processing unit 131-2, a memory module 132-2 configured by for example a DRAM, a local cache 133-2 inherent in the module, and a global interface (GAIF) 134-2 interfacing with the global module 12. The local module 13-3 has a processing unit 131-3, a memory module 132-3 configured by for example a DRAM, a local cache 133-3 inherent in the module, and a global interface (GAIF) 134-3 interfacing with the global module 12.

In the local modules 13-0 to 13-3, memory modules 132-0 to 132-3 are interleaved to predetermined sizes, for example, 4×4 rectangular area units. The memory module 132-0 and the processing unit 131-0, the memory module 132-1 and the processing unit 131-1, the memory module 132-2 and the processing unit 131-2, and the memory module 132-3 and the processing unit 131-3 are in one-to-one correspondence in terms of areas in charge. Memory access with respect to other local modules does not occur in the drawing system. On the other hand, the local modules 13-0 to 13-3 require memory access with respect to other local modules relating to the texture read system, but in this case, access is performed via the global module 12.

The processing units 131-0 to 131-3 of the local modules 13-0 to 13-3 are streaming processors for executing so-called streaming data processing characteristic in image processing and graphics processing with a high through-put.

The processing units 131-0 to 131-3 of the local modules 13-0 to 13-3 perform for example the following graphics processing and image processing.

Figure 6:
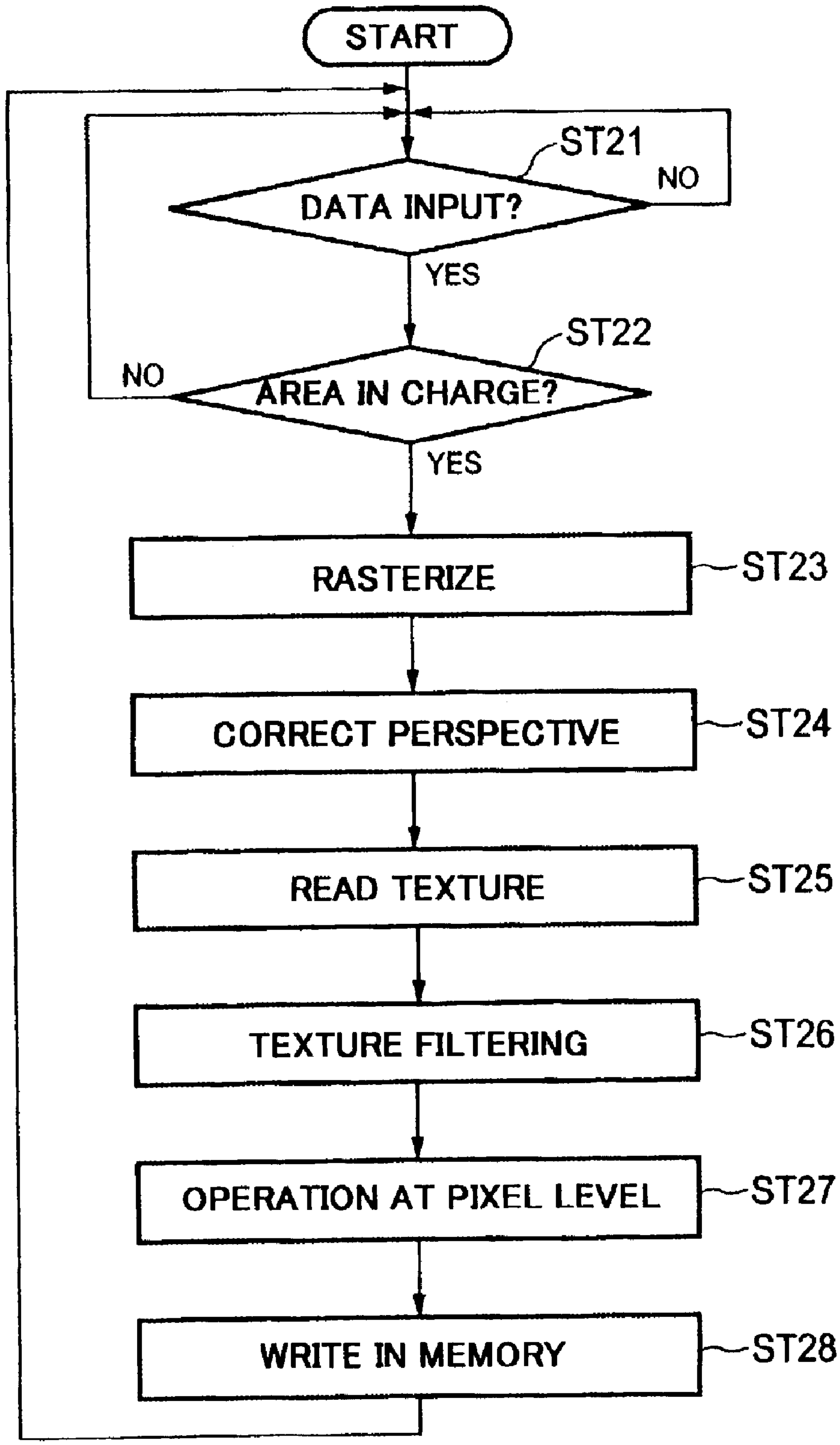
FIG. 6 is a view for explaining graphics processing of a processing unit in a local module according to the present embodiment.
Figure 7:
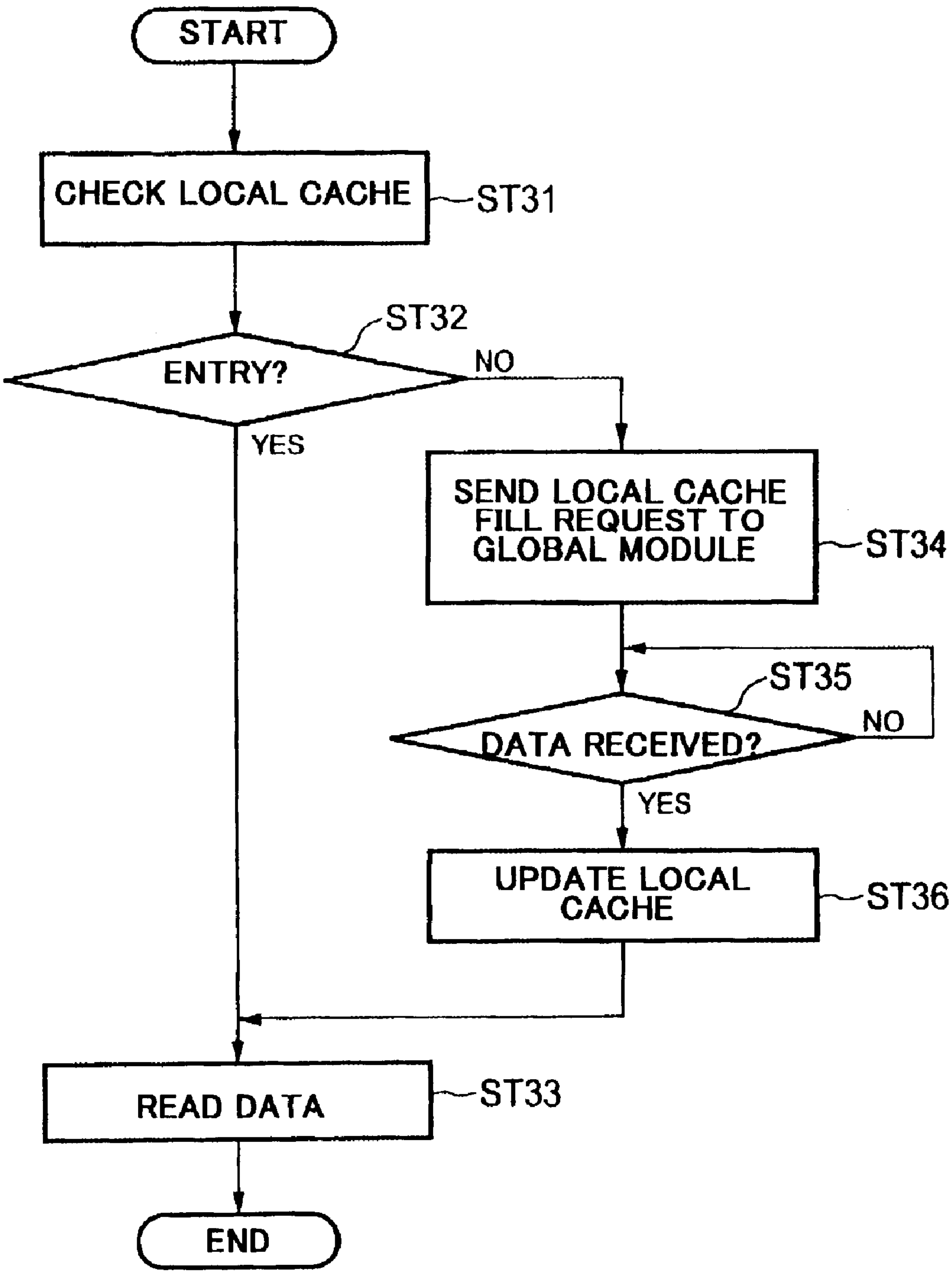
FIG. 7 is a flow chart for explaining an operation of a local module at the time of texture reading according to the present embodiment.

First, a brief explanation will be given of the graphics processing of the processing units 131-0 to 131-3 in relation to the flow charts of FIG. 6 and FIG. 7.

When the broadcasted parameter data is input (ST21), the processing unit 131(-0 to -3) judges whether or not the triangle is the area which it is in charge of (ST22) and, in case of being in charge of the area, performs the rasterization (ST23). Namely, when receiving the broadcasted parameters, it decides whether or not the triangle belongs to the area which it is in charge of, for example, an area interleaved in units of rectangular areas of 4×4 pixels and, when it belongs, rasterizes various types of data (Z, texture coordinates, colors, etc.). In this case, the unit generated is 2×2 pixels per cycle per local module.

Next, it performs perspective correction of the texture coordinates (ST24). Further, this processing stage also includes calculation at the MipMap level by level of detail (LOD) computation and (u, v) address computation for texture access.

Next, it reads the texture (ST25). In this case, the processing units 131-0 to 131-3 of the local modules 13-0 to 13-3 first check the entries of the local caches 133-0 to 133-3 at the time of texture reading as shown in FIG. 7 (ST31) and, when there is an entry (ST32), read the required texture data (ST33). When there is no required texture data in the local caches 133-0 to 133-3, the processing units 131-0 to 131-3 send a request for local cache fill to the global module 12 through the global interfaces 134-0 to 134-3 (ST34). Then, the global module 12 returns the requested block to the local module sending the request, but if there is no entry, as explained above (explained in relation to FIG. 5), sends a request for a global cache fill to the local module holding the block. Thereafter, it fills the block data in the global cache, and transmits the data to the local module sending the request. When the requested block data is sent from the global module 12, the corresponding local module updates the local cache (ST35, ST36), and the processing unit reads the block data (ST33). Note that, here, simultaneous processing of four textures at the maximum is assumed, and the number of the texture data to be read out is 16 texels per pixel.

Next, it performs texture filtering (ST26). In this case, the processing units 133-0 to 133-3 perform filtering such as four neighbor interpolation using the read out texture data and the decimal portion obtained at the calculation of the (u, v) address.

Next, they perform processing at the pixel level (per-pixel operation) (ST27). In this processing, they perform operations in units of pixels by using the texture data after filtering and various data after rasterization. The processing carried out here corresponds to a so-called pixel shader such as lighting at the pixel level (per-pixel lighting). Further, the following processing is included other than that. Namely, they are processings such as an alpha test, scissoring, Z-buffer test, stencil test, alpha blending, logical operation, and dithering.

Then, they write the pixel data passing various tests in the processing at the pixel level into the memory modules 132-0 to 132-3, for example, the frame buffer and Z-buffer in the built-in DRAM memory (ST28: memory write).

Figure 8:
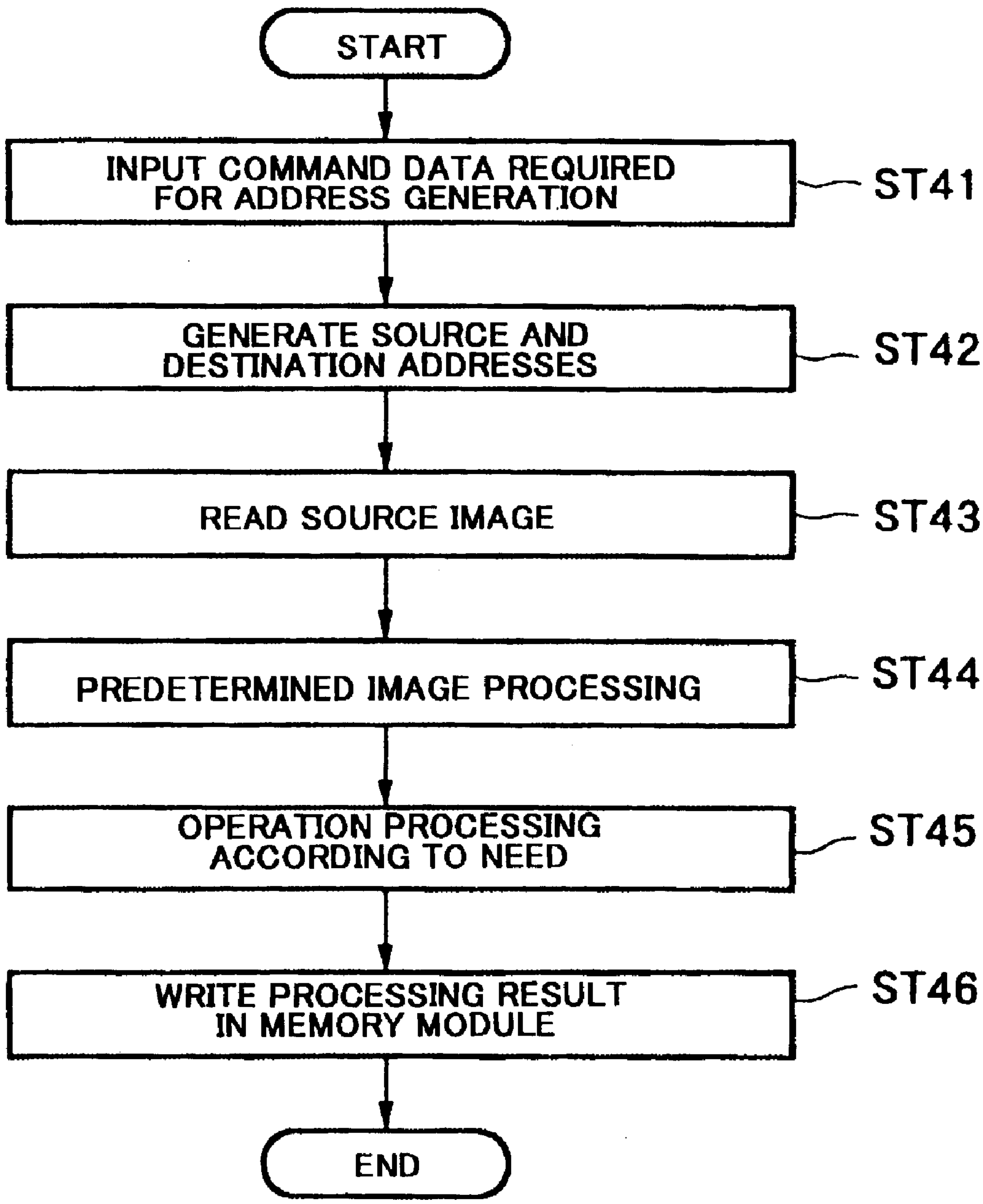
FIG. 8 is a view for explaining image processing of a processing unit in a local module according to the present embodiment.

Next, the image processing of the processing units 131-0 to 131-3 will be explained in brief in relation to the flow chart of FIG. 8.

Before executing the image processing, the image data is loaded in the memory module 132(-0 to -3). Then, the processing unit 131(-0 to -3) receive commands and data required for generating a read (source) address and write (destination) address required for the image processing (ST41). Then, the processing unit 131(-0 to -3) generate the source address and the destination address (ST42). Next, it reads the source image from the memory module 132(-0 to -3) or is supplied it from the global module 12 (ST43) and performs predetermined image processing such as template matching (ST44). Then, it performs predetermined operation processing according to need (ST45), then writes the result into an area designated by the destination address of the memory module 132(-0 to -3) (ST46).

The local caches 133-0 to 133-3 of the local modules 13-0 to 13-3 store the drawing data and the texture data required for the processing of the processing units 131-0 to 131-3 and performs the transfer of the data with the processing units 131-0 to 131-3 and the transfer (write, read) of the data with the memory modules 132-0 to 132-3.

Figure 9:
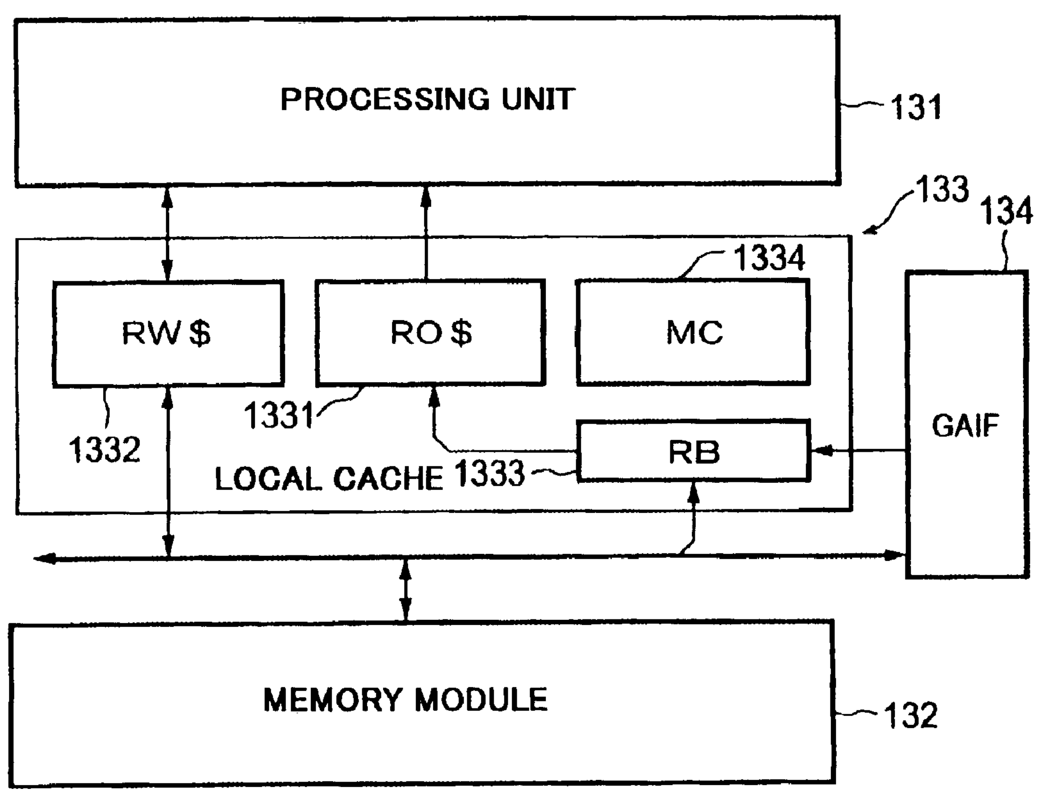
FIG. 9 is a block diagram of an example of the configuration of a local cache in a local module according to the present embodiment.

FIG. 9 is a block diagram of an example of the configuration of the local caches 133-0 to 133-3 of the local modules 13-0 to 13-3.

Each local cache 133 includes, as shown in FIG. 9, a read only cache (RO$) 1331, a read write cache (RW$) 1332, a reorder buffer (RB) 1333, and a memory controller (MC) 1334.

The read only cache 1331 is a read only cache for reading for example the source image of the operation processing and used for the storage of for example texture system data. The read write cache 1332 is the cache for executing operations requiring both reading and writing represented by for example a read modify write in the graphics processing and is used for the storage of for example the graphics generation system data.

The reorder buffer 1333 is a so-called waiting buffer. When there is no required data in the local cache, when issuing a request for a local cache fill, there is a case where the order of the data sent to the global module 12 is different. Therefore, the buffer observes this order and adjusts the order of the data so as to return it to the request order to the processing units 131-0 to 131-3.

Figure 10:
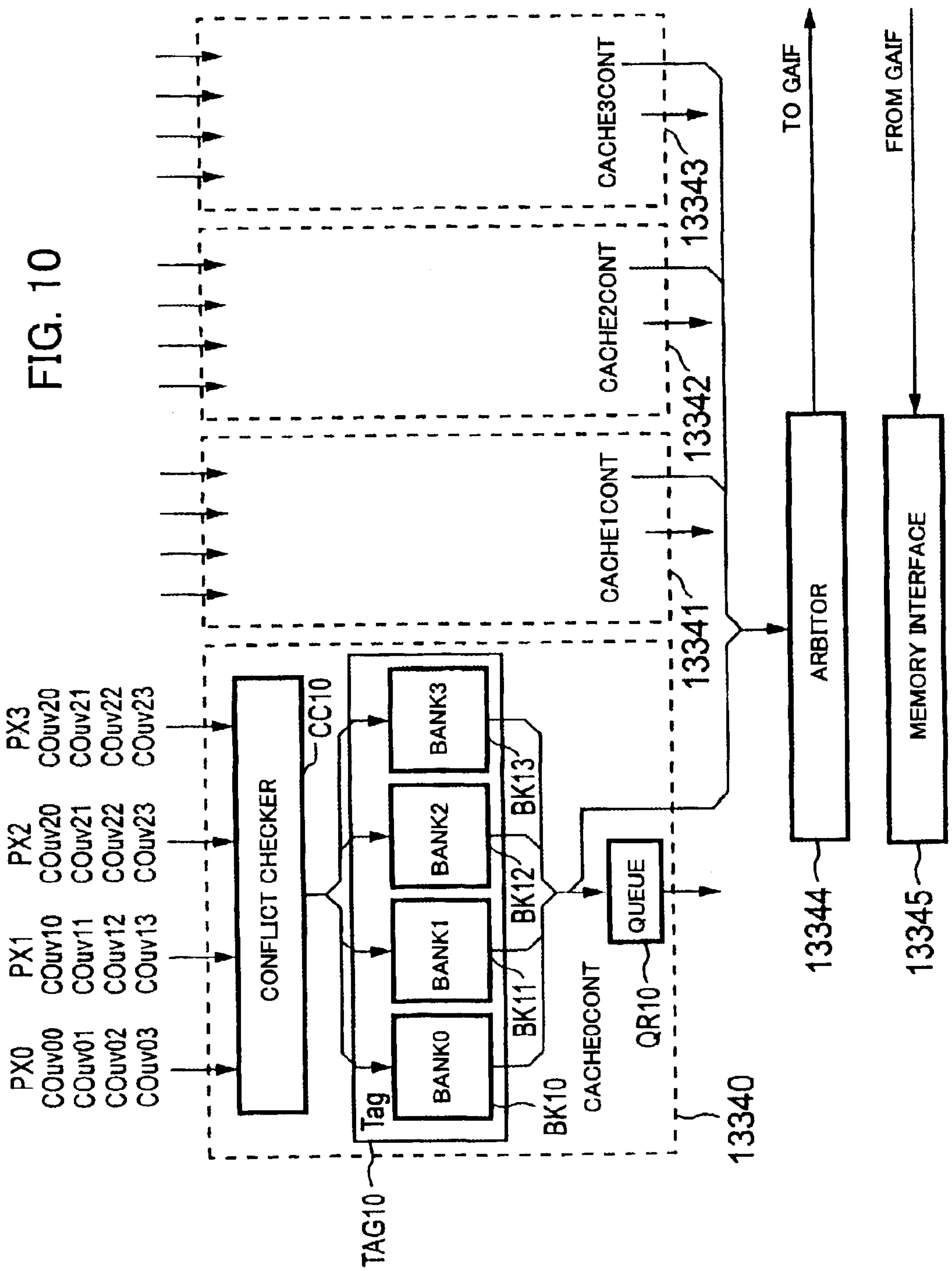
FIG. 10 is a block diagram of an example of the configuration of a memory controller of a local cache according to the present embodiment.

Further, FIG. 10 is a block diagram of an example of the configuration of the texture system of the memory controller 1334. This memory controller 1334 includes, as shown in FIG. 10, cache controllers 13340 to 13343 corresponding to the four caches CSH0 to CSH3, an arbitor 13344 for arbitrating the local cache fill requests output from the cache controllers 13340 to 13343 and outputting the same to the global interface 134{-0 to 3}, and a memory interface 13345 for receiving the global cache fill requests input via the global interface 134{-0 to 3} and controlling the data transfer.

Further, the cache controllers 13340 to 13343 have conflict checkers CC10 for receiving two-dimensional addresses COuv00 to COuv03, COuv10 to COuv03, COuv20 to COuv23, and COuv30 to COuv33 required when performing four neighbor interpolation with respect to the data corresponding to four pixels PX0 to PX3 and checking competition of and distributing addresses, tag circuits TAG10 for checking addresses distributed by the conflict checkers CC10 and deciding whether or not the data indicated by the addresses in the read only cache 1331 exist, and queue registers QR10. The tag circuit TAG10 has four tag memories BK10 to BK13 corresponding to the addressing relating to the interleaving of the banks mentioned later inside this and is stored in the read only cache 1331. It compares the addresses distributed by the conflict checker CC10 holding the address tags of the block data and the above address tags, sets flags indicating whether or not they coincide and the above addresses in the queue register QR10, and, when they do not coincide, transmits the above addresses to the arbitor 13344. The arbitor 13344 receives addresses transmitted from the cache controllers 13340 to 13343 and performs the arbitration work, selects addresses in accordance with the number of requests which can be simultaneously transmitted via the global interface (GAIF) 134, and outputs the same as the local cache fill request to the global interface (GAIF) 134. When the data is sent from the global cache 12 corresponding to the local cache fill request transmitted via the global interface (GAIF) 134, it is set in the reorder buffer 1333. The cache controllers 13340 to 13343 check the flags at the head of the queue register QRL0 and, when flags indicating coincidence are set, read the data of the read only cache 1331 based on the addresses at the head of the queue register QRL0 and give the same to the processing unit 131. On the other hand, where flags indicating coincidence are not set, when the corresponding data are set in the order buffer 1333, they read the same from the reorder buffer 1333, update the read only cache 1331 by the block data based on the addresses of the queue register QRL0, and output the same to the processing unit 131.

Next, an explanation will be given of the memory capacities of the DRAM serving as the memory module, local caches, and the global cache. The relationship of the memory capacities is naturally DRAM>global cache>local caches, but the ratio depends upon the application. The cache block size corresponds to the size of data read from the lower level memory at the time of a cache fill. As a characteristic of a DRAM, the point that the performance is lowered at the time of random access, but continuous access of data belonging to the same row is fast can be mentioned.

For performance, the global cache preferably performs continuous access for reading data from the DRAM. Accordingly, the size of the cache block is set large. For example, the cache block of the global cache can be set to a block size of one row's of the DRAM macro.

On the other hand, in the case of a local cache, when the block size is enlarged, even if put into a cache, the ratio of the unused data increases and, since the lower significant level is the global cache and not the DRAM, there is no need for continuous access, so the block size is set small. The block size of the local cache is suitably a value near the size of the rectangular area of the memory interleave. In the case of the present embodiment, it is set to the amount of 4×4 pixels, that is, 512 bits.

Next, texture compression will be explained. A plurality of strings of texture data are required for processing one pixel, so the texture read band width frequently becomes a bottleneck, but this is frequently mitigated by adopting the method of compressing the texture. There are various compression methods. In the case of a method able to compress/expand data in units of small rectangular areas such as 4×4 pixels, preferably the data compressed as it is placed in the global cache and the data after expansion is placed in the local caches.

Next, an explanation will be given of a specific example of the configuration of the processing units 131-0 to 131-3 of the local modules 13-0 to 13-3.

Figure 11:
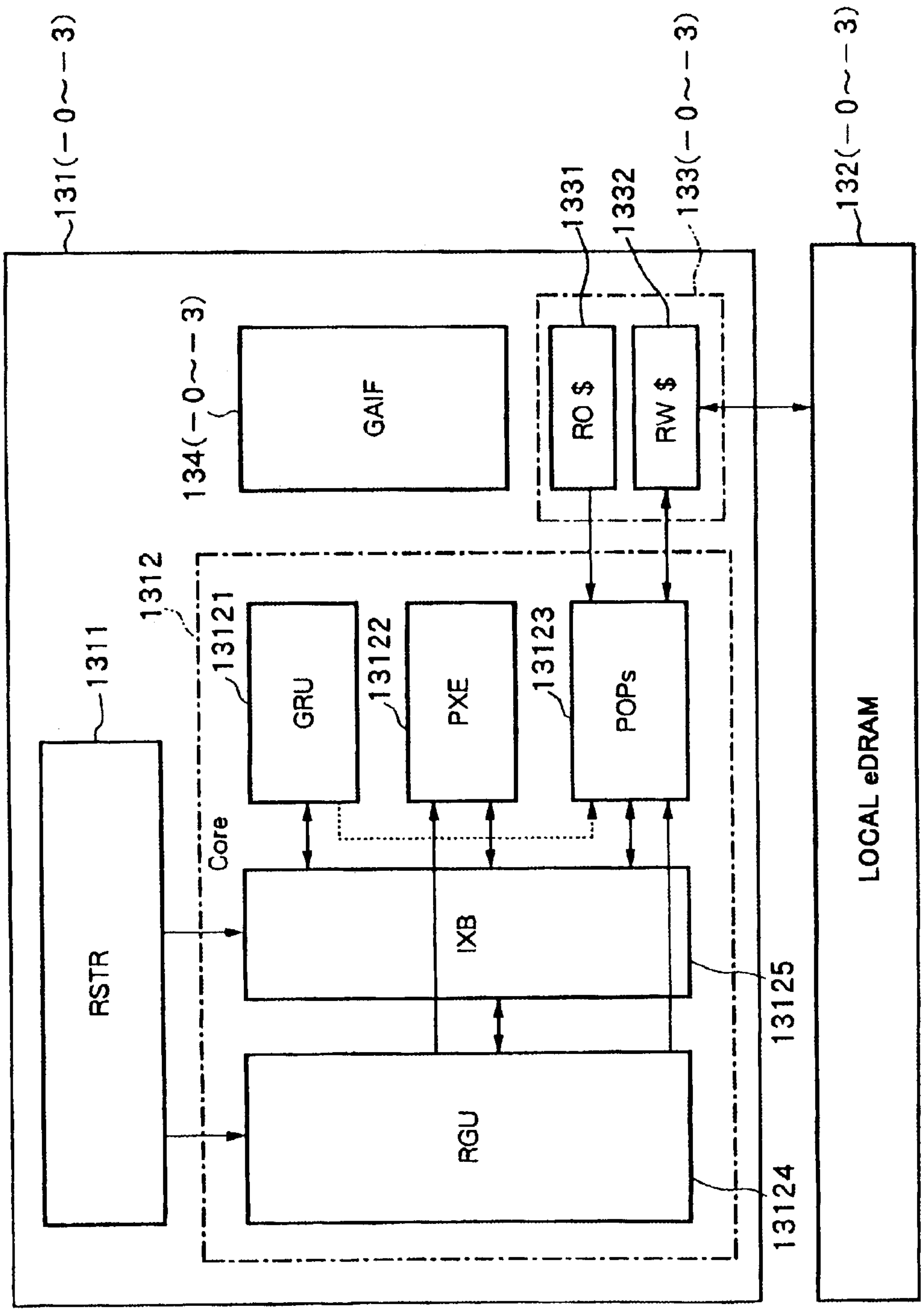
FIG. 11 is a block diagram of a specific example of the configuration of a processing unit of a local module according to the present embodiment.

FIG. 11 is a block diagram of a specific example of the configuration of a processing unit of a local module according to the present embodiment.

The processing unit 131(-0 to -3) of the local module 13(-0 to -3) has, as shown in FIG. 11, a rasterizer (RSTR) 1311 and a core 1312. Among these components, the operation processing portion for realizing the present architecture is the core 1312. The core 1312 is supplied with various types of data for the graphics processing and image processing such as the address and coordinates by the rasterizer 1311.

The rasterizer 1311 receives the broadcasted parameter data from the global module 12 in the case of the graphics processing, decides whether or not for example a triangle is the area which it is in charge of, and, when it is in charge of the area, performs rasterization based on the input triangle vertex data and supplies the generated pixel data to the core 1312. The pixel data generated at the rasterizer 1311 includes various types of data such as window coordinates (X, Y, Z), primary colors (PC) (Rp, Gp, Bp, Ap), secondary colors (SC) (Rs, Gs, Bs, As), a fog coefficient (f), texture coordinates, normal vector, line-of-sight vector, light vectors (V1*x*, V1*y*, V1*z*) and (V2*x*, V2*y*, V2*z*), etc. Note that the supply line of the data from the rasterizer 1311 to the core 1312 is formed by for example a different interconnect than the supply line of the window coordinates (X, Y, Z) and the supply line of the other primary colors (Rp, Gp, Bp, Ap), secondary colors (Rs, Gs, Bs, As), fog coefficient (f), and texture coordinates (V1*x*, V1*y*, V1*z*) and (V2*x*, V2*y*, V2*z*).

The rasterizer 1311 receives as input the commands and the data required for generating a source address for reading image data from the memory module 132(-0 to -3) and a destination address for writing the image processing results, output from a not illustrated higher level device via for example the global module 12 in the case of image processing, for example the width of a search rectangular area, height data (Ws, Hs), and block size data (Wbk, Hbk), generates a source address (X1*s*, Y1*s*) and/or (X2*s*, Y2*s*) based on the input data, generates the destination address (Xd, Yd), and supplies the same to the core 1312. For the supply line of the data from the rasterizer 1311 to the core 1312 at the time of image processing, for example, joint use is made of the supply line of the window coordinates (X, Y, Z) at the time of the graphics processing for the destination address (Xd, Yd) and joint use is made of the supply line of the texture coordinates (V1*x*, V1*y*, V1*z*) and (V2*x*, V2*y*, V2*z*) for the source addresses (X1*s*, Y1*s*), (X2*s*, Y2*s*).

The core 1312 is an operation processing portion for realizing the present architecture. Various types of data are supplied to the core 1312 by the rasterizer 1311. The core 1312 has the following function units for performing operation processing with respect to the stream data. That is, the core 1312 has a graphics unit (GRU) 13121 as the first function unit, a pixel engine (PXE) 13122 as a third function unit, and a pixel operation processor (POP) group 13123 as a second function unit. The core 1312 can handle a variety of algorithms by switching the connection among these function units in accordance with for example a data flow graph (DFG). Further, the core 1312 has a register unit (RGU) 13124 and a crossbar circuit (interconnection X-Bar: IXB) 13125.

The graphics unit (GRU) 13121 is the function unit mounted by hard-wired logic for which addition of dedicated hardware is clearly advantageous when executing graphics processing. The graphics unit 13121 mounts functions relating to graphics processing such as perspective correction and MIPMAP level calculation.

The graphics unit 13121 receives as input the texture coordinates (V1*x*, V1*y*, V1*z*) supplied from the rasterizer 1311 via the crossbar circuit 13125 and the register unit (RGU) 13124 and/or texture coordinate (V2*x*, V2*y*, V2*z*) data supplied by the rasterizer 1311 or the pixel engine (PXE) 13122, corrects the perspective, calculates the MIPMAP level by calculating the LOD, selects the planes of a cube map, and calculates normalized texel coordinates (s, t) based on the input data, and outputs graphics data (st, t1, lod1) and/or (s2, t2, lod2) including for example the normalized texel coordinates (s, t) and LOD data (lod) to the pixel operation processor (POP) group 13123. Note that the output graphics data (st, t1, lod1) and (s2, t2, lod2) of the graphics unit 13121 are supplied through the crossbar circuit 13125 and the register unit (RGU) 13124 or directly supplied to the pixel operation processor (POP) group 13123 by another interconnect as indicated by a broken line in FIG. 11.

The pixel engine (PXE) 13122 serving as the third function unit is a function unit for stream data processing and has a plurality of operation processing elements inside. The pixel engine 13122 has a high degree of freedom of connection among operation processing elements in comparison with the pixel operation processor (POP) group 13123 and has a rich functions of the operation processing elements as well.

The pixel engine (PXE) 13122 is directly supplied with the information relating to the drawing object and the operation results in the pixel operation processor (POP) group 13123 without going through the crossbar circuit 13125, but going through the register unit (RGU) 13124, after being set in the desired FIFO register of the register unit (RGU) 13124 by for example the crossbar circuit 13125. The data input to the pixel engine (PXE) 13122 generally includes for example information relating to the surface of the object to be drawn (direction of plane, color, refractive index, texture, etc.), the information relating to the light abutting against the surface (incident direction, intensity, etc.), and past operation results (intermediate values of operations).

The pixel engine (PXE) 13122 is an operation unit having a plurality of operation processing elements and reconfigurable in operation path by for example control from the outside. It establishes an electric connection among internal operation processing elements so as to realize a desired operation and inputs data input via the register unit (RGU) 13124 to the data path of one series of operation processing elements formed by the operation processing elements and the electric connection network (interconnects) to perform operations and outputs the operation results.

Namely, the pixel engine 13122 has for example a plurality of reconfigurable data paths and connects the operation processing elements (adders, multipliers, multiplier/adders, etc.) by an electric connection network to configure an operation circuit comprising a plurality of operation processing elements. Further, the pixel engine 13122 can continuously input data to such a reconfigured operation circuit and perform the operations and can configure an operation circuit by using a connection network able to realize an operation expressed by for example a two-divided tree like a data flow graph (DFG) efficiently and with a small circuit scale.

Figure 12:
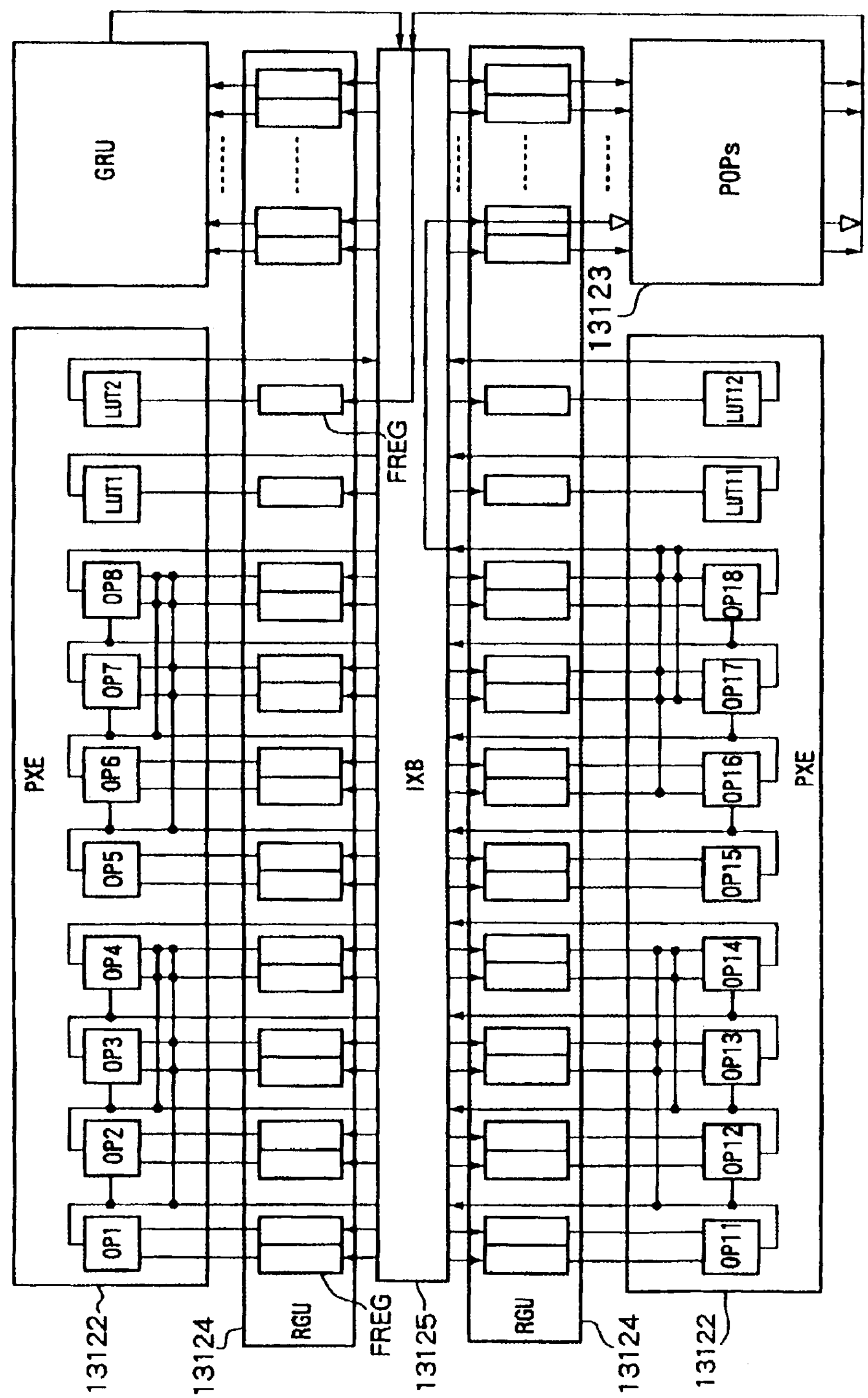
FIG. 12 is a view of an example of the configuration of a pixel engine according to the present embodiment and an example of connection with a register unit (RGU) and a crossbar circuit.

FIG. 12 is a view of an example of the configuration of the pixel engine (PXE) 13122 and an example of the connection with the register unit (RGU) 13124 and the crossbar circuit 13125.

Figure 15:
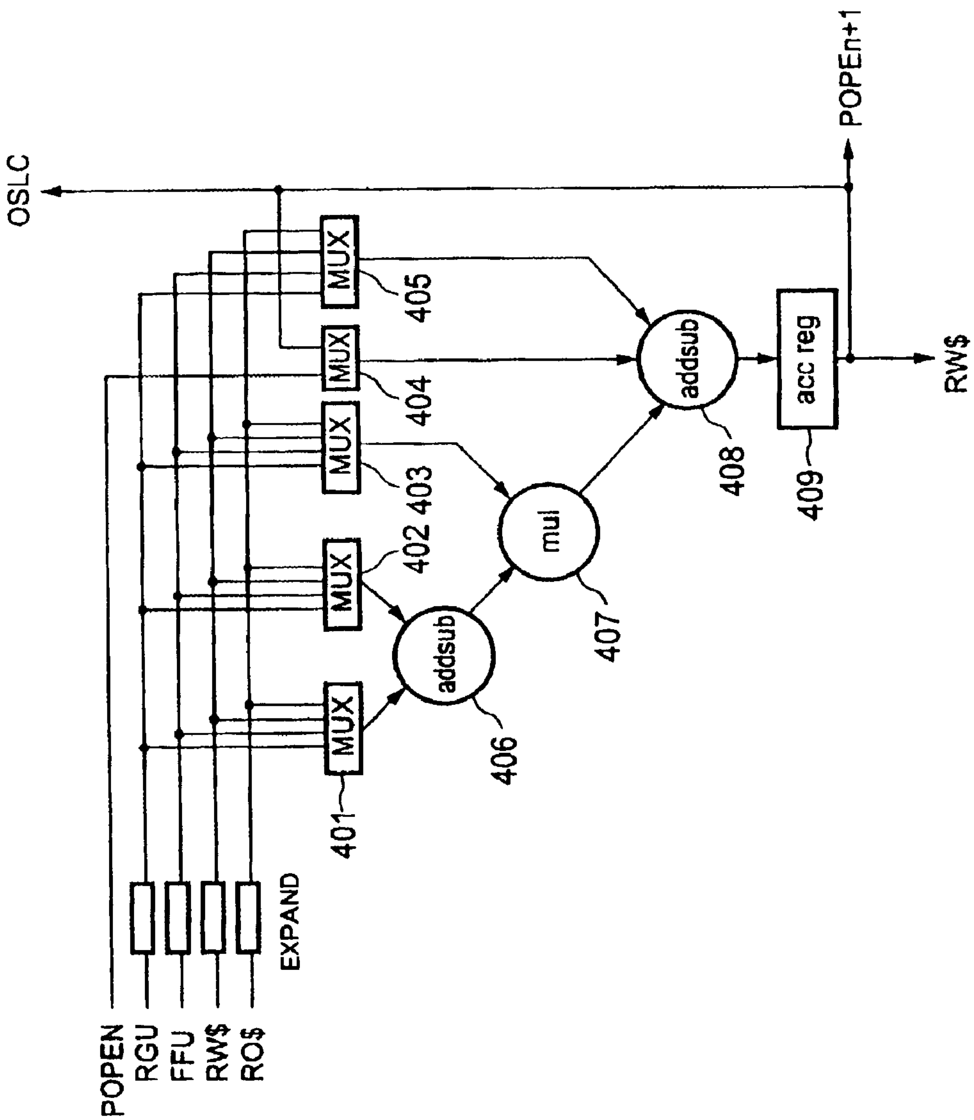
FIG. 15 is a circuit diagram of a specific example of the configuration of a pixel operation processing element (POPE) according to the present embodiment.

This pixel engine (PXE) 13122 has, as shown in FIG. 15, a plurality of (16 in the example of FIG. 12) operation processing elements OP1 to OP8 and OP11 to OP18 based two- or three-input MACs (multiply and accumulators) and one or more (four in the example of FIG. 12) lookup tables LUT1, LUT2, LUT11, and LUT12.

As shown in FIG. 12, the two inputs of each the operation processing elements OP1 to OP8 and OP11 to OP18 in the pixel engine (PXE) 13122 are directly connected to the FIFO (first-in first-out) register FREG of the register unit (RGU) 13124. One input of each of the lookup tables LUT1, LUT2, LUT11, and LUT12 is directly connected to the FIFO register FREG of the register unit (RGU) 13124 as well. Further, the outputs of the operation processing elements OP1 to OP8 and OP11 to OP18 and the lookup tables LUT1, LUT2, LUT11, and LUT12 are connected to the crossbar circuit 13125.

Further, in the example of FIG. 12, the output of the operation processing element OP1 is connected to two inputs of each the operation processing elements OP3 and OP4 and one input of the operation processing element OP2. The output of the operation processing element OP2 is connected to two inputs of the operation processing element OP4 and one input of the three-input operation processing element OP3 as well. Further, the output of the operation processing element OP3 is connected to one input of the three-input operation processing element OP4. The output of the operation processing element OP5 is connected to two inputs of each of the operation processing elements OP7 and OP8 and one input of the three-input operation processing element OP6. The output of the operation processing element OP6 is connected to two inputs of the operation processing element OP8 and one input of the three-input operation processing element OP7 as well. Further, the output of the operation processing element OP7 is connected to one input of the three-input operation processing element OP8. Further, the output of the operation processing element OP11 is connected to two inputs of each of the operation processing elements OP13 and OP14 and one input of the three-input operation processing element OP12. The output of the operation processing element OP12 is connected to two inputs of the operation processing element OP14 and one input of the three-input operation processing element OP13 as well. Further, the output of the operation processing element OP13 is connected to one input of the three-input operation processing element OP14. The output of the operation processing element OP15 is connected to two inputs of each of the operation processing elements OP17 and OP18 and one input of the three-input operation processing element OP16. The output of the operation processing element OP16 is connected to two inputs of the operation processing element OP18 and one input of the three-input operation processing element OP17 as well. Further, the output of the operation processing element OP17 is connected to one input of the three-input operation processing element OP18.

In this way, in the pixel engine (PXE) 13122 of FIG. 12, the output of the operation processing element OP1 is connected to the operation processing elements OP2, OP3, and OP4 by a forwarding path, so the operation processing elements OP2, OP3, and OP4 can refer to the output of the operation processing element OP1 as a source operand. The output of the operation processing element OP2 is connected to the operation processing elements OP3 and OP4 by the forwarding path, so the operation processing elements OP3 and OP4 can refer to the output of the operation processing element OP2 as the source operand. The output of the operation processing element OP3 is connected to the operation processing element OP4 by the forwarding path, so the operation processing element OP4 can refer to the output of the operation processing element OP3 as the source operand. The output of the operation processing element OP5 is connected to the operation processing elements OP6, OP7, and OP8 by the forwarding path, so the operation processing elements OP6, OP7, and OP8 can refer to the output of the operation processing element OP5 as the source operand. The output of the operation processing element OP6 is connected to the operation processing elements OP7 and OP8 by the forwarding path, so the operation processing elements OP7 and OP8 can refer to the output of the operation processing element OP6 as the source operand. The output of the operation processing element OP7 is connected to the operation processing element OP8 by the forwarding path, so the operation processing element OP8 can refer to the output of the operation processing element OP7 as the source operand. The output of the operation processing element OP11 is connected to the operation processing elements OP12, OP13, and OP14 by the forwarding path, aso the operation processing elements OP12, OP13, and OP14 can refer to the output of the operation processing element OP11 as the source operand as well. The output of the operation processing element OP12 is connected to the operation processing elements OP13 and OP14 by the forwarding path, so the operation processing elements OP13 and OP14 can refer to the output of the operation processing element OP12 as the source operand. The output of the operation processing element OP13 is connected to the operation processing element OP14 by the forwarding path, so the operation processing element OP14 can refer to the output of the operation processing element OP13 as the source operand. The output of the operation processing element OP15 is connected to the operation processing elements OP16, OP17, and OP18 by the forwarding path, so the operation processing elements OP16, OP17, and OP18 can refer to the output of the operation processing element OP15 as the source operand. The output of the operation processing element OP16 is connected to the operation processing elements OP17 and OP18 by the forwarding path, so the operation processing elements OP17 and OP18 can refer to the output of the operation processing element OP16 as the source operand. The output of the operation processing element OP17 is connected to the operation processing element OP18 by the forwarding path, so the operation processing element OP18 can refer to the output of the operation processing element OP17 as the source operand.

Further, the lookup tables LUT1, LUT2, LUT11, and LUT12 are for example RAM-LUTs which can be freely defined. In one context, up to L (L: number of tables which can be simultaneously referred to) can be referred to. The lookup tables LUT1, LUT2, LUT11, and LUT12 hold elementary functions, for example, sin/cos.

In the above configuration, regarding the number of connections between the pixel engine (PXE) 13122 and the register unit (RGU) 13124, the number of connections CN1 from the pixel engine (PXE) 13122 to the crossbar circuit (IBX) 13125 becomes as follows:

$$CN1 = (\text{Number of operation processing elements} + \text{number of simultaneously referable } LUTs) \times 1 \quad (1)$$

Further, the number of connection CN2 from the register unit (RGU) 13124 to the pixel engine (PXE) 13122 becomes as follows.

$$CN2 = \text{number of operation processing elements} \times 2 + \text{number of simultaneously referable } LUTs \times 1 \quad (2)$$

The pixel engine (PXE) 13122 having the above configuration performs operations such as pixel shader based on the operation result data (TR1, TG1, TB1, TA1) and (TR2, TG2, TB2, TA2) in the pixel operation processor (POP) group 13123 set in the desired FIFO register of the register unit (RGU) 13124 via the crossbar circuit 13125 and directly input from the FIFO register and the primary color (PC), secondary color (SC), and fog coefficient (F) set in the desired FIFO register of the register unit (RGU) 13124 by the rasterizer 1311 and directly input from the FIFO register at the time of for example graphics processing and finds the color data (FR1, FG1, FB1) and a blend value (FA1). The pixel engine (PXE) 13122 transfers this data (FR1, FG1, FB1, FA1) via the crossbar circuit 13125 and the register unit (RGU) 13124 to the predetermined pixel operation processor (POP) of the pixel operation processor (POP) group 13123 or separately provided write unit WU.

Figure 13:
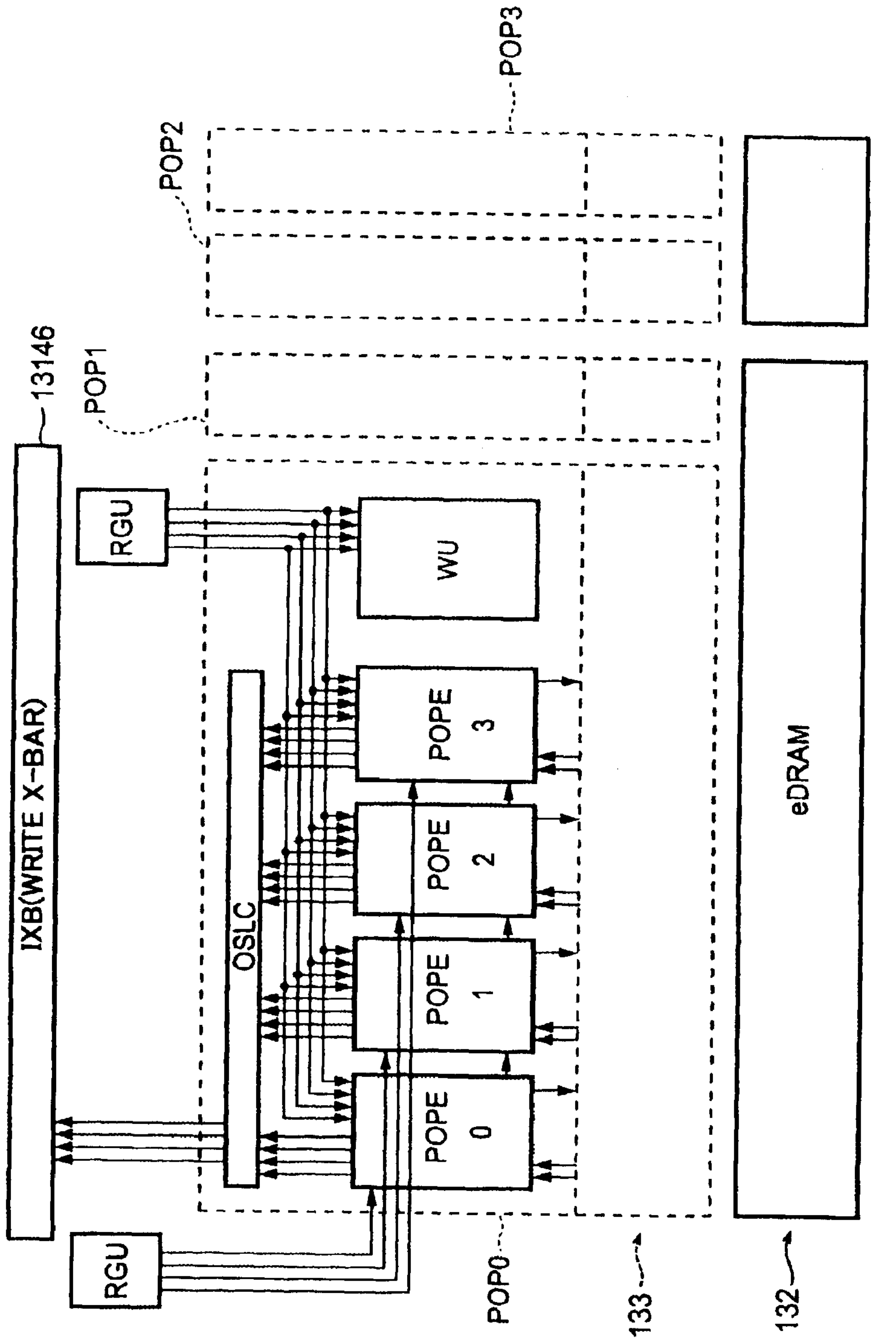
FIG. 13 is a view of an example of the configuration of a pixel operation processor (POP) group according to the present embodiment.

The pixel operation processor (POP) group 13123 has a plurality of pixel operation processors (POP) as function units for high parallel operation processing making use of the memory band width, for example, as shown in FIG. 13, four pixel operation processors POPO to POP3 in the present embodiment. Each pixel operation processor (POP) has a plurality of operation processing elements referred to as pixel operation processing elements (POPEs) arranged in parallel. Further, it has also an address generation function. The pixel operation processor (POP) group 13123 and the cache are connected with a wide band width and include an address generation function for memory access, so can supply stream data in an amount large enough to extract the operation capability of the operation processing element to the largest limit.

The pixel operation processor (POP) group 13123 performs for example the following processing at the time of graphics processing. For example, it calculates the (u, v) address for texture access based on the (s1, t1, lod1) and (s2, t2, lod2) values directly supplied from the graphics unit (GRU) 13121, calculates the (u, v) coordinates of four neighbors for four neighbor filtering based on the address data (ui, vi, lodi), that is, (u0, v0), (u1, v1), (u2, v2), and (u3, v3), supplies them to the memory controller MC, and reads the desired texel data from the memory module 132 through for example the read only cache RO$ to each pixel operation processing element (POPE). Further, the pixel operation processor (POP) group 13123 calculates the texture filter coefficient K based on the data (uf, vf, lodf) for generating the coefficient and supplies this to each pixel operation processing element (POPE). Then, each pixel operation processor (POP) of the pixel operation processor (POP) group 13123 finds the color data (TR, TG, TB) and the blend value (TA) and transfers (TR, TG, TB, TA) via the crossbar circuit 13125 and the register unit (RGU) 13124 to the pixel engine (PXE) 13122.

On the other hand, the pixel operation processor (POP) group 13123 performs for example the following processing at the time of image processing. The pixel operation processor (POP) group 13123 reads the image data stored in the memory module 132 via for example the read only cache RO$ and/or read write cache RW$ based on the source addresses (X1*s*, Y1*s*) and (X2*s*, Y2*s*) generated in for example the rasterizer 1311, set in the register unit (RGU) 13124, passing straight through the graphics unit (GRU) 13121, and directly supplied without going through the crossbar circuit 13125, performs predetermined operations with respect to the read data, and transfers the operation results via the crossbar circuit 13125 and the register unit (RGU) 13124 to the write unit WU.

Note that a further specific configuration of the pixel operation processor (POP) having the above function will be explained in detail later.

The register unit (RGU) 13124 is a register file of an FIFO structure for storing the stream data processed in each function unit in the core 1312. Further, when the data flow graph (DFG) must be divided into a plurality of sub-data flow graphs (DFGs) to execute operations in relation to the hardware resources, it acts also as an intermediate value storage buffer among the sub-data flow graphs (DFGs). As shown in FIG. 12, the outputs of the FIFO registers FREG in the register unit (RGU) 13124 and the input ports of the operation processing elements of the pixel engine (PXE) 13122 and pixel operation processor (POP) group 13123 as the function units are in a one-to-one correspondence.

The crossbar circuit 13125 realizes this connection switching so as to be able to handle a variety of algorithms by switching the connections among function units in accordance with the data flow graph (DFG) by the core 1312. As explained above, the outputs of the FIFO registers FREG in the register unit (RGU) 13124 and the input ports of the function units are in a one-to-one correspondence in a fixed manner, but the output ports of the function units and the inputs of the FIFO registers FREG in the register unit (RGU) 13124 are switched by the crossbar circuit 13125.

Figure 14:
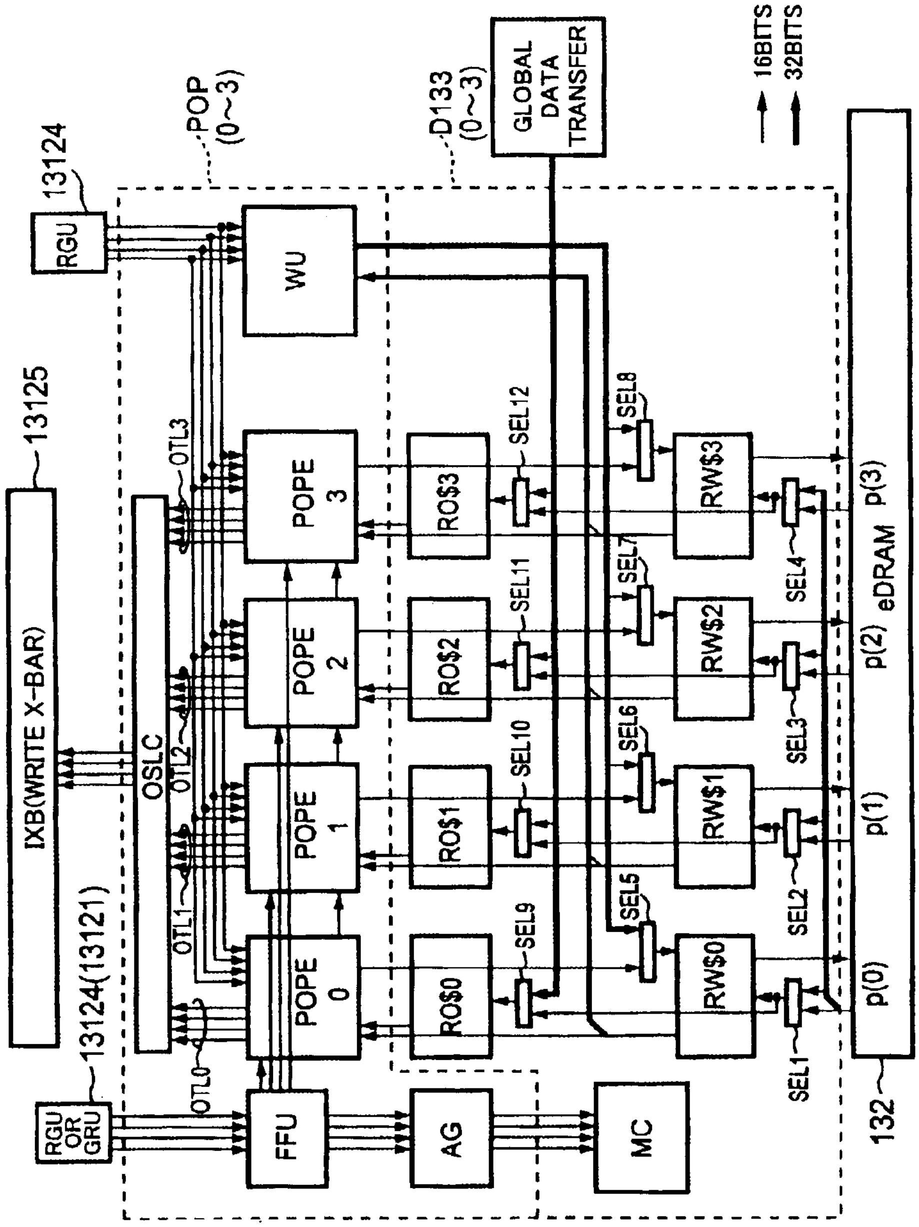
FIG. 14 is a view of a connection format between a pixel operation processor (POP) and a memory and an example of the configuration of a pixel operation processor (POP) according to the present embodiment.

FIG. 14 is a view of a connection format between the POP (pixel operation processor) and the memory and an example of the configuration of the pixel operation processor (POP). Note that, the example of FIG. 14 shows a case where each pixel operation processor POP0 to POP3 has four operation processing elements POePE0 to POPE3 arranged in parallel.

Further, in the present embodiment, the memory modules 132(-0 to -3) of the local modules 13(-0 to -3) store the image data, while the local modules 13(-0 to -3) have divided local caches D133(-0 to -3) between the pixel operation processor POP0 to POP3 and the memory module 132. In such a configuration, when performing parallel operation processing at the pixel level in the pixel operation processor POP0 to POP3, the image data is accessed in the following two ways. First is the method of directly reading the image data stored in the memory module 132 and then performing the operations. Second is the method of storing part of the data required for the operations among the image data stored in the memory modules 132 in the local caches 133, reading the data of the local caches 133, and performing the operations.

In the present embodiment, the second method is employed. The local caches 133 have read only caches RO$0 to RO$3 and read write caches RW$0 to RW$3 arranged corresponding to the pixel operation processing elements POPE0 to POPE3 of the pixel operation processors POP0 to POP3.

Further, the local caches 133 have, as shown in FIG. 14, selectors SELL to SEL12. The selectors SEL1 to SEL4 select either of the 32-bit width read data from the corresponding read line ports p(0) to p(3) of the memory module 132 or the read data from the other ports and output the same to the read write caches RW$0 to RW$3 and the selectors SEL9 to SEL12. The selector SEL5 selects either of the operation results of the pixel operation processing element POPE0 of the pixel operation processor (POP) or the processing results of the write unit WU and supplies the same to the read write cache RW$0. The selector SEL6 selects either of the operation results of the pixel operation processing element POPE1 of the pixel operation processor (POP) or the processing results of the write unit WU and supplies the same to the read write cache RW$1. The selector SEL7 selects either of the operation results of the pixel operation processing element POPE2 of the pixel operation processor (POP) or the processing results of the write unit WU and supplies the same to the read write cache RW$2. The selector SEL8 selects either of the operation results of the pixel operation processing element POPE3 of the pixel operation processor (POP) or the processing results of the write unit WU and supplies the same to the read write cache RW$3. The selector SEL9 selects either of the data from the selector SEL1 or the data transferred by the global module 12 and supplies the same to the read only cache RO$0. The selector SEL10 selects either of the data from the selector SEL2 or the data transferred by the global module 12 and supplies the same to the read only cache RO$1. The selector SEL11 selects either of the data from the selector SEL3 or the data transferred by the global module 12 and supplies the same to the read only cache RO$2. The selector SEL12 selects either of the data from the selector SEL4 or the data transferred by the global module 12 and supplies the same to the read only cache RO$3.

The pixel operation processors POP0 to POP3 have, in addition to four operation processing elements POPE0 to POPE3 arranged in parallel, write units WU as the fourth function unit, filter function units FFU, output selection circuits OSLC, and address generators AG.

The write unit WU performs, at the time of graphics processing, operations required for pixel writing of the graphics processing such as a blending, various tests, and logical operations based on the source data from the register unit (RGU) 13124, specifically the color data (RGB) and the blend value data (A), and the depth data (Z) and the destination color data (RGB) and the blend value data (A) from the read write cache RW$ and the depth data (Z), and writes back the operation results to the read write cache RW$. Further, the write unit WU stores, in the case of image processing, the data of the operation results by the pixel operation processor (POP) group 13123 at the destination address (Xd, Yd) directly input from for example the specific FIFO register of the register unit (RGU) 13124 in the memory module 132 via the read write cache RW$.

Note that FIG. 14 shows an example wherein a write unit WU is provided in each pixel operation processor (POP), but the invention can be configured in various other ways as well, for example, providing it in only one pixel operation processor (POP) and supplying the results to a plurality of divided local caches D133, providing one in two POPs and supplying the results to the corresponding divided local caches D133, or providing it separately from the pixel operation processors (POP).

The filter function unit FFU calculates the (u, v) addresses based on the operation parameters set in the FIFO registers of the register units (RGU) 13124 of the pixel operation processing elements POPE0 to POPE3, specifically the (s, t, lod) values directly supplied via the register unit (RGU) 13124 or directly from the graphics unit (GRU) 13121, outputs the address data (si, ti, lodi) to the address generator AG, calculates the texture filter coefficients K based on the data (sf, tf, lodf) for generating the coefficients, and supplies the calculated filter coefficients to the corresponding pixel operation processing elements POPE0 to POPE3.

The address generator AG calculates the (u, v) coordinates of four neighbors for performing four neighbor filtering based on the address data (si, ti, lodi) supplied by the filter function unit FFU, that is (u0, v0), (u1, v1), (u2, v2), and (u3, v3), and supplies the same to the memory controller MC.

Note that, when using the read only cache RO$ as a local cache of the data sent from the global bus, the memory controller MC calculates a physical address based on the (u, v) coordinates, finds data in the cache, transmits requests to the global bus, fills the read only cache RO$, etc., and makes the read only cache RO$ transmit data to a corresponding pixel operation processor (POP). When using the read write cache RW$ as a write cache to the memory module 132, the memory controller MC calculates a physical address based on the destination address (Xd, Yd) and controls write back to the cache and the memory module 132.

The pixel operation processing element POPE0 receives 32-bit width data read from the read only cache RO$0 or the read write cache RW$0 and the operation parameters (for example filter coefficients) from the filter function unit FFU, performs a predetermined operation (for example addition), and outputs the operation result to the later pixel operation processing element POPE1. Further, the pixel operation processing element POPE0 has an 8 bits×4 output line OTL0 for outputting this predetermined operation result to an output selection circuit OSLC. Further, the pixel operation processing element POPE0 receives data transferred through the crossbar circuit 13125 and set in the register unit (RGU) 13124, performs a predetermined operation, and outputs this operation result via the selector SEL5 of the divided local cache D133(0) to the read write cache RW$0.

The pixel operation processing element POPE1 receives 32-bit width data read from the read only cache RO$1 or the read write cache RW$1 and the operation parameters from the filter function unit FFU, performs a predetermined operation (for example addition), adds this operation result and the operation result from the pixel operation processing element POPE0, and outputs the result to the later pixel operation processing element POPE2. Further, the pixel operation processing element POPE1 has an 8 bits×4 output line OTL1 for outputting this predetermined operation result to the output selection circuit OSLC. Further, the pixel operation processing element POPE1 receives data transferred through the crossbar circuit 13125 and set in the register unit (RGU) 13124, performs a predetermined operation, and outputs this operation result via the selector SEL6 of the divided local cache D133(0) to the read write cache RW$1.

The pixel operation processing element POPE2 receives the data with the 32 bits width read from the read only cache RO$2 or the read write cache RW$2 and the operation parameters from the filter function unit FFU, performs the predetermined operation (for example addition) adds this operation result and the operation result by the pixel operation processing element POPE1 and outputs the same to the later pixel operation processing element POPE3. Further, the pixel operation processing element POPE2 has an output line OTL2 of 8 bits×4 for outputting this predetermined operation result to the output selection circuit OSLC. Further, the pixel operation processing element POPE2 receives data transferred through the crossbar circuit 13125 and set in the register unit (RGU) 13124, performs a predetermined operation, and outputs this operation result via the selector SEL7 of the divided local cache D133(0) to the read write cache RW$2.

The pixel operation processing element POPE3 receives 32-bit width data read from the read only cache RO$3 or the read write cache RW$3 and the operation parameters from the filter function unit FFU, performs a predetermined operation (for example addition), adds this operation result and the operation result from the pixel operation processing element POPE2, and outputs this operation result (sum in one pixel operation processor (POP)) to the output selection circuit OSLC by an 8 bits×4 output line OTL3. Further, the pixel operation processing element POPE3 receives data transferred through the crossbar circuit 13125 and set in the register unit (RGU) 13124, performs a predetermined operation, and outputs this operation result via the selector SEL8 of the divided local cache D133(0) to the read write cache RW$3.

FIG. 15 is a circuit diagram of a specific example of the configuration of a pixel operation processing element POPE (0 to 3) according to the present embodiment. The pixel operation processing element POPE has, as shown in FIG. 15, multiplexers (MUX) 401 to 405, an adder/subtractor (addsub) 406, a multiplier (mul) 407, an adder/subtractor (addsub) 408, and an addition register 409.

The multiplexer 401 selects one of the data from the register unit (RGU) 13124, operation parameters from the filter function unit FFU, and the data read from the read only cache RO$ (0 to 3) or read write cache RW$ (0 to 3) and supplies the same to the adder/subtractor 406.

The multiplexer 402 selects one of the data from the register unit (RGU) 13124 and the data read from the read only cache RO$ (0 to 3) or read write cache RW$ (0 to 3) and supplies the same to the adder/subtractor 406.

The multiplexer 403 selects one of the data from the register unit (RGU) 13124, operation parameters from the filter function unit FFU, and the data read from the read only cache RO$ (0 to 3) or read write cache RW$ (0 to 3) and supplies the same to the multiplier 407.

The multiplexer 404 selects either of the operation result of the previous pixel operation processing element POPE (0 to 2) or output data of the addition register 409 and supplies the same to the adder/subtractor 408.

The multiplexer 405 selects one of the data from the register unit (RGU) 13124, operation parameters from the filter function unit FFU, and the data read from the read only cache RO$ (0 to 3) or read write cache RW$ (0 to 3) and supplies the same to the adder/subtractor 408.

The adder/subtractor 406 adds (subtracts) the selected data of the multiplexer 401 and the selected data of the multiplexer 402 and outputs the result to the multiplier 407. The multiplier 407 multiplies the output data of the adder/subtractor 406 and the selected data of the multiplexer 403 and outputs the result to the adder/subtractor 408. The adder/subtractor 408 adds (subtracts) the output data of the multiplier 407, the selected data of the multiplexer 404, and the selected data of the multiplexer 405 and outputs the result to the addition register 409. Then, the data held in the addition register 409 is output as the operation result of each pixel operation processing element POPE to the output selection circuit OSLC and the later pixel operation processing element POPE (1 to 3).

The output selection circuit OSLC has a function of selecting any operation data among the operation data transferred through the output lines OTL0 to OTL3 of the pixel operation processing elements POPE0 to POPE3 and outputting the same to the crossbar circuit 13125. In the present embodiment, the output selection circuit OSLC is configured so as to select the operation data transferred through the output line OTL3 of the pixel operation processing element POPE3 for outputting the sum in one pixel operation processor (POP) and output the same to the crossbar circuit 13125. The operation data output to the crossbar circuit 13125 is set in the register unit 13124. This set data is directly supplied to the predetermined operation processing element of the pixel engine 13122 without going through the crossbar circuit 13125.

Figure 16:
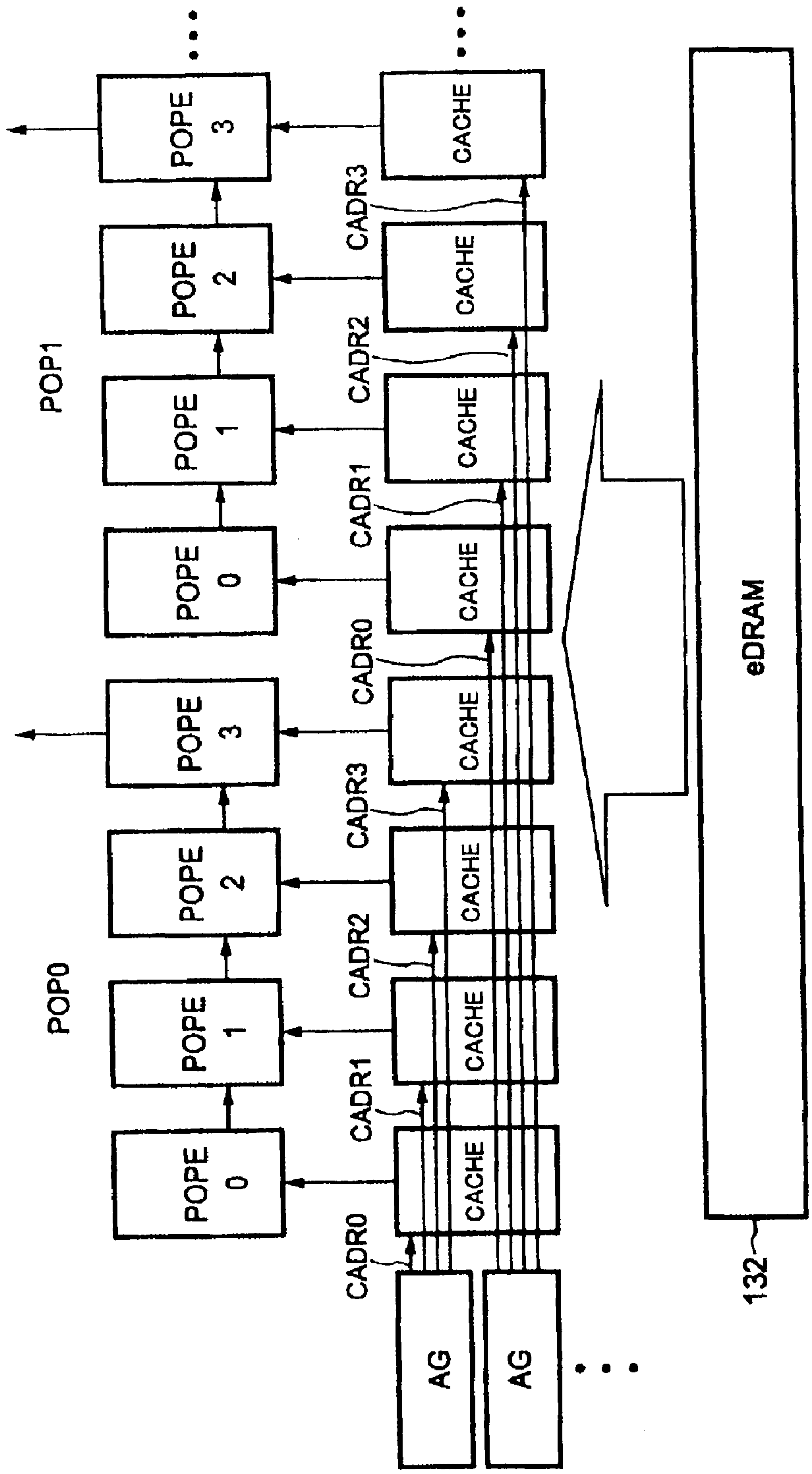
FIG. 16 is a view of a reading format of data from the memory to the cache and a reading format of data from the cache to each pixel operation processing element (POPE) according to the present embodiment.
Figure 17:
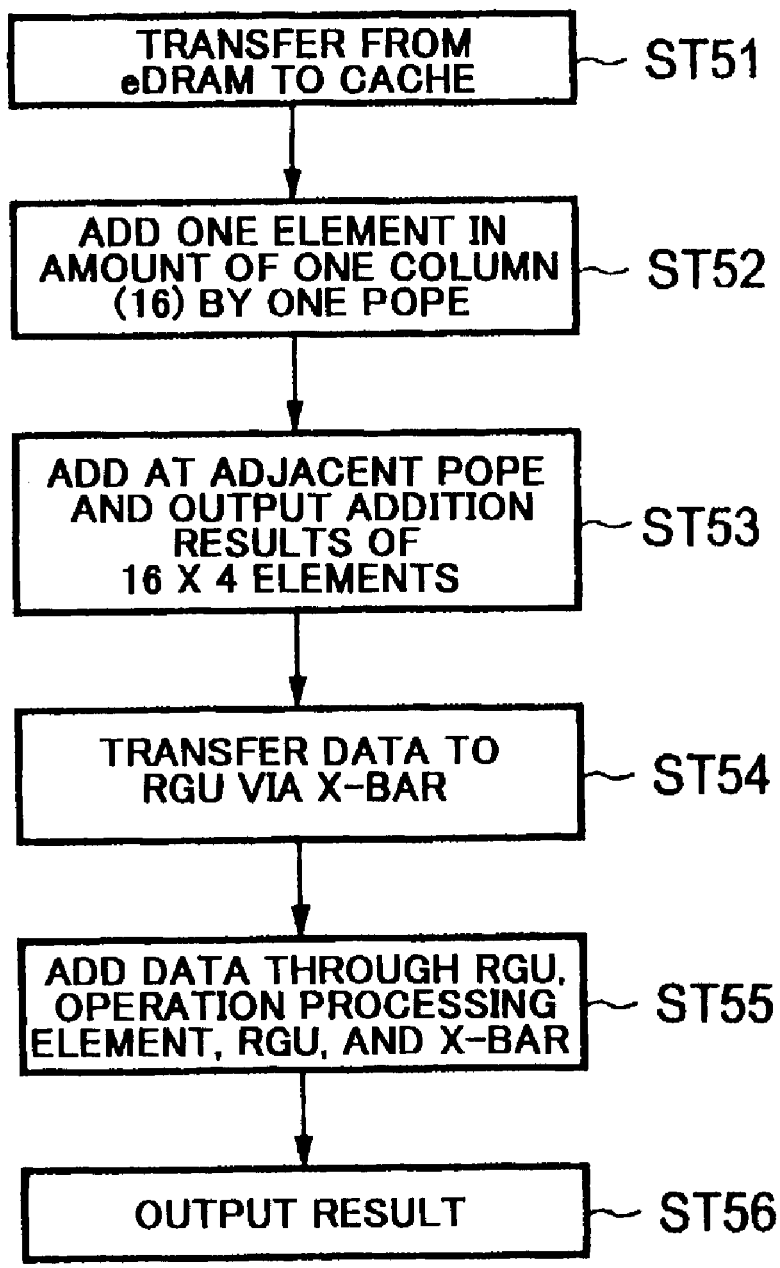
FIG. 17 is a flow chart for explaining an operation when performing an operation by a pixel operation processor (POP) group based on the data of the memory and further performing an operation by a pixel engine according to the present embodiment.

Since One column (four POPs) data is simultaneously transferred from the memory module 132 as shown in FIG. 16 and the read only caches RO$0 to RO$3 or the read write caches RW$0 to RW$3 of the divided local caches D133(0) to D133(3) are independently accessed, the address generator AG generates cache addresses CADR0 to CADR3 for reading the element data read in parallel from the ports p(0) to p(3) of the memory module 132 to the corresponding pixel operation processing elements POPE0 to POPE3 and supplies the same to the read only caches RO$0 to RO$3 or the read write caches RW$0 to RW$3. The address generator AG supplies cache addresses CADR0 to CADR3 to the read only caches RO$0 to RO#3 or the read write caches RW$0 to RW$ while shifting the timing so that, for example, the operation result OPR0 of the pixel operation processing element POPE0 is supplied to the pixel operation processing element POPE1 at the time when the operation of the pixel operation processing element POPE1 is terminated, the operation result (result obtained by adding the operation result OPR0 of the pixel operation processing element POPE0) OPR1 of the pixel operation processing element POPE1 is supplied to the pixel operation processing element POPE2 at the time when the operation of the pixel operation processing element POPE2 is terminated, and the operation result (result obtained by adding the operation result OPR1 of the pixel operation processing element POPE1) OPR2 of the pixel operation processing element POPE2 is supplied to the pixel operation processing element POPE3 at the time when the operation of the pixel operation processing element POPE3 is terminated. For example, when the number of element data supplied to the pixel operation processing elements POPE0 to POPE3 is the same and the element data are sequentially added by the pixel operation processing elements POPE0 to POPE3, the addresses are supplied while shifting the address supplying timing in order one address at a time. Due to this, error-free operation can be efficiently carried out. Namely, an improvement in the operation efficiency is achieved by the core 1312 according to the present embodiment.

Figures 18A, 18B, 18C:
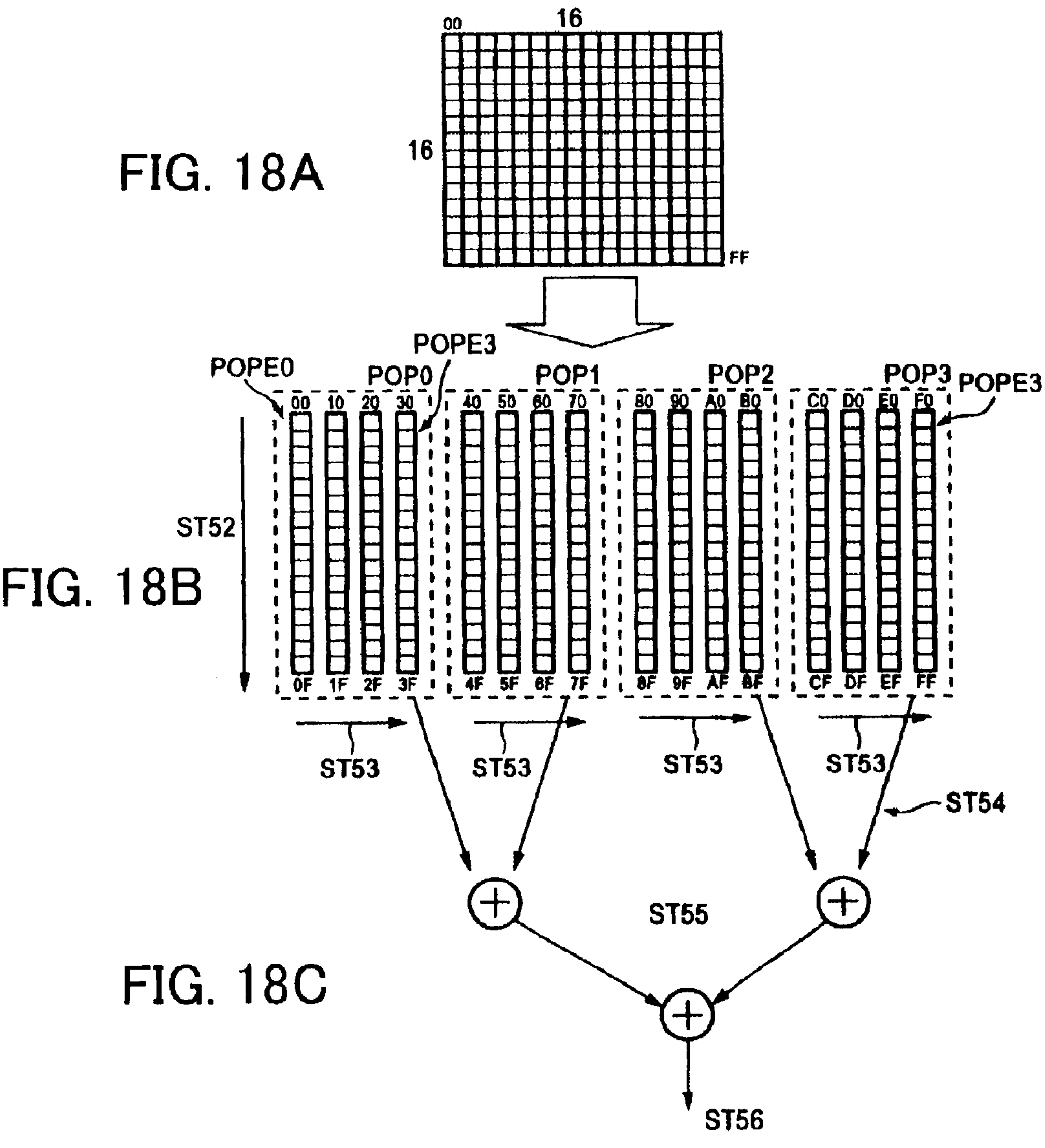
FIGS. 18A to 18C are views for explaining an operation when performing an operation by a pixel operation processor (POP) group based on the data of the memory and further performing an operation by a pixel engine according to the present embodiment.

Next, the operation where the pixel operation processor group 13123 performs operation processing based on the data of the memory and further performs operations at the pixel engine 13122 will be explained in relation to FIG. 17 to FIG. 20. Note that, here, as shown in FIG. 18A, the explanation will be given taking as an example a case where the operation is carried out on 16 columns of 16×16 element data consisting of 16 bits in a vertical direction and 16 bits in a lateral direction.

Step ST51

First, at step ST51, one column (four POPs) of data is simultaneously transferred from the memory module (eDRAM) 132 to the read only caches RO$0 to RO$3 of the local cache 133. Next, as shown in FIGS. 19A, 19B, 19E, and 19G, the address generator AG supplies cache addresses CADR0 to CADR3 to the pixel operation processing elements POPE0 to POPE3 in one pixel operation processor (POP) independently for each cache and shifted one address each in order. Due to this, 16 element data are read in order to the pixel operation processing elements POPE0 to POPE3 of the pixel operation processors POP0 to POP3.

For example, the cache addresses CADR00 to CADR0F are given in order to the read only cache RO$0 of the divided local cache D133(0), and one column's worth of data 00 to 0F are read out to the pixel operation processing element POPE0 of the pixel operation processor POP0 in accordance with this. Similarly, the cache addresses CADR10 to CADR1F are given in order to the read only cache RO$1 of the divided local cache D133(0), and one column's worth of data 10 to 1F are read out to the pixel operation processing element POPE1 of the pixel operation processor POP0 in accordance with this. The cache addresses CADR20 to CADR2F are given in order to the read only cache RO$2 of the divided local cache D133(0), and one column's worth of data 20 to 2F are read out to the pixel operation processing element POPE2 of the pixel operation processor POP0 in accordance with this. The cache addresses CADR30 to CADR3F are given in order to the read only cache RO$3 of the divided local cache D133(0), and one column's worth of data 30 to 3F are read out to the pixel operation processing element POPE3 of the pixel operation processor POP0 in accordance with this.

The cache addresses CADR40 to CADR4F are given in order to the read only cache RO$0 of the divided local cache D133(1), and one column's worth of data 40 to 4F are read out to the pixel operation processing element POPE0 of the pixel operation processor POP1 in accordance with this. The cache addresses CADR50 to CADR5F are given in order to the read only cache RO$1 of the divided local cache D133(1), and one column's worth of data 50 to 5F are read out to the pixel operation processing element POPE1 of the pixel operation processor POP1 in accordance with this as well. The cache addresses CADR60 to CADR6F are given in order to the read only cache RO$2 of the divided local cache D133(1), and one column's worth of data 60 to 6F are read out to the pixel operation processing element POPE2 of the pixel operation processor POP1 in accordance with this. The cache addresses CADR70 to CADR7F are given in order to the read only cache RO$3 of the divided local cache D133(1), and one column's worth of data 70 to 7F are read out to the pixel operation processing element POPE3 of the pixel operation processor POP1 in accordance with this.

The cache addresses CADR80 to CADR8F are given in order to the read only cache RO$0 of the divided local cache D133(2), and one column's worth of data 80 to 8F are read out to the pixel operation processing element POPE0 of the pixel operation processor POP2 in accordance with this. The cache addresses CADR90 to CADR9F are given in order to the read only cache RO$1 of the divided local cache D133(2), and one column's worth of data 90 to 9F are read out to the pixel operation processing element POPE1 of the pixel operation processor POP2 in accordance with this as well. The cache addresses CADRA0 to CADRAF are given in order to the read only cache RO$2 of the divided local cache D133(2), and one column's worth of data A0 to AF are read out to the pixel operation processing element POPE2 of the pixel operation processor POP2 in accordance with this. The cache addresses CADRB0 to CADRBF are given in order to the read only cache RO$3 of the divided local cache D133(2), and one column's worth of data B0 to BF are read out to the pixel operation processing element POPE3 of the pixel operation processor POP2 in accordance with this.

The cache addresses CADRC0 to CADRCF are given in order to the read only cache RO$0 of the divided local cache D133(3), and one column's worth of data C0 to CF are read out to the pixel operation processing element POPE0 of the pixel operation processor POP3 in accordance with this. The cache addresses CADRD0 to CADRDF are given in order to the read only cache RO$1 of the divided local cache D133(3), and one column's worth of data D0 to DF are read out to the pixel operation processing element POPE1 of the pixel operation processor POP3 in accordance with this as well. The cache addresses CADRE0 to CADREF are given in order to the read only cache RO$2 of the divided local cache D133(3), and one column's worth of data E0 to EF are read out to the pixel operation processing element POPE2 of the pixel operation processor POP3 in accordance with this. The cache addresses CADRF0 to CADRFF are given in order to the read only cache RO$3 of the divided local cache D133(3), and one column's worth of data F0 to FF are read out to the pixel operation processing element POPE3 of the pixel operation processor POP3 in accordance with this.

Step ST52

At step ST52, the pixel operation processing elements POPE0 to POPE3 of the pixel operation processors POP0 to POP3 add one column's worth (16) of elements. Specifically, the pixel operation processing element POPE0 of the pixel operation processor POP0, as shown in FIG. 19B, adds the data 00 to 0F in order and outputs the operation result OPR0 to the pixel operation processing element POPE1. The pixel operation processing element POPE1 of the pixel operation processor POP0, as shown in FIG. 19D, adds the data 10 to 1F in order. The pixel operation processing element POPE2 of the pixel operation processor POP0, as shown in FIG. 19F, adds the data 20 to 2F in order. The pixel operation processing element POPE3 of the pixel operation processor POP0, as shown in FIG. 19H, adds the data 30 to 3F in order. The same is performed in the other pixel operation processors POP1 to POP3.

Step ST53

At step ST53, the operation results of the pixel operation processing elements POPE0 to POPE3 of the pixel operation processors POP0 to POP3 are added, and an addition result of 16×4 elements is obtained. Specifically, as shown in FIGS. 19B and 19D, the operation result OPR0 of the pixel operation processing element POPE0 of the pixel operation processor POP0 is output to the pixel operation processing element POPE1. The pixel operation processing element POPE1 of the pixel operation processor POP0, as shown in FIGS. 19D and 19F, adds the operation result OPR0 of the pixel operation processing element POPE0 of the pixel operation processor POP0 to its own operation result and outputs the operation result OPR1 to the pixel operation processing element POP2. The pixel operation processing element POPE2 of the pixel operation processor POP0, as shown in FIGS. 19F and 19H, adds the operation result OPR1 of the pixel operation processing element POPE1 of the pixel operation processor POP0 to its own operation result and outputs the operation result OPR2 to the pixel operation processing element POPE3. Then, the pixel operation processing element POPE3 of the pixel operation processor POP0, as shown in FIG. 19H, adds the operation result OPR2 of the pixel operation processing element POPE2 of the pixel operation processor POP0 to its own operation result and outputs the operation result OPR3 to the output selection circuit OSLC. The same is performed at the other pixel operation processors POP1 to POP3.

Step ST54

Figure 20:
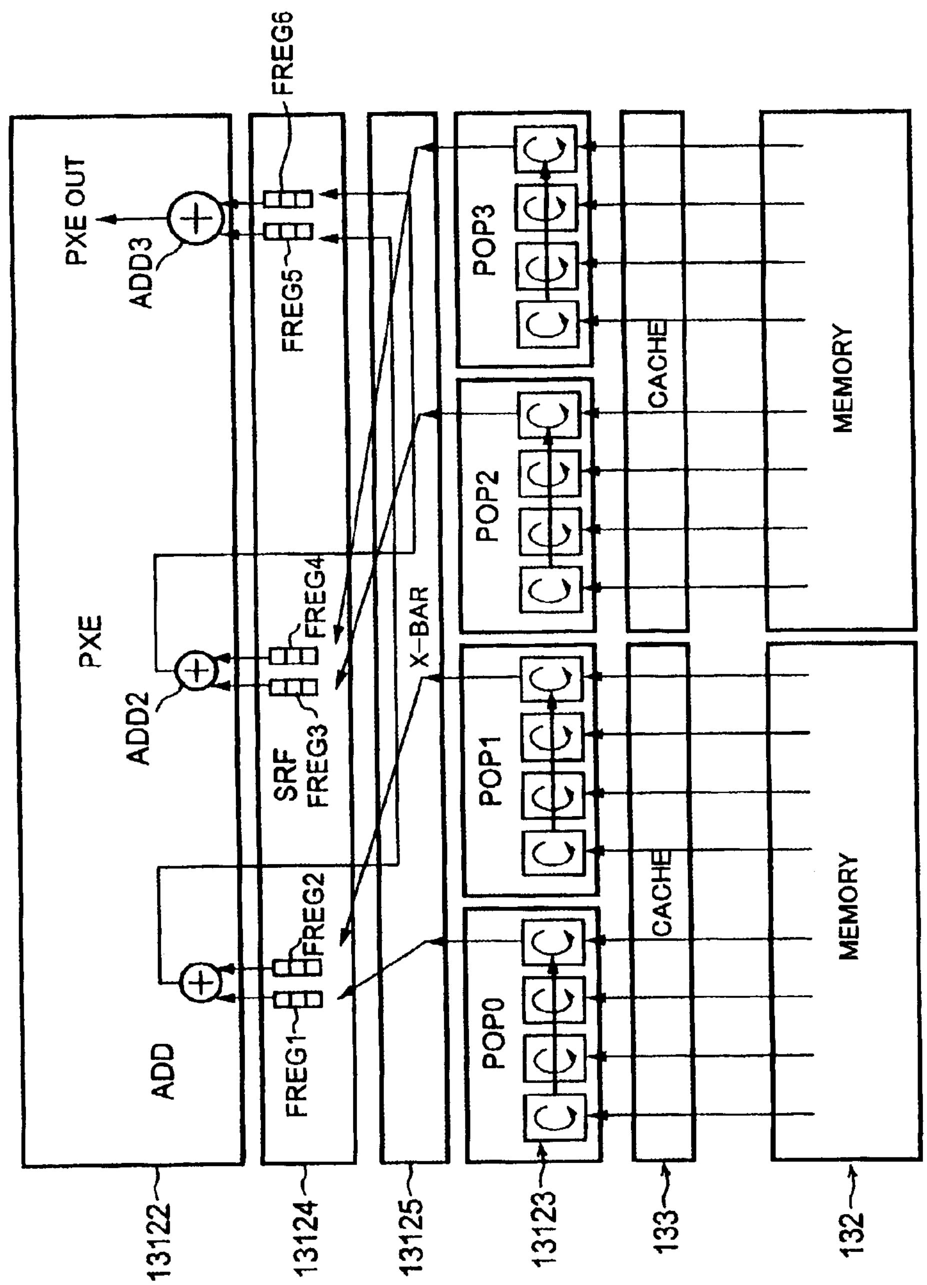
FIG. 20 is a block diagram for explaining the operation when performing an operation by a pixel operation processor (POP) group based on the data of the memory and further performing an operation by a pixel engine according to the present embodiment.

At step ST54, the overall operation result OPR3 is transferred from the output selection circuits OSLC of the pixel operation processors POP0 to POP3 via the crossbar circuit 13125 to the register unit (RGU) 13124. For example, as shown in FIG. 20, the overall operation result OPR3 of the pixel operation processing element POPE3 of the pixel operation processor POP0 is stored via the crossbar circuit 13125 in the FIFO register FREG1 of the register unit (RGU) 13124. The overall operation result OPR3 of the pixel operation processing element POPE3 of the pixel operation processor POP1 is stored via the crossbar circuit 13125 in the FIFO register FREG2 of the register unit (RGU) 13124. The overall operation result OPR3 of the pixel operation processing element POPE3 of the pixel operation processor POP2 is stored via the crossbar circuit 13125 in the FIFO register FREG3 of the register unit (RGU) 13124. The overall operation result OPR3 of the pixel operation processing element POPE3 of the pixel operation processor POP3 is stored via the crossbar circuit 13125 in the FIFO register FREG4 of the register unit (RGU) 13124.

Step ST55

At step ST55, the overall operation results of the pixel operation processor POP0 and pixel operation processor POP1 set in the FIFO registers FREG1 and FREG2 of the register unit (RGU) 13124 are added at the first adder ADD1 of the pixel engine (PXE) 13122, and this operation result is stored via the crossbar circuit 13125 in the FIFO register FREG5 of the register unit (RGU) 13124. Further, the overall operation results of the pixel operation processor POP2 and pixel operation processor POP3 set in the FIFO registers FREG3 and FREG4 of the register unit (RGU) 13124 are added at the second adder ADD2 of the pixel engine (PXE) 13122, and this operation result is stored via the crossbar circuit 13125 in the FIFO register FREG6 of the register unit (RGU) 13124. Then, the operation results of the first and second adders ADD1 and ADD2 set in the FIFO registers FREG5 and FREG6 of the register unit (RGU) 13124 are added at a third adder ADD3 of the pixel engine (PXE) 13122.

Step ST56

At step ST56, as shown in FIG. 19P, the addition result of the third adder ADD3 of the pixel engine (PXE) 13122 is output as one series of operation results.

Figure 21:
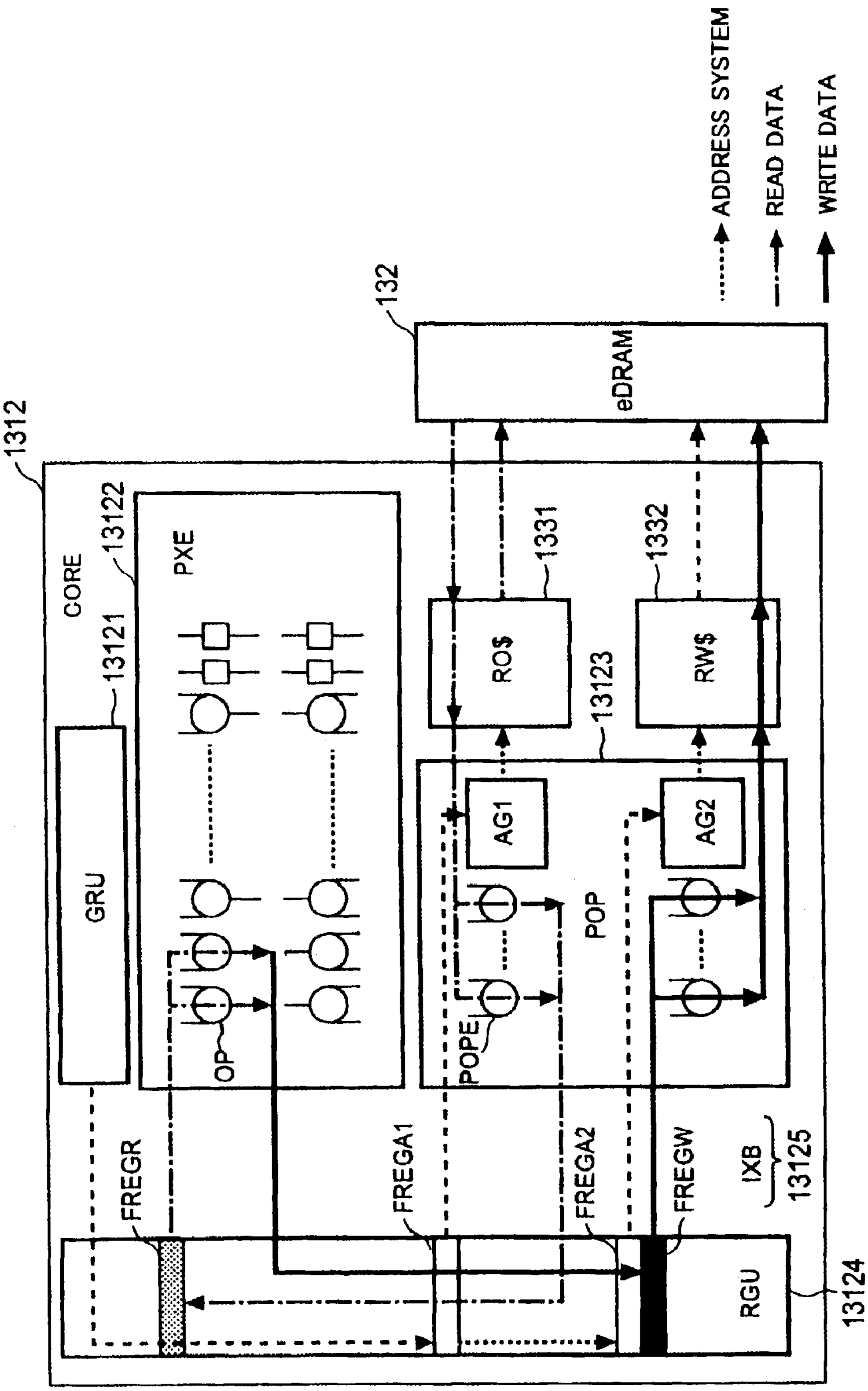
FIG. 21 is a view summarizing an operation including a pixel engine (PXE) of a core, a pixel operation processor (POP), a register unit (RGU), and a memory portion in a processing unit according to the present embodiment.

FIG. 21 is a summary view of the operation including the pixel engine (PXE) 13122, pixel operation processor (POP) group 13123, register unit (RGU) 13124, and the memory portion of the core in the processing unit according to the present embodiment.

In FIG. 21, the broken line indicates the flow of the address system data, a one-dotted chain line indicates the flow of the read data, and a solid line indicates the flow of the write data. Further, in the register unit (RGU) 13124, FREGA1 and FREGA2 indicate FIFO registers used in the address system, FREGR indicates an FIFO register used for the read data, and FREGW indicates an FIFO register used for the write data.

In the example of FIG. 21, for example source (reading use) address data generated by the rasterizer 1311 is set via the crossbar circuit 13125 in the FIFO registers FREGA1 and FREGA2 of the register unit (RGU) 13124. Then, the address data set in the FIFO register FREGA1 is directly supplied to the address generator AG1 of the pixel operation processor (POP) 13123 without going through for example the crossbar circuit 13125. The address of the data to be read is generated at the address generator AG1, and the desired data read out from the memory module 132 to the read only cache 1331 based on this is supplied to each operation processing element (POPE) of the pixel operation processor (POP) 13123.

The operation result of each operation processing element (POPE) of the pixel operation processor (POP) 13123 is set via the crossbar circuit 13125 in the FIFO register FREGR of the register unit (RGU) 13124. The data set in the FIFO register FREGR is directly supplied to each operation processing element OP of the pixel engine (PXE) 13122 without going through the crossbar circuit 13125. Then, the operation result of each operation processing element OP of the pixel engine (PXE) 13122 is set via the crossbar circuit 13125 in the FIFO register FREGW of the register unit (RGU) 13124. The data set in the FIFO register FREGW is supplied to each operation processing element (POPE) of the pixel operation processor (POP) 13123.

Further, the destination (writing use) address data generated by the rasterizer 1311 is set via the crossbar circuit 13125 in the FIFO register FREGA2 of the register unit (RGU) 13124. Then, the address data set in the FIFO register FREGA2 is directly supplied to the address generator AG2 of the pixel operation processor (POP) 13123 without going through the crossbar circuit 13125. The address of the data to be written is generated at the address generator AG2, and the operation result of each operation processing element (POPE) of the pixel operation processor (POP) 13123 is written into the read write cache 1332 based on this and further written into the memory module 132.

Note that, in the example of FIG. 21, the description was given as if the read write cache 1332 performed only writing, but it performs also reading by a similar operation to that of the case of the read only cache 1331.

Next, an explanation will be given of a specific operation in the case of the graphics processing and the image processing in the processing units 131(-0 to -3) having the above configuration in relation to the drawings.

Figure 22:
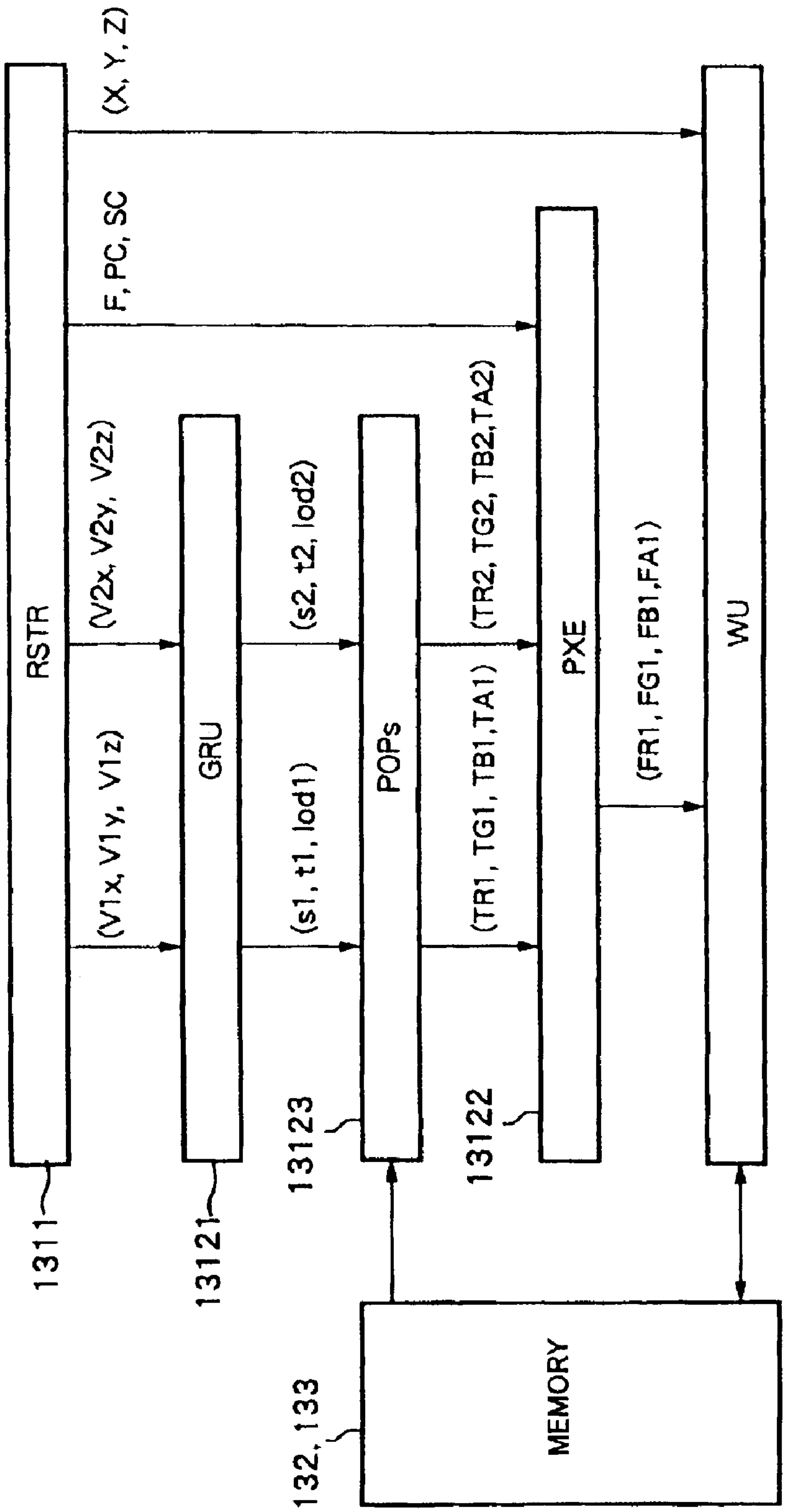
FIG. 22 is a view for explaining graphics processing when there is no dependent texture in the processing unit according to the present embodiment.

First, the graphics processing where there is no dependent texture will be explained in relation to FIG. 22 and FIG. 23.

In this case, by receiving the broadcasted parameter data from the global module 12, the rasterizer 1311 decides whether or not for example a triangle is an area which it is in charge of and, when it is in charge of the area, generates each pixel data based on the input triangle vertex data and supplies this to the core 1312. Specifically, the rasterizer 1311 generates various types of pixel data of window coordinates (X, Y, Z), primary colors (PC: Rp, Gp, Bp, Ap), secondary colors (SC: Rs, Gs, Bs, As), a fog coefficient (F), texture coordinates, and various vectors (V1*x*, V1*y*, V1*z*) and (V2*x*, V2*y*, V2*z*).

Then, it supplies the generated window coordinates (X, Y, Z) directly to the pixel operation processor (POP) group 13123 or to the separately provided write unit WU through a specific FIFO register of the register unit (RGU) 13124. Further, the rasterizer 1311 supplies two generated sets of texture coordinate data and various vectors (V1*x*, V1*y*, V1*z*) and (V2*x*, V2*y*, V2*z*) through the crossbar circuit 13125 and FIFO register of the register unit (RGU) 13124 to the graphics unit (GRU) 12121. Further, it supplies the generated primary colors (PC), secondary colors (SC), and the fog coefficient (F) through the crossbar circuit 13125 and the FIFO register of the register unit (RGU) 13124 to the pixel engine (PXE) 13122.

The graphics unit (GRU) 13121 corrects the perspective, calculates the MIPMAP level by calculating the LOD, selects the planes of the cube map, and calculates the normalized texel coordinates (s, t), based on the supplied texture coordinate data and various vectors (V1*x*, V1*y*, V1*z*) and (V2*x*, V2*y*, V2*z*). Then, two sets of data (s1, t1, lod1) and (s2, t2, lod2) including for example normalized texel coordinates (s, t) and LOD data (lod) generated at the graphics unit (GRU) 13121 are directly supplied to the pixel operation processor (POP) group 13123 not through for example the crossbar circuit 13125 but via individual interconnects.

Figure 23:
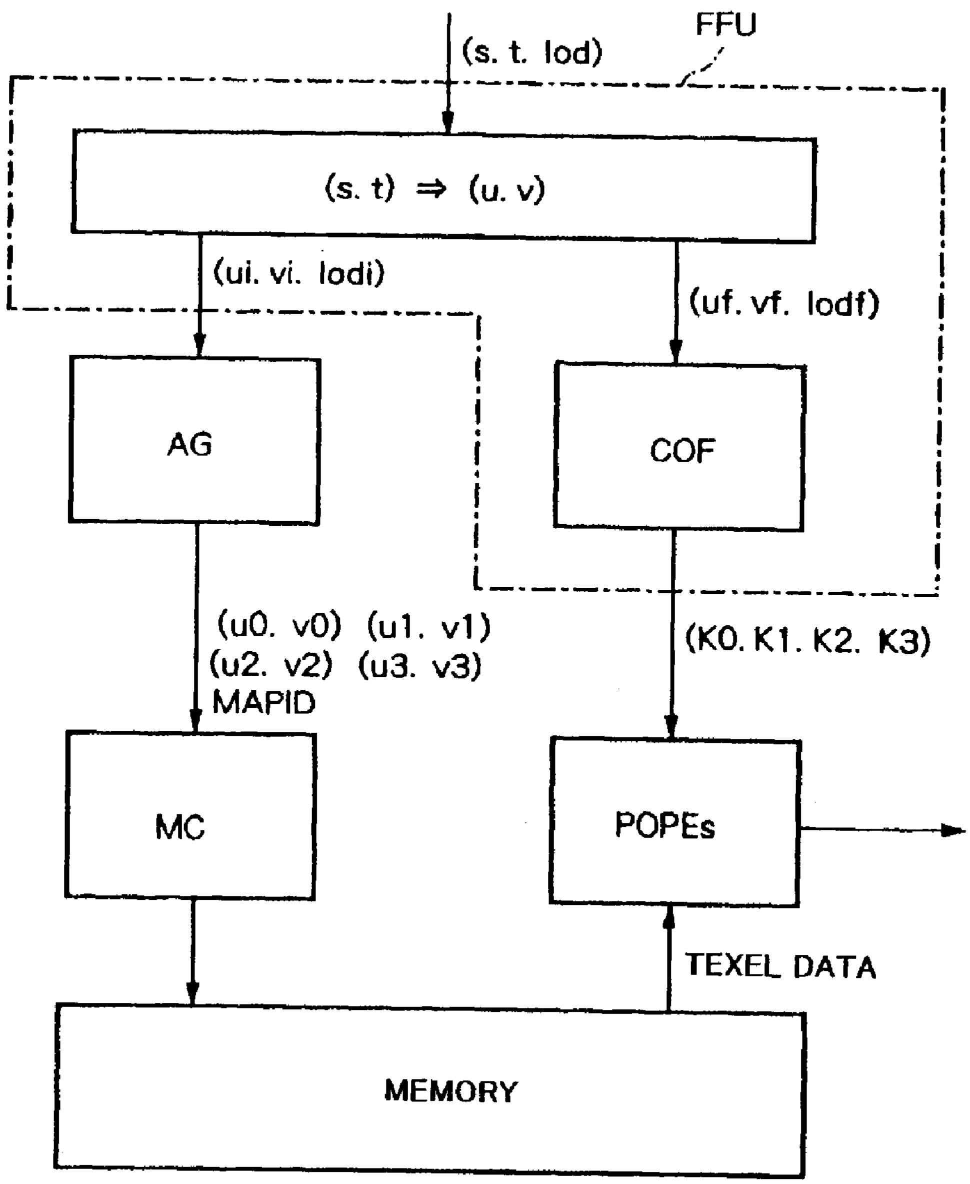
FIG. 23 is a view for explaining a specific operation of the pixel operation processor (POP) group of the graphics processing in a processing unit according to the present embodiment.

The pixel operation processor (POP) group 13123, as shown in FIG. 23, calculates (u, v) addresses for the texture access based on the (s1, t1, lod1) and (s2, t2, lod2) values directly supplied from the graphics unit (GRU) 13121 in the filter function unit FFU, supplies the address data (ui, vi, lodi) to the address generator AG, and supplies the data (uf, vf, lodf) to the coefficient generation portion COF for calculation of coefficients.

The address generator AG receives the address data (ui, vi, lodi), calculates the (u, v) coordinates of four neighbors for four neighbor filtering, that is, (u0, v0), (u1, v1), (u2, v2), and (u3, v3), and supplies the same to the memory controller MC. Due to this, the desired texel data is read out from the memory module 132 through for example the read only cache RO$ to each pixel operation processing element POPE of the pixel operation processor (POP) group 13123. Further, the coefficient generator COF receives the data (uf, vf, lodf), calculates the texture filter coefficients K(0 to 3), and supplies them to corresponding pixel operation processing element POPEs of the pixel operation processor (POP) group 13123. Then, each pixel operation processor (POP) of the pixel operation processor (POP) group 13123 finds the color data (TR, TG, TB) and the blend value (TA), transfers two sets of data (TR1, TG1, TB1, TA1) and (TR2, TG2, TB2, TA2) through the crossbar circuit 13125, sets them in a predetermined FIFO register of the register unit (RGU) 13124, and directly supplies the set data to the pixel engine (PXE) 13122 without going through the crossbar circuit 13125.

The pixel engine (PXE) 13122 performs the operation of for example a pixel shader based on the data (TR1, TG1, TB1, TA1) and (TR2, TG2, TB2, TA2) from the pixel operation processor (POP) group 13123 and the primary colors (PC), secondary colors (SC) and Fog coefficient (F) from the rasterizer 1311, finds the color data (FR1, FG1, FB1) and the blend value (FA1), and transfers this data (FR1, FG1, FB1, FA1) through the crossbar circuit 13125, sets it in the predetermined FIFO register of the register unit (RGU) 13124, and directly supplies this set data to the predetermined pixel operation processor (POP) of the pixel operation processor (POP) group 13123 or the separately provided write unit WU without going through the crossbar circuit 13125.

The write unit WU reads the destination color data (RGB) and the blend value data (A) and the depth data (Z) from the memory module 132 through for example the read write cache RW$ based on the window coordinates (X, Y, Z) from the rasterizer 1311. Then, the write unit WU performs an operation required for the pixel writing of the graphics processing such as a blending, various tests, and logical operations based on the data (FR1, FG1, FB1, FA1) from the pixel engine (PXE) 13122 and the destination color data (RGB) and the blend value data (A) and the depth data (Z) read from the memory module 132 through the read write cache RW$ and writes back the operation result to the read write cache RW$.

Figure 24:
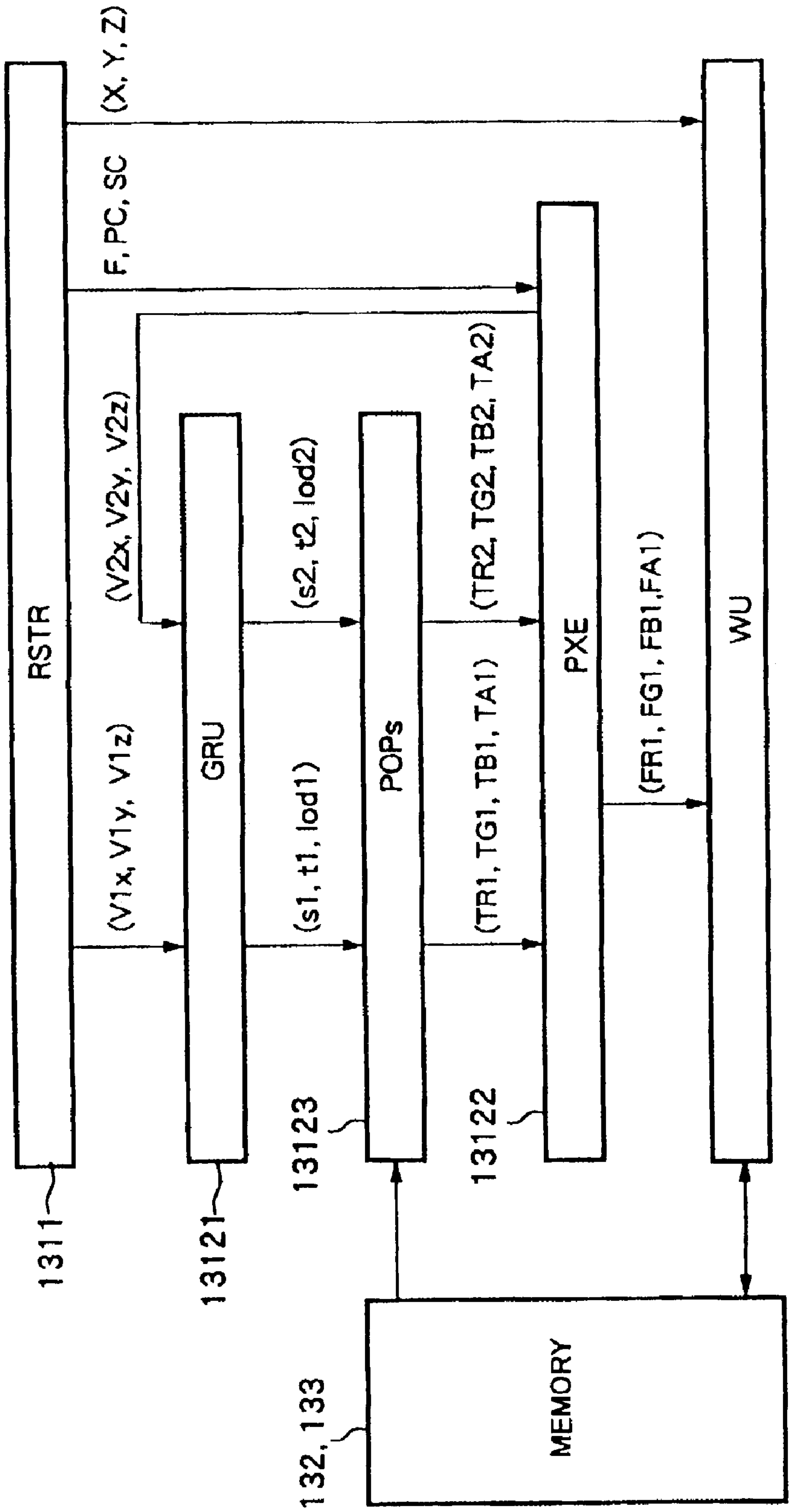
FIG. 24 is a view for explaining graphics processing when there is a dependent texture in a processing unit according to the present embodiment.

Next, graphics processing where there is a dependent texture will be explained in relation to FIG. 24 and FIG. 23.

In this case, the rasterizer 1311 generates various types of pixel data of the window coordinates (X, Y, Z), primary colors (PC: Rp, Gp, Bp, Ap), secondary colors (SC: Rs, Gs, Bs, As), a fog coefficient (F), and the texture coordinates (V1*x*, V1*y*, V1*z*).

Then, it directly supplies the generated window coordinates (X, Y, Z) through the specific FIFO register of the register unit (RGU) 13124 to the pixel operation processor (POP) group 13123. Further, it supplies the generated texture coordinates (V1*x*, V1*y*, V1*z*) through the crossbar circuit 13125 and the FIFO register of the register unit (RGU) 13124 to the graphics unit (GRU) 13121. Further, it supplies the generated primary colors (PC), the secondary colors (SC), and the fog coefficient (F) through the crossbar circuit 13125 and the FIFO register of the register unit (RGU) 13124 to the pixel engine (PXE) 13122.

The graphics unit (GRU) 13121 corrects the perspective, calculates the MIPMAP level by calculation of the LOD, selects the planes of the cube map, and calculates the normalized texel coordinates (s, t) based on the supplied texture coordinates (V1*x*, V1*y*, V1*z*) data. Then, it directly supplies one set of data (s1, t1, lod1) including for example the normalized texel coordinates (s, t) and the LOD data (lod) generated at the graphics unit (GRU) 13121 to the pixel operation processor (POP) group 13123 without going through for example the crossbar circuit 13125.

The pixel operation processor (POP) group 13123, as shown in FIG. 23, calculates the (u, v) address for texture access based on the (s1, t1, lod1) values directly supplied from the graphics unit (GRU) 13121 in the filter function unit FFU, supplies the address data (ui, vi, lodi) to the address generator AG, and supplies the data (uf, vf, lodf) to the coefficient generation portion COF for calculating the coefficients.

The address generator AG receives the address data (ui, vi, lodi), calculates the (u, v) coordinates of the four neighbors for four neighbor filtering, that is, (u0, v0), (u1, v1), (u2, v2), and (u3, v3), and supplies the same to the memory controller MC. Due to this, the desired texel data is read out from the memory module 132 through for example the read only cache RO$ to each pixel operation processing element POPE of the pixel operation processor (POP) group 13123. Further, the coefficient generator COF receives the data (uf, vf, lod), calculates the texture filter coefficients K(0 to 3), and supplies the same to each pixel operation processing element POPE of the pixel operation processor (POP) group 13123. Then, each pixel operation processor (POP) of the pixel operation processor (POP) group 13123 finds the color data (TR, TG, TB) and the blend value (TA), transfers the data (TR1, TG1, TB1, TA1) through the crossbar circuit 13125, sets it in the predetermined FIFO register of the register unit (RGU) 13124, and directly supplies this set data to the pixel engine (PXE) 13122 without going through the crossbar circuit 13125.

The pixel engine (PXE) 13122 performs for example the operation of a pixel shader based on the data (TR1, TG1, TB1, TA1) from the pixel operation processor (POP) group 13123 and the primary colors (PC), secondary colors (SC), and the fog coefficient (F) from the rasterizer 1311, generates the texture coordinates (V2*x*, V2*y*, V2*z*), and supplies the same via the crossbar circuit 13125 and the register unit (RGU) 13124 to the graphics unit (GRU) 13121.

The graphics unit (GRU) 13121 corrects the perspective, calculates the MIPMAP level by calculating the LOD, selects the planes of the cube map, and calculates the normalized texel coordinates (s, t) based on the supplied texture coordinates (V2*x*, V2*y*, V2*z*) data. Then, it directly supplies the data (s2, t2, lod2) including for example the normalized texel coordinates (s, t) and the LOD data (lod) generated at the graphics unit (GRU) 13121 to the pixel operation processor (POP) group 13123 without going through for example the crossbar circuit 13125.

The pixel operation processor (POP) group 13123, as shown in FIG. 23, calculates the (u, v) addresses for the texture access based on the (s2, t2, lod2) values directly supplied from the graphics unit (GRU) 13121 in the filter function unit FFU, supplies the address data (ui, vi, lodi) to the address generator AG, and supplies the data (uf, vf, lodf) to the coefficient generation portion COF for calculating the coefficients.

The address generator AG receives the address data (ui, vi, lodi), calculates the (u, v) coordinates of the four neighbors for four neighbor filtering, that is, (u0, v0), (u1, v1), (u2, v2), and (u3, v3), and supplies the same to the memory controller MC. Due to this, the desired texel data is read out from the memory module 132 through for example the read only cache RO$ to each pixel operation processing element POPE of the pixel operation processor (POP) group 13123. Further, the coefficient generator COF receives the data (uf, vf, lod), calculates the texture filter coefficients K(0 to 3), and supplies the same to each pixel operation processing element POPE of the pixel operation processor (POP) group 13123. Then, each pixel operation processor (POP) of the pixel operation processor (POP) group 13123 finds the color data (TR, TG, TB) and the blend value (TA), transfers the data (TR2, TG2, TB2, TA2) through the crossbar circuit 13125, sets it in the predetermined FIFO register of the register unit (RGU) 13124, and directly supplies this set data to the pixel engine (PXE) 13122 without going through the crossbar circuit 13125.

The pixel engine (PXE) 13122 performs for example a predetermined filtering operation such as four neighbor interpolation based on the data (TR2, TG2, TB2, TA2) from the pixel operation processor (POP) group 13123 and the primary colors (PC), secondary colors (SC), and fog coefficient (F) from the rasterizer 1311, finds the color data (FR1, FG1, FB1) and the blend value (FA1), transfers this data (FR1, FG1, FB1, FA1) through the crossbar circuit 13125, sets it in the predetermined FIFO register of the register unit (RGU) 13124, and directly supplies this set data to the predetermined pixel operation processor (POP) of the pixel operation processor (POP) group 13123 or the separately provided write unit WU without going through the crossbar circuit 13125.

The write unit WU reads the destination color data (RGB) and the blend value data (A) and the depth data (Z) from the memory module 132 through for example the read write cache RW$ based on the window coordinates (X, Y, Z) from the rasterizer 1311. Then, the write unit WU performs the operation required for the pixel writing of the graphics processing such as a blending, various tests, and logical operations based on the data (FR1, FG1, FB1, FA1) from the pixel engine (PXE) 13122 and the destination color data (RGB) and the blend value data (A) and the depth data (Z) read out from the memory module 132 through the read write cache RW$ and writes back the operation result to the read write cache RW$.

Next, an explanation will be given of the image processing.

First, an explanation will be given of the operation where performing summed absolute difference (SAD) processing as shown in FIG. 25 in relation to FIG. 26.

Figures 25A, 25B, 25C:
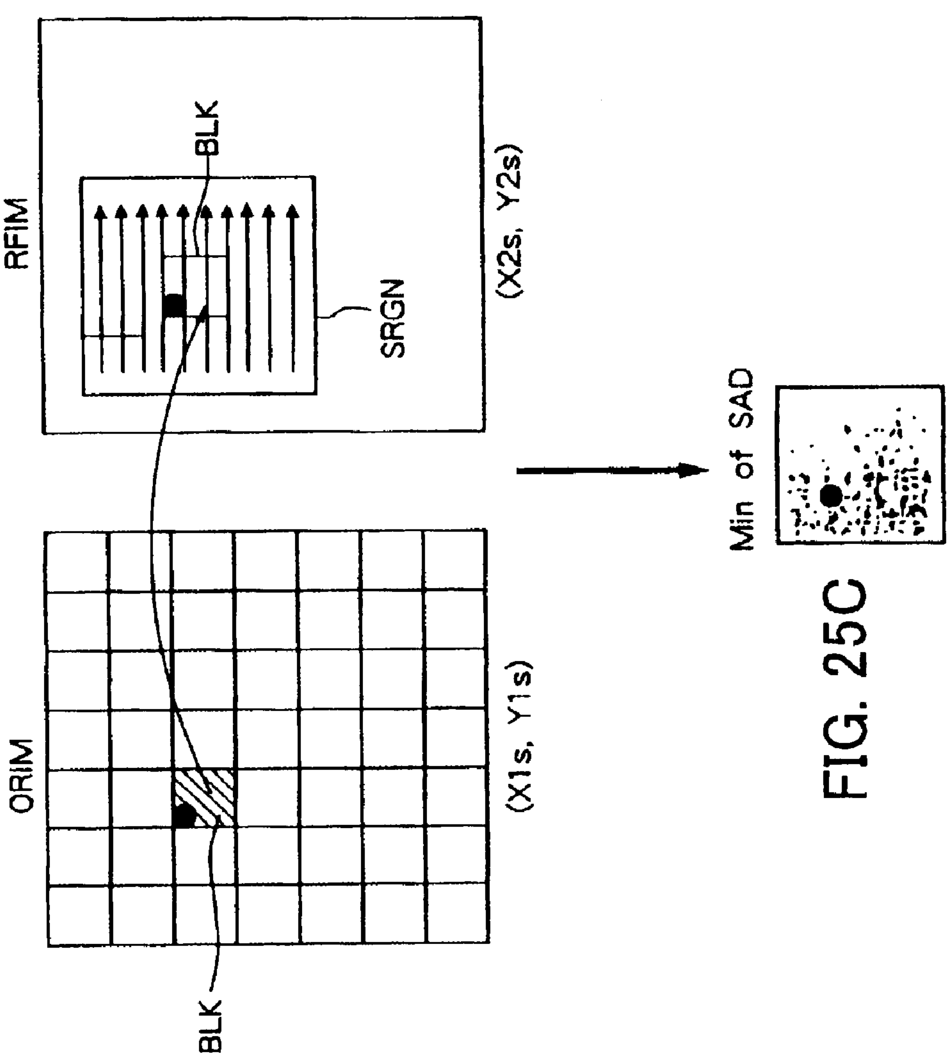
FIGS. 25A and 25B are views for explaining summed absolute difference (SAD) processing.
Figure 26:
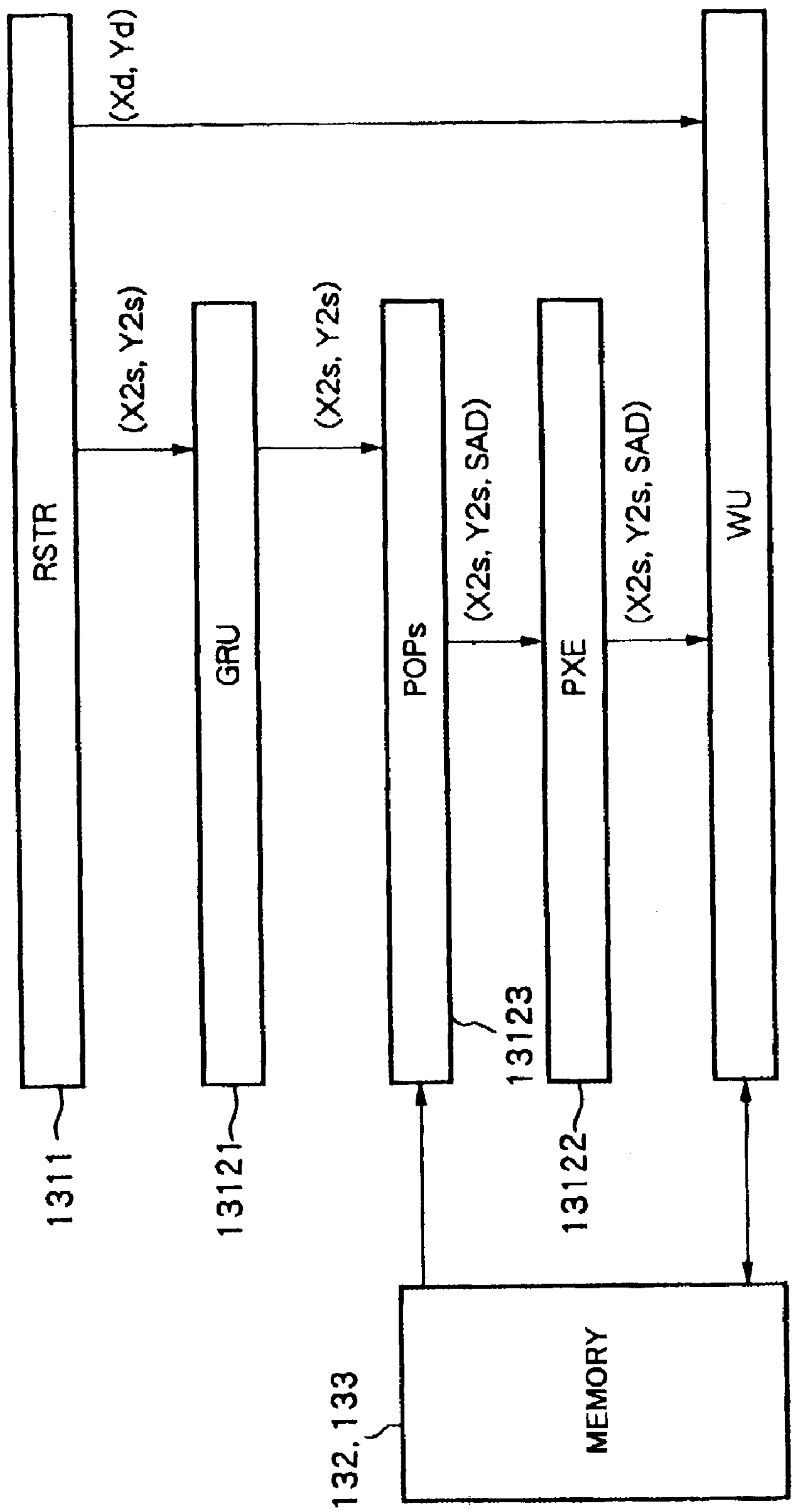
FIG. 26 is a view for explaining summed absolute difference (SAD) processing in a processing unit according to the present embodiment.

For one block (X1*s*, Y1*s*) of an original image ORIM as shown in FIG. 25A, the summed absolute difference (SAD) processing finds the summed absolute difference (SAD) in a corresponding block BLK while shifting inside of a search rectangular area SRGN of a reference image RFIM by one pixel at a time as shown in FIG. 25B. Among them, the location (X2*s*, y2*s*) of the block at which the summed absolute difference (SAD) becomes the minimum and the summed absolute difference (SAD) value are stored at (Xd, Yd) as shown in FIG. 25C. (X1*s*, Y1*s*) is set in the register in the pixel operation processor (POP) from a not illustrated higher position as the context.

In this case, the rasterizer 1311 has input to it the commands and the data required for the generation of the source address for reading the reference image data from the memory modules 132(-0 to -3) and the destination address for writing the image processing result, output from a not illustrated higher device via for example the global module 12, for example, the width and height (Ws, Hs) data and the block size (Wbk, Hbk) data of the search rectangular area SRGN. The rasterizer 1311 generates the source address (X2*s*, Y2*s*) of the reference image RFIM stored in the memory module 132 based on the input data, and generates the destination address (Xd, Yd) for storing the processing results in the memory module 132.

The generated destination address (Xd, Yd) is directly supplied to the write unit WU of the pixel operation processor (POP) group 13123 through the specific FIFO register of the register unit (RGU) 1312 by sharing the supply line of the window coordinates (X, Y, Z) at the time of the graphics processing. Further, the generated source address (X2*s*, Y2*s*) of the reference image RFIM is supplied to the graphics unit (GRU) 13121 through the crossbar circuit 13125 and the FIFO register of the register unit (RGU) 13124. The source address (X2*s*, Y2*s*) passes straight through the graphics unit (GRU) 13121 and is directly supplied to the pixel operation processor (POP) group 13123 not through for example the crossbar circuit 13125.

The pixel operation processor (POP) group 13123 reads the data of the original image ORIM and the reference image RFIM stored in the memory module 132 via for example the read only cache RO$ and the read write cache RW$ based on the supplied source addresses (X1*s*, Y1*s*) and (X2*s*, Y2*s*). Here, the coordinates of the original image ORIM are set in the register as the context. As the coordinates of the reference image RFIM, for example, coordinates of sub-blocks in the charge of four pixel operation processors (POPs) are given. Then, for one block (X1*s*, Y1*s*) of the original image ORIM, the pixel operation processor (POP) group 13123 finds the summed absolute difference (SAD) in the corresponding sub-block BLK at any time while shifting the inside of the search rectangular area SRGN of the reference image RFIM by one pixel at a time. Then, it transfers the location (X2*s*, y2*s*) of each sub-block and each summed absolute difference (SAD) value through the crossbar circuit 13125, sets them in a predetermined FIFO register of the register unit (RGU) 13124, and directly transfers this set data to the pixel engine (PXE) 13122 without going through the crossbar circuit 13125.

The pixel engine (PXE) 13122 totals the summed absolute difference (SAD) of the block as a whole, transfers the location (X2*s*, Y2*s*) of the block and the summed absolute difference (SAD) value through the crossbar circuit 13125, sets them in a predetermined FIFO register of the register unit (RGU) 13124, and directly transfers this set data to the write unit WU without going through the crossbar circuit 13125.

The write unit WU stores the location (X2*s*, Y2*s*) of the block and the summed absolute difference (SAD) value from the pixel engine (PXE) 13122 at the destination address (Xd, Yd) by the rasterizer 1311. In this case, it uses the function of for example hidden surface removal (Z comparison) to compare for example the summed absolute difference (SAD) value read out from the memory module 132 to the read write cache RW$ and the summed absolute difference (SAD) value from the pixel engine (PXE) 13122. Then, when the result of the comparison is that the summed absolute difference (SAD) value from the pixel engine (PXE) 13122 is smaller than the stored value, the location (X2*s*, y2*s*) of the block from the pixel engine (PXE) 13122 and the summed absolute difference (SAD) value are written at the destination address (Xd, Yd) via the read write cache RW$ (updated).

Next, an explanation will be given of an operation where performing convolution filtering as shown in FIG. 27 in relation to FIG. 28.

Figure 27A:
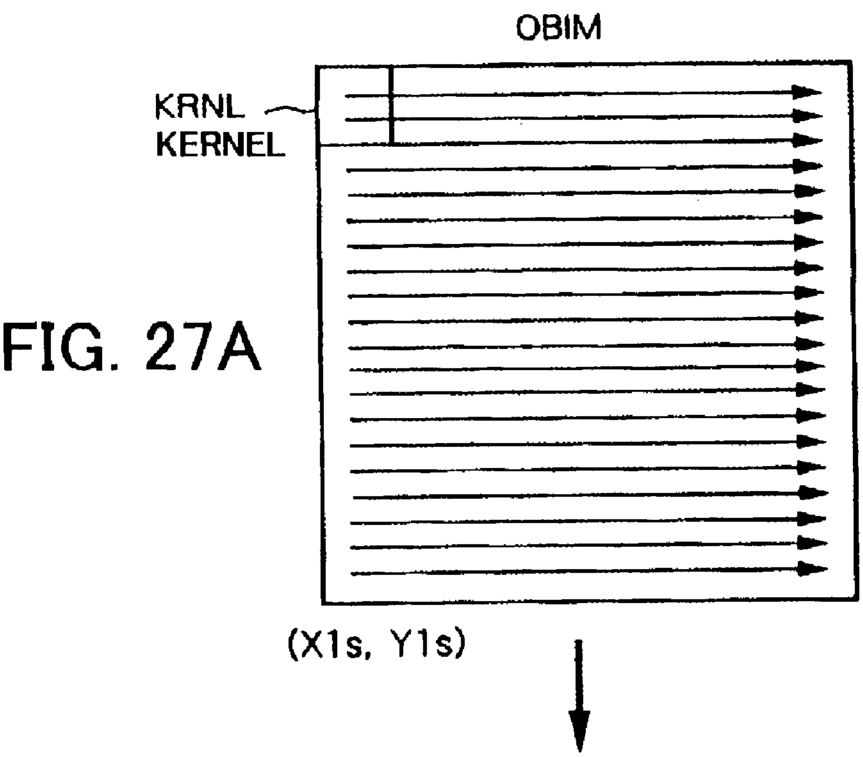
FIGS. 27A and 27B are views for explaining convolution filtering.
Figure 27B:
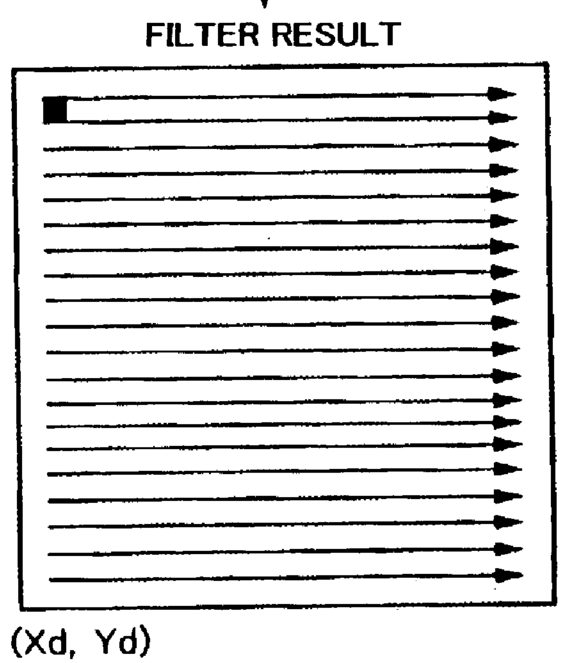
Figure 28:
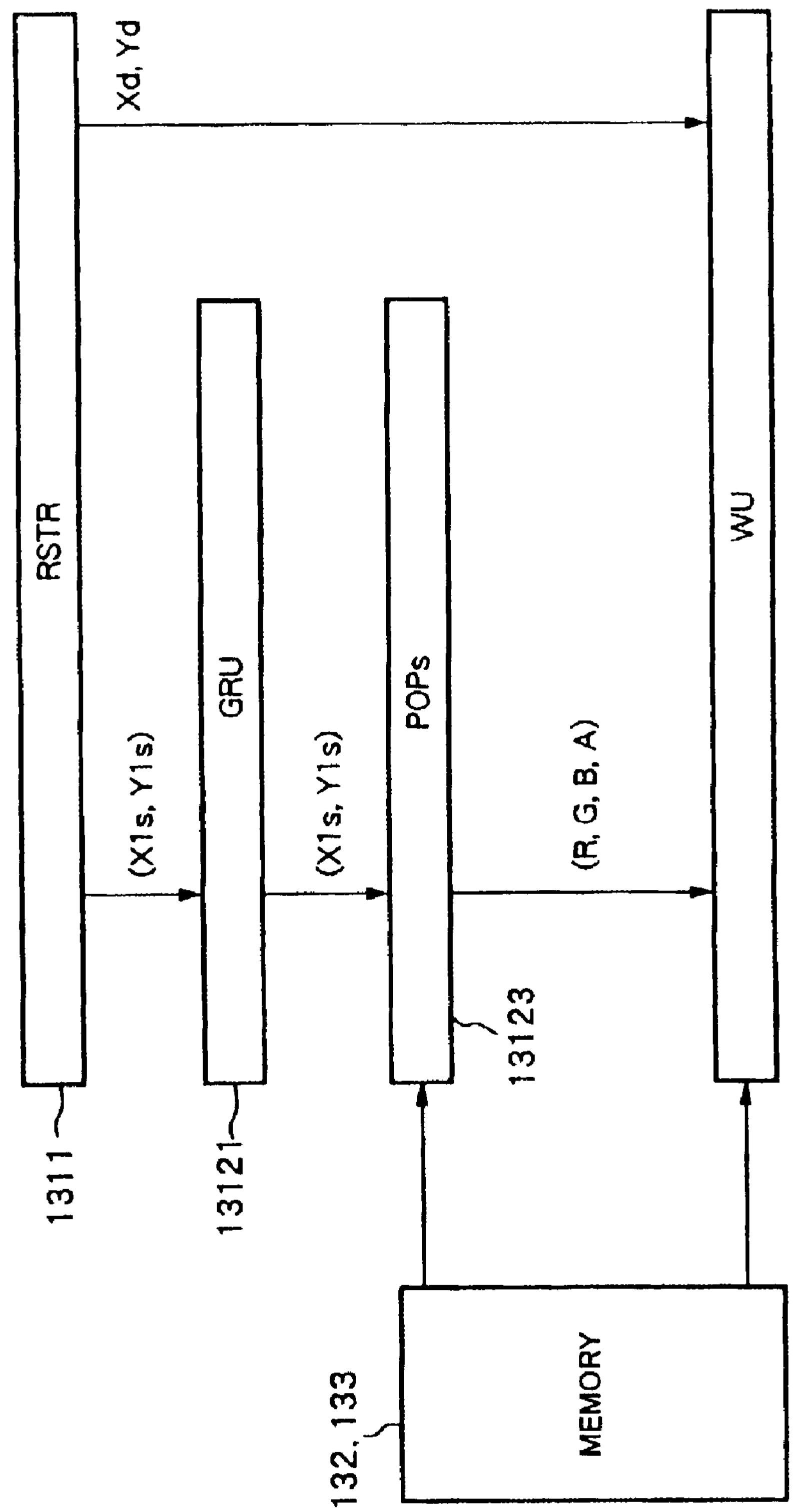
FIG. 28 is a view for explaining convolution filtering in a processing unit according to the present embodiment.

The convolution filtering reads out for each pixel (X1*s*, Y1*s*) of the object image OBIM as shown in FIG. 27A peripheral pixels of the filter kernal size, multiplies them by the filter coefficients, adds the results, and stores the result at the destination address (Xd, Yd) as shown in FIG. 27B. Note that the storage address of the filter kernal coefficient is set in the register in the pixel operation processor (POP) as the context.

In this case, the rasterizer 1311 has input to it the commands and the data required for generating the source address for reading the image data (pixel data) from the memory modules 132(-0 to -3) and the destination address for writing the image processing result, output from a not illustrated higher device via for example the global module 12, for example, the filter kernal size data (Wk, Hk). The rasterizer 1311 generates the source address (X1*s*, Y1*s*) of the object image OBIM stored in the memory module 132 based on the input data and generates the destination address (Xd, Yd) for storing the processing results in the memory module 132.

The generated destination address (Xd, Yd) is directly supplied to the write unit WU of the pixel operation processor (POP) group 13123 through a specific FIFO register of the register unit (RGU) 13124 by sharing the supply line of the window coordinates (X, Y, Z) at the time of the graphics processing. Further, the generated source address (X1*s*, Y1*s*) of the object image OBIM is supplied through the crossbar circuit 13125 and the FIFO register of the register unit (RGU) 13124 to the graphics unit (GRU) 13121. The source address (X1*s*, Y1*s*) passes straight through the graphics unit (GRU) 13121 and is directly supplied to the pixel operation processor (POP) group 13123 without going through for example the crossbar circuit 13125.

The pixel operation processor (POP) group 13123 reads the peripheral pixels of the kernal size stored in the memory module 132 via for example the read only cache RO$ based on the supplied source address (X1*s*, Y1*s*). Then, the pixel operation processor (POP) group 13123 multiplies a predetermined filter coefficient with the read out data, further adds the results, and transfers the data (R, G, B, A) including the color data (R, G, B) and the blend value data (A) as the result thereof via the crossbar circuit 13125 and the register unit (RGU) 13124 to the write unit WU.

The write unit WU stores the data by the pixel operation processor (POP) group 13123 at the destination address (Xd, Yd) via the read write cache RW$.

Finally, an explanation will be given of the operation by the system configuration of FIG. 3. Here, an explanation will be given of the processing of the texture system.

First, when the vertex data of the three-dimensional coordinates, normal vectors, and texture coordinates are input, the stream data controller (SDC) 11 performs an operation with respect to the vertex data. Next, various types of parameters required for the rasterization are calculated. Then, the stream data controller (SDC) 11 broadcasts calculated parameters to all local modules 13-0 to 13-3 via the global module 12. In this processing, the broadcasted parameters are transferred to the local modules 13-0 to 13-3 via the global module 12 using a channel different from the cache fill explained later. Note, this does not have any influence upon the content of the global cache.

The local modules 13-0 to 13-3 perform the following processing in the processing units 131-0 to 131-3. Namely, when receiving the broadcasted parameters, the processing unit 131(-0 to -3) decides whether or not that triangle belongs to an area which it is in charge of, for example, an area interleaved in units of rectangular areas of 4×4 pixels. When the result is that it belongs, various types of data (Z, texture coordinates, colors, etc.) are rasterized. Next, they calculate the MIPMAP level by calculating the LOD and calculates the (u, v) addresses for the texture access.

Then, they read the texture. In this case, the processing units 131-0 to 131-3 of the local modules 13-0 to 13-3 first check the entries of the local caches 133-0 to 133-3 at the time of texture reading. When the result is that there is an entry, the required texture data is read out. When the required texture data is not in the local caches 133-0 to 133-3, the processing units 131-0 to 131-3 transmit local cache fill requests to the global module 12 through the global interfaces 134-0 to 134-3.

In the global module 12, when it is decided that the requested block data exists in any of the global caches 121-0 to 121-3, the data is read out from one of the corresponding global caches 121-0 to 121-3 and sent back to the local module transmitting the request through a predetermined channel.

On the other hand, when it is decided that the requested block data does not exist in any of the global caches 121-0 to 121-3, a global cache fill request is sent to the local module holding the block from any of the desired channels. The local module receiving the global cache fill request reads the corresponding block data from the memory and transmits the same through the global interface to the global module 12. Thereafter, the global module 12 fills the block data in the desired global cache and transmits the data from the desired channel to the local module sending the request.

When the requested block data is sent from the global module 12, the corresponding local module updates the local cache and reads the block data from the processing unit.

Next, the local modules 13-0 to 13-3 perform filtering such as four neighbor interpolation by using the read texture data and the decimal portion obtained at the calculation of the (u, v) address. Next, they perform operations in units of pixels by using the texture data after filtering and various types of data after the rasterization. Then, they write the pixel data passing various tests in the processing at the pixel level into the memory modules 132-0 to 132-3, for example, the frame buffer and the Z-buffer in the built-in DRAM memory.

As explained above, according to the present embodiment, provision is made of a rasterizer 1311 for, at the time of the graphics processing, receiving the broadcasted parameter data from the global module 12 and generating various types of pixel data such as the window coordinates, primary colors (PC), secondary colors (SC), fog coefficient (f), and texture coordinates and, at the time of the image processing, generating a source address and generating a destination address based on the input data; a register unit 13124 having a plurality of FIFO registers; a graphics unit 13121 for generating the graphics data (s, t, l) including texel coordinates (s, t) and LOD data based on the texture coordinates set in the FIFO registers of the register unit 13124 and outputting the source address passing straight through; a pixel operation processor 13123 for, at the time of the graphics processing, performing a predetermined operation based on the graphics data (s, t, l), transferring the operation data through the crossbar circuit 13125, and setting the same in a predetermined register of the register unit 13124 and, at the time of the image processing, reading the image data in accordance with the source address, performing the predetermined image processing, transferring this operation data through the crossbar circuit 13125, and setting the same in a predetermined register of the register unit 13124; a pixel engine 13122 for performing a predetermined operation with respect to the operation data of the pixel operation processor 13123 set in the register based on the color data, transferring this operation data through the crossbar circuit 13125, and setting the same in a predetermined register of the register unit 13124; and a write unit WU for, at the time of the graphics processing, performing the processing required for the pixel writing based on the window coordinates set in the register and the operation data of the pixel engine 13122 and writing the processing results into the memory according to need and, at the time of the image processing, writing the operation data of the pixel operation processor 13123 set in the register at the destination address of the memory so the following effects can be obtained.

Namely, according to the present embodiment, a large amount of operation processing elements can be efficiently utilized, the degree of freedom of algorithms is high, the flexibility is high, an increase of the circuit size and cost increase are not induced, and complex processing can be performed with a high through-put.

Further, the processing unit 131(-0 to -3) executes an algorithm expressed by the data flow graph (DFG) without branching. The note and edge of the data flow graph (DFG) can be regarded as an operation processing element and operation unit and the connection configuration. Accordingly, the processing units 131(-0 to -3) are so-called dynamic reconfigurable hardware for dynamically switching the connection among the operation resources in accordance with the executed data flow graph (DFG), the functions executed in the operation processing elements and the connection configuration correspond to the microprograms of the processing units, and the data flow graphs (DFGs) applied to the elements of the stream data are the same, so the band width of the issuance of commands can be kept low.

Further, in the processing units 131(-0 to -3), the designation of the operation functions and the control for switching connection among the operation processing elements are data driven, so control can be dispersed independent type control. By employing such dynamic scheduling, when the data flow graphs (DFG) are switched, overlap of the epilogue/prologue is possible and the overhead of switching of data flow graphs (DFG) can be reduced.

Further, when the size of the data flow graph (DFG) becomes large, the algorithm becomes unable to be mapped in the internal operation resources at one time. In such a case, it is necessary to divide it into a plurality of sub-data flow graphs (DFGs). As the method of executing an operation while dividing a data flow graph (DFG) into a plurality of sub-data flow graphs (DFGs), a multi-path technique for storing the intermediate values of the sub-data flow graphs (DFGs) in a memory can be mentioned. In this method, when the number of paths increases, the memory band width is used up and a decline in the performance is induced. The processing unit 131(-0 to -3) transfers the stream data among the operation processing elements and the operation units via the FIFO type register unit (RGU), therefore, at the time of division of a data flow graph (DFG), it is possible to transfer the intermediate values via this register filter, so the number of multi-paths can be reduced. The division of the data flow graph (DFG) per se is statically carried out by a compiler, but the division of the data flow graph (DFG) is controlled by hardware, so there is the advantage of a light load on the software.

Further, according to the present embodiment, provision is made of a pixel operation processor (POP) group 13123 having a plurality of pixel operation processors POP0 to POP3 as function units for performing a high parallel operation making use of the memory band width, wherein each pixel operation processor (POP) has operation processing elements POPE0 to POPE3 arranged in parallel, the pixel operation processing elements POPE0 to POPE3 receive 32-bit width data read from the cache and the operation parameters from the filter function unit FFU to perform the predetermined operations (for example addition) and output the operation results to the later pixel operation processing element POPE, the later pixel operation processing element POPE adds the previous operation result to its own operation result and outputs the operation result to the later pixel operation processing element POPE, the pixel operation processing element POPE 3 of the last stage finds the sum of operation results of all pixel operation processing elements POPE0 to POPE3, and each pixel operation processor (POP) has an output selection circuit OSLC for selecting only the operation result of one pixel operation processing element POPE3 from among the operation outputs of a plurality of pixel operation processing element POPEs and outputting the same to the crossbar circuit 13125, so a reduction of size of the crossbar circuit can be achieved and the processing can be speeded up.

Further, in the present embodiment, the stream data transferred through the crossbar circuit 13125 and set in the FIFO register of the register unit 13124 is directly supplied to the graphics unit (GRU) 13121, pixel engine (PXE) 13122, pixel operation processor (POP) group 13123, and write unit WU not through the crossbar circuit, and the graphics operation data obtained by the graphics unit 13121 is directly supplied to the pixel operation processor (POP) group 13123 not through the crossbar circuit, but via a specific interconnect, so simplification and small size of the crossbar circuit can be further achieved, the number of multi-paths can be reduced, and consequently the processing can be further speeded up.

Figure 29:
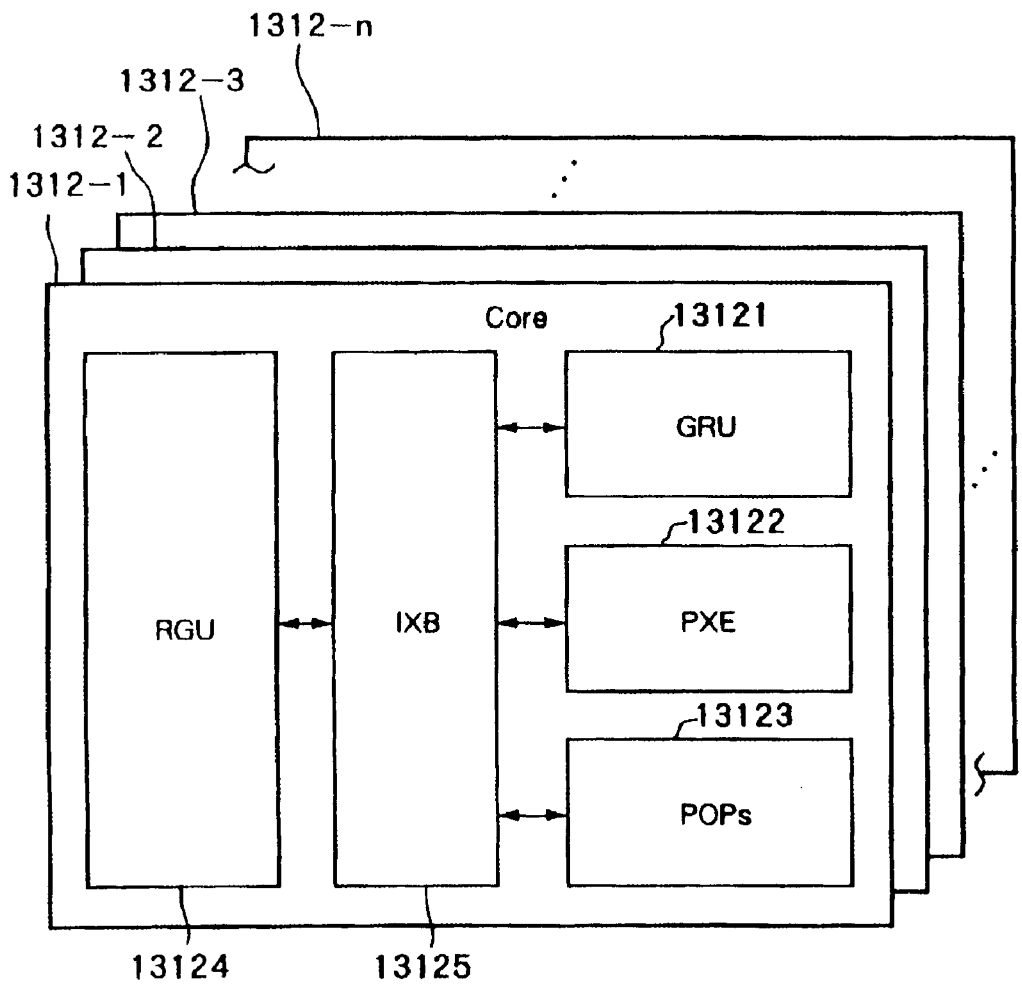
FIG. 29 is a view of another example of the configuration (example providing a plurality of cores) in a processing unit according to the present embodiment.

Further, in the present embodiment, the explanation was given by taking as an example a configuration wherein only one core 1312 was provided as the operation processing portion for realizing the present architecture, but for example as shown in FIG. 29, it is also possible to employ a configuration providing a plurality of cores 1312-0 to **1312-*n* in parallel with respect to one rasterizer 1311**. Also in this case, the data flow graph (DFG) used each core is the same. Further, the unit for achieving a parallel configuration providing a plurality of cores is for example the unit of small rectangular areas (stamps) in the case of the graphics processing and the block unit in the case of the image processing. In this case, there is the advantage that the parallel processing with a fine particle size can be realized.

Further, in the present embodiment, the pixel operation processor (POP) group 13123 and the cache are connected with a wide band width and the address generation function for the memory access is built-in, so a supply of stream data large enough to extract the operation capability of the operation processing element to the largest limit is possible.

Further, in the present embodiment, the operation processing elements are arranged with a high density in a form matching the output data width with the vicinity of the memory and the regularity of the processing data is utilized, so a large amount of operations can be realized with the lowest limit of operation processing elements and with a simple configuration, consequently there is the advantage in that a cost reduction can be achieved.

Further, according to the present embodiment, the stream data controller (SDC) 11 and the global module 12 transfer the data, a plurality of (four in the present embodiment) local modules 13-0 to 13-3 are connected in parallel with respect to one global module 12, the processing data is shared by a plurality of local modules 13-0 to 13-3 and processed in parallel, the global module 12 has a global cache, the local modules 13-0 to 13-3 have local caches, two levels of caches of a global cache shared by four local modules 13-0 to 13-3 and the local caches locally owned by the local modules are provided, therefore, when a plurality of processing devices perform parallel processing by sharing the processing data, overlapping access can be reduced, and a crossbar having a large number of interconnects becomes unnecessary. As a result, there is the advantage that an image processing apparatus which is easily designed and able to reduce the interconnect cost and interconnect delay can be realized.

Further, according to the present embodiment, as the interconnect relationship between the global module 12 and the local modules 13-0 to 13-3, as shown in FIG. 3, the local modules 13-0 to 13-3 are arranged centered around global module 12, so the distances between the corresponding channel blocks and local modules can be kept uniform, the interconnect areas can be orderly arranged, and the average interconnect length can be shortened. Accordingly, there are the advantages that the interconnect delay and the interconnect cost can be reduced and an improvement of the processing speed can be achieved.

Note that the present embodiment was explained taking the case where the texture data exists in the built-in DRAM as an example, but as another case, it is possible even if only the color data and z-data are placed in the built-in DRAM and the texture data is placed in the external memory. In this case, if data is missing in the global cache, the cache fill request will be issued with respect to the external DRAM.

Figure 30:
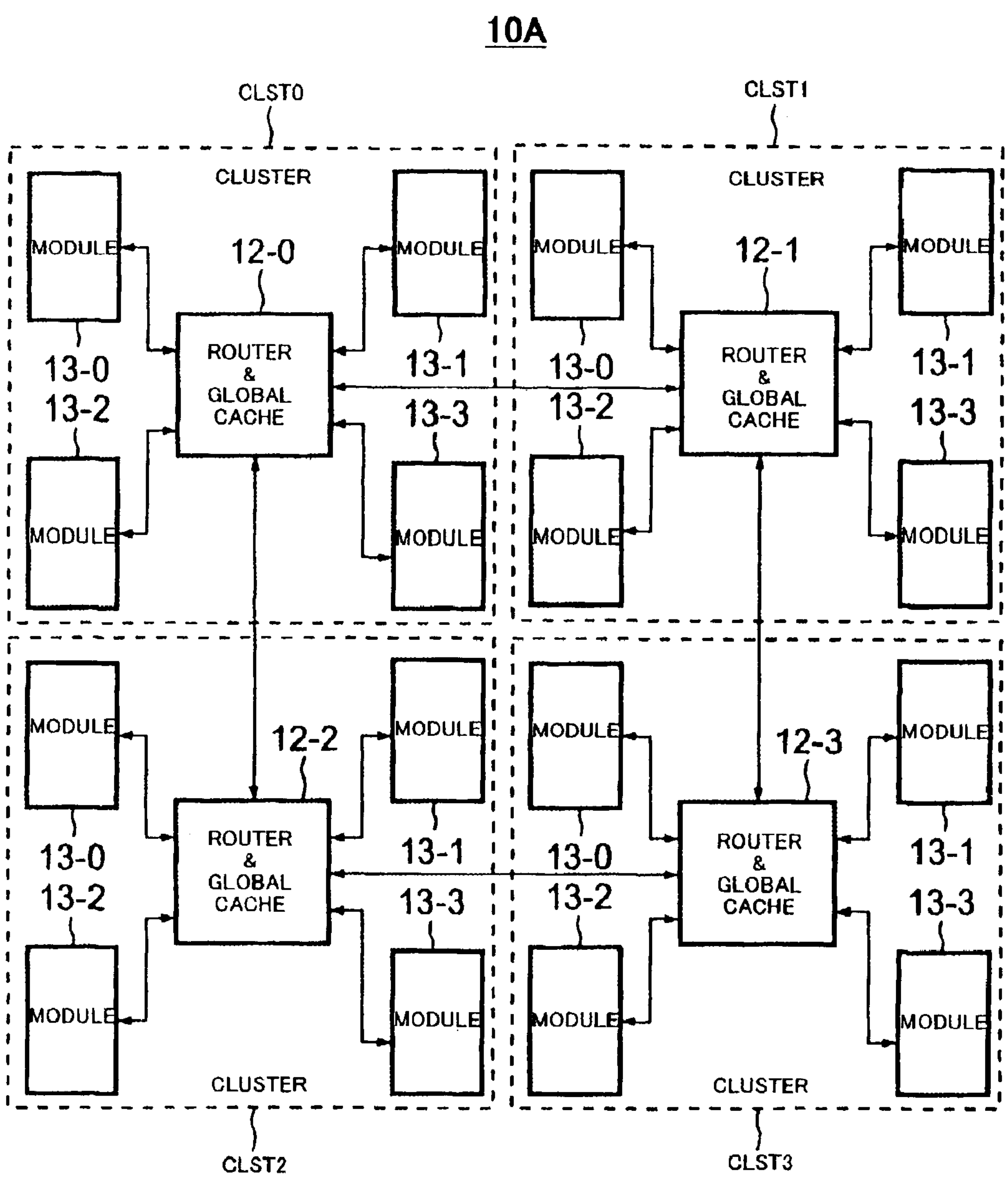
FIG. 30 is a block diagram of the configuration of another embodiment of an image processing apparatus according to the present invention.

Further, in the above explanation, the configuration of FIG. 3, that is, the case of parallel processing taking as an example an image processing apparatus 10 comprised of a plurality of (four in the present embodiment) local modules 13-0 to 13-3 connected in parallel to one global module 12 was specified, but also a configuration wherein the configuration of FIG. 3 is used as a cluster CLST and, as shown in FIG. 30, four clusters CLST0 to CLST3 are arranged in a matrix and data is transferred among the global modules 12-0 to 12-3 of the clusters CLST0 to CLST3 is possible. In the example of FIG. 30, the global module 12-0 of the cluster CLST0 and the global module 12-1 of the cluster CLST1 are connected, the global module 12-1 of the cluster CLST1 and the global module 12-3 of the cluster CLST3 are connected, the global module 12-3 of the cluster CLST3 and the global module 12-2 of the cluster CLST2 are connected, and the global module 12-2 of the cluster CLST2 and the global module 12-0 of the cluster CLST0 are connected. Namely, the global modules 12-0 to 12-3 of the plurality of clusters CLST0 to CLST3 are connected in the form of a ring. Note that, in the case of the configuration of FIG. 30, it is possible to configure the invention so that parameters are broadcasted to the global modules 12-0 to 12-3 of the clusters CLST0 to CLST3 from one stream data controller (SDC).

By employing such a configuration, more precise image processing can be realized and interconnects among clusters are simply connected by one system bi-directionally. Therefore, the load among clusters can be kept uniform, the interconnect areas can be orderly arranged, and the average interconnect length can be shortened. Accordingly, the interconnect delay and the interconnect cost can be reduced, and it becomes possible to improve the processing speed.

As explained above, according to the present invention, there are the advantages that a large amount of operation processing elements can be efficiently utilized, the degree of freedom of algorithms is high, the flexibility is high, and image processing and graphics processing can be realized without inducing an increase of the circuit size and an increase of cost.

While the invention has been described with reference to specific embodiments chosen for purpose of illustration, it should be apparent that numerous modifications could be made thereto by those skilled in the art without departing from the basic concept and scope of the invention.

What is claimed is:

1. An image processing apparatus having a graphics processing function and an image processing function, comprising:

a memory for storing processing data relating to an image;

a rasterizer for generating graphics pixel data including at least coordinate data and color data based on image parameters of a primitive at the time of the graphics processing and generating at least a source address for reading the processing data relating to the image stored in said memory at the time of the image processing; and at least one core for performing predetermined graphics processing or image processing based on the data generated at said rasterizer, wherein said core includes:

a register unit having a plurality of registers for setting at least said pixel data and address data generated by said rasterizer, a first function unit for performing predetermined graphics processing with respect to the coordinate data among graphics pixel data from said rasterizer set in a register of said register unit and performing predetermined operation processing based on the generated graphics data and the color data from said rasterizer set in the register of said register unit to generate first operation data at the time of graphics processing, performing predetermined image processing with respect to the image data read from said memory or the image data supplied from the outside in accordance with the source address set in the register of said register unit to generate second operation data at the time of the image processing, a second function unit for performing processing required for pixel writing based on the window coordinate data among the graphics pixel data from said rasterizer set in the register of said register unit and the first operation data generated by said first function unit and writing the predetermined result into said memory according to need at the time of the graphics processing, and a crossbar circuit switched in accordance with the processing and connecting said rasterizer, register unit, first function unit, and second function unit to each other.

2. An image processing apparatus as set forth in claim 1, further comprising a means for transferring the second operation data generated by said first function unit to said second function unit or an external device in accordance with need.

3. An image processing apparatus as set forth in claim 2, wherein:

said rasterizer generates a destination address for storing the processing results in said memory and said source address at the time of the image processing, and said second function unit writes the second operation data generated by said first function unit at the destination address from said rasterizer set in the register of said register unit of said memory according to need at the time of the image processing.

4. An image processing apparatus as set forth in claim 1, wherein each register of said register unit has an input connected to the crossbar circuit and has an output directly connected to the input of either of said first function unit and second function unit.

5. An image processing apparatus as set forth in claim 1, wherein:

at least coordinate data and source address data among the graphics pixel data from said rasterizer are set in a predetermined register, the set data being supplied to said first function unit; and said first function unit performs said predetermined graphics processing with respect to the supplied graphics pixel data.

6. An image processing apparatus as set forth in claim 1, wherein:

said register unit includes a specific register having an output connected to the input of said second function unit; and the window coordinates among the graphics pixel data from said rasterizer are set in the specific register of said register unit, the set data being directly supplied to said second function unit.

7. An image processing apparatus as set forth in claim 1, wherein the first operation data from said first function unit is transferred through said crossbar circuit and set in a predetermined register of said register unit, the set data being directly supplied to said second function unit.

8. An image processing apparatus as set forth in claim 1, wherein:

each register of said register unit has an input connected to the crossbar circuit and has an output directly connected to the input of either of said first function unit and second function unit, at least coordinate data and source address data among the graphics pixel data from said rasterizer are set in a predetermined register, the set data being supplied to said first function unit, said first function unit performs said predetermined graphics processing with respect to the supplied graphics pixel data, the first operation data from said first function unit is transferred through said crossbar circuit and set in a predetermined register of said register unit, the set data being directly supplied to said second function unit, said register unit includes a specific register having an output connected to the input of said second function unit, and the window coordinates among the graphics pixel data from said rasterizer are set in the specific register of said register unit, the set data being directly supplied to said second function unit.

9. An image processing apparatus as set forth in claim 1, wherein:

said first function unit includes an operation processing element having an output connected to at least the crossbar circuit, said register unit includes a plurality of registers each having an input connected to the crossbar circuit and an output directly connected to the input of the first function unit, and outputs of a plurality of registers of said register unit and inputs of the operation processing elements of said first function unit are in a one-to-one correspondence.

10. An image processing apparatus as set forth in claim 9, wherein the output of at least one operation processing element of said first function unit is connected to also the input of the other operation processing element.

11. An image processing apparatus as set forth in claim 1, wherein:

said rasterizer generates at least window coordinates, texture coordinates, and color data at the time of the graphics processing and supplies said texture coordinates via said register unit to said first function unit, the first function unit performs predetermined graphics processing based on said texture coordinates, said register unit includes a first register having an output connected to the input of said first function unit and a second register having an output connected to the input of the second function unit, said color data is set in the first register of said register unit and directly supplied from the first register to said first function unit, and said window coordinates are set in the second register of said register unit and directly supplied from the second register to said second function unit.

12. An image processing apparatus as set forth in claim 11, wherein the same supply line is shared for the texture coordinates generated at the time of the graphics processing by said rasterizer and the source addresses generated at the time of the image processing.

13. An image processing apparatus as set forth in claim 1, wherein:

said first function unit includes a plurality of operation processing elements provided corresponding to a plurality of ports of said memory, generates an address for reading texel data required for said predetermined operation processing based on the graphics data from said first function unit, and then finds operation parameters and supplies the same to said plurality of operation processing elements, and said plurality of operation processing elements perform parallel operation processing based on said operation parameters and the processing data read from said memory and generate continuous stream data.

14. An image processing apparatus as set forth in claim 13, wherein a plurality of operation processing elements of said first function unit perform predetermined operation processing with respect to element data read from the ports of said memory, add operation results at one operation processing element among said plurality of operation processing elements, and output an addition result data of the one operation processing element.

15. An image processing apparatus as set forth in claim 13, further comprising a cache for storing at least the processing data read from each port of said memory and supplying the stored data to each operation processing element of said first function unit.

16. An image processing apparatus as set forth in claim 1, further comprising a cache for storing at least the processing data read from the ports of said memory and supplying the storage data to the operation processing elements of said second function unit.

17. An image processing apparatus as set forth in claim 1, wherein:

the same supply line is shared for the window coordinates generated at the time of the graphics processing and the destination address generated at the time of the image processing by said rasterizer, and the same supply line is shared for the texture coordinates and the source address.

18. An image processing apparatus having a graphics processing function and an image processing function comprising:

a memory for storing processing data relating to an image;

a rasterizer for generating graphics pixel data including at least coordinate data and color data based on image parameters of a primitive at the time of the graphics processing and generating a source address for reading the processing data relating to the image stored in said memory and a destination address for storing processing results in said memory at the time of the image processing; and at least one core for performing predetermined graphics processing or image processing based on the data generated at said rasterizer, wherein said core includes:

a register unit having a plurality of registers for setting at least said pixel data and address data generated by said rasterizer, a first function unit for performing predetermined graphics processing with respect to the coordinate data among graphics pixel data from said rasterizer set in the register of said register unit and performing predetermined operation processing based on the generated graphics data and the color data from said rasterizer set in the register of said register unit to generate first operation data at the time of the graphics processing, performing predetermined image processing with respect to the image data read from said memory or the image data supplied from the outside in accordance with the source address set in the register of said register unit to generate second operation data at the time of the image processing, a second function unit for performing processing required for pixel writing based on the window coordinate data among the graphics pixel data from said rasterizer set in the register of said register unit and the first operation data generated by said first function unit and writing the predetermined result into said memory according to need at the time of the graphics processing, and writing the second operation data generated by said first function unit at the destination address from said rasterizer set in the register of said register unit of said memory according to need at the time of the image processing, and a crossbar circuit switched in accordance with the processing and connecting said rasterizer, register unit, first function unit, and second function unit to each other.

19. An image processing apparatus as set forth in claim 18, wherein each register of said register unit has an input connected to the crossbar circuit and an output connected to the input of either of said first function unit and second function unit.

20. An image processing apparatus as set forth in claim 18, wherein:

at least coordinate data and source address data among the graphics pixel data from said rasterizer are set in a predetermined register, the set data being supplied to said first function unit, and said first function unit performs said predetermined graphics processing with respect to supplied graphics pixel data.

21. An image processing apparatus as set forth in claim 18, wherein:

said register unit includes a specific register having an output connected to said second function unit, and window coordinates and a destination address for image processing among the graphics pixel data from said rasterizer are set in a specific register of said register unit, the set data being directly supplied to said second function unit.

22. An image processing apparatus as set forth in claim 18, wherein the first operation data from said first function unit is transferred through said crossbar circuit and set in a predetermined register of said register unit, and the set data is directly supplied to said second function unit.

23. An image processing apparatus as set forth in claim 18, wherein:

each register of said register unit has an input connected to the crossbar circuit and has an output directly connected to the input of either of said first function unit and second function unit, at least coordinate data and source address data among the graphics pixel data from said rasterizer are set in a predetermined register, the set data being supplied to said first function unit, said first function unit performs said predetermined graphics processing with respect to the supplied graphics pixel data, the first operation data from said first function unit is transferred through said crossbar circuit and set in a predetermined register of said register unit, the set data being directly supplied to said second function unit, said register unit includes a specific register having an output connected to the input of said second function unit, and the window coordinates among the graphics pixel data from said rasterizer and the destination address for the image processing are set in the specific register of said register unit, the set data being directly supplied to said second function unit.

24. An image processing apparatus as set forth in claim 18, wherein:

said first function unit includes an operation processing element having an output connected to at least the crossbar circuit, said register unit includes a plurality of registers each having an input connected to the crossbar circuit and an output directly connected to the input of the first function unit, and outputs of a plurality of registers of said register unit and inputs of operation processing elements of said first function unit are in a one-to-one correspondence.

25. An image processing apparatus as set forth in claim 24, wherein the output of at least one operation processing element of said first function unit is connected to also the input of the other operation processing element.

26. An image processing apparatus as set forth in claim 24, wherein:

the same supply line is shared for the window coordinates generated at the time of the graphics processing by said rasterizer and the destination address generated at the time of the image processing, and the same supply line is shared for the texture coordinates and the source address.

27. An image processing apparatus as set forth in claim 18, wherein:

said rasterizer generates at least window coordinates, texture coordinates, and color data at the time of the graphics processing and supplies said texture coordinates via said register unit to said first function unit, the first function unit performs predetermined graphics processing based on said texture coordinates, said register unit includes a first register having an output connected to the input of said first function unit and a second register having an output connected to the input of the second function unit, said color data is set in the first register of said register unit and directly supplied from the first register to said first function unit, and said window coordinates are set in the second register of said register unit and directly supplied from the second register to said second function unit.

28. An image processing apparatus as set forth in claim 27, wherein:

said first function unit includes a plurality of operation processing elements provided corresponding to a plurality of ports of said memory, generates an address for reading texel data required for said predetermined operation processing based on the graphics data from said first function unit, and then finds operation parameters and supplies the same to said plurality of operation processing elements, and said plurality of operation processing elements perform parallel operation processing based on said operation parameters and the processing data read from said memory and generate continuous stream data.

29. An image processing apparatus as set forth in claim 28, wherein a plurality of operation processing elements of said first function unit perform predetermined operation processing with respect to element data read from the ports of said memory, add operation results at one operation processing element among said plurality of operation processing elements, and output an addition result data of the one operation processing element.

30. An image processing apparatus as set forth in claim 28, further comprising a cache for storing at least the processing data read from each port of said memory and supplying the stored data to each operation processing element of said first function unit.

31. An image processing apparatus having a graphics processing function and an image processing function comprising:

a memory for storing processing data relating to an image;

a rasterizer for generating graphics pixel data including at least coordinate data and color data based on image parameters of a primitive at the time of the graphics processing and generating at least a source address for reading the processing data relating to the image stored in said memory at the time of the image processing; and at least one core for performing predetermined graphics processing or image processing based on the data generated at said rasterizer, wherein said core includes:

a register unit having a plurality of registers for setting at least said pixel data and address data generated by said rasterizer, a first function unit for performing predetermined graphics processing with respect to the coordinate data among graphics pixel data from said rasterizer set in the register of said register unit and outputting graphics data, a second function unit for performing predetermined operation processing based on the graphics data generated at said first function unit to generate first operation data at the time of the graphics processing and performing predetermined image processing with respect to image data read from said memory or image data supplied from the outside in accordance with the source address set in the register of said register unit to generate second operation data at the time of the image processing, a third function unit for performing predetermined operation processing with respect to the first operation data from said second function unit based on the color data from said rasterizer set in the register of said register unit to generate third operation data at the time of the graphics processing and performing predetermined operation processing with respect to the second operation data from said second function unit according to need to generate fourth operation data at the time of the image processing, a fourth function unit for performing processing required for pixel writing based on the window coordinate data among the graphics pixel data from said rasterizer set in the register of said register unit and the third operation data generated at said third function unit, and writing predetermined results into said memory according to need at the time of the graphics processing, and a crossbar circuit switched in accordance with the processing and connecting said rasterizer, register unit, first function unit, third function unit, and fourth function unit to each other.

32. An image processing apparatus as set forth in claim 31, further comprising a means for transferring the second operation data generated at said second function unit or the fourth operation data generated at said third function unit to said second function unit or external device according to need.

33. An image processing apparatus as set forth in claim 32, wherein:

said rasterizer generates a destination address for storing processing results in said memory in addition to said source address at the time of the image processing, and said fourth function unit writes the second operation data generated at said second function unit or the fourth operation data generated at said third function unit at the destination address from said rasterizer set in the register of said register unit according to need at the time of the image processing.

34. An image processing apparatus as set forth in claim 31, wherein each register of said register unit has an input connected to the crossbar circuit and an output directly connected to the input of any of said first function unit, second function unit, third function unit, and fourth function unit.

35. An image processing apparatus as set forth in claim 31, wherein:

at least the coordinate data and source address data among the graphics pixel data from said rasterizer are set in a predetermined register, the set data being supplied to said first function unit, and said first function unit performs said predetermined graphics processing with respect to the supplied graphics pixel data and outputs the source address for the image processing straight through.

36. An image processing apparatus as set forth in claim 31, wherein the output of said first function unit and the input of the second function unit are directly connected by an interconnect, and the output data of said first function unit is directly supplied to the second function unit.

37. An image processing apparatus as set forth in claim 31, wherein:

said register unit includes a specific register having an output connected to the input of said fourth function unit, and the window coordinates among the graphics pixel data from said rasterizer are set in the specific register of said register unit, the set data being directly supplied to said fourth function unit.

38. An image processing apparatus as set forth in claim 31, wherein:

the first operation data from said second function unit is transferred through said crossbar circuit and set in a predetermined register of said register unit, the set data being directly supplied to said third function unit, and the third operation data from said third function unit is transferred through said crossbar circuit and set in a predetermined register of said register unit, the set data being directly supplied to said fourth function unit.

39. An image processing apparatus as set forth in claim 31, wherein:

each register of said register unit has an input connected to the crossbar circuit and an output directly connected to the input of any of said first function unit, second function unit, third function unit, and fourth function unit, the output of said first function unit and the input of the second function unit are directly connected by an interconnect, at least the coordinate data and the source address data among the graphics pixel data from said rasterizer are set in a predetermined register, the set data being directly supplied to said first function unit, said first function unit performs said predetermined graphics processing with respect to the supplied graphics pixel data and outputs the source address for the image processing straight through, the output data being directly supplied to the second function unit, the first operation data from said second function unit is transferred through said crossbar circuit and set in a predetermined register of said register unit, the set data being directly supplied to said third function unit, the third operation data from said third function unit is transferred through said crossbar circuit and set in a predetermined register of said register unit, the set data being directly supplied to said fourth function unit, and further said register unit includes a specific register having an output connected to the input of said fourth function unit, and the window coordinates among the graphics pixel data from said rasterizer are set in a specific register of said register unit, the set data being directly supplied to said fourth function unit.

40. An image processing apparatus as set forth in claim 31, wherein:

said second function unit and third function unit include operation processing elements each having an output connected to at least the crossbar circuit, said register unit includes a plurality of registers each having an input connected to the crossbar circuit and an output directly connected to the inputs of the second function unit and the third function unit, and the outputs of a plurality of registers of said register unit and inputs of the operation processing elements of said second function unit and third function unit are in a one-to-one correspondence.

41. An image processing apparatus as set forth in claim 40, wherein the output of at least one operation processing element of said third function unit is connected to also the input of the other operation processing element.

42. An image processing apparatus as set forth in claim 31, wherein:

said rasterizer generates at least window coordinates, texture coordinates, and color data at the time of the graphics processing and supplies said texture coordinates via said register unit to said first function unit, the first function unit performs predetermined graphics processing based on said texture coordinates and supplies the same to said second function unit, said register unit includes a first register having an output connected to the input of said third function unit and a second register having an output connected to the input of the fourth function unit, said color data is set in the first register, of said register unit and directly supplied from the first register to said third function unit, and said window coordinates are set in the second register of said register unit and directly supplied from the second register to said fourth function unit.

43. An image processing apparatus as set forth in claim 42, wherein the output of said first function unit and the input of the second function unit are directly connected by an interconnect, and the output data of said first function unit is directly supplied to the second function unit.

44. An image processing apparatus as set forth in claim 42, wherein:

said second function unit includes a plurality of operation processing elements provided corresponding to a plurality of ports of said memory, generates an address for reading texel data required for said predetermined operation processing based on the graphics data from said first function unit, and then finds operation parameters and supplies the same to said plurality of operation processing elements, and said plurality of operation processing elements perform parallel operation processing based on said operation parameters and the processing data read from said memory to generate continuous stream data.

45. An image processing apparatus as set forth in claim 44, wherein a plurality of operation processing elements of said second function unit perform predetermined operation processing with respect to element data read from the ports of said memory, add operation results at one operation processing element among said plurality of operation processing elements, and output the addition result data of the one operation processing element.

46. An image processing apparatus as set forth in claim 44, further comprising a cache for storing at least the processing data read from the ports of said memory and supplying the storage data to the operation processing elements of said second function unit.

47. An image processing apparatus as set forth in claim 42, wherein the same supply line is shared for the texture coordinates generated at the time of the graphics processing by said rasterizer and the source addresses generated at the time of the image processing.

48. An image processing apparatus having a graphics processing function and an image processing function comprising:

a memory for storing processing data relating to an image;

a rasterizer for generating graphics pixel data including at least coordinate data and color data based on image parameters of a primitive at the time of the graphics processing and generating a source address for reading the processing data relating to the image stored in said memory and a destination address for storing processing results in said memory at the time of the image processing; and at least one core for performing predetermined graphics processing or image processing based on the data generated at said rasterizer, wherein said core includes:

a register unit having a plurality of registers for setting at least said pixel data and address data generated by said rasterizer, a first function unit for performing predetermined graphics processing with respect to the coordinate data among graphics pixel data from said rasterizer set in the register of said register unit and outputting graphics data, a second function unit for performing predetermined operation processing based on the graphics data generated at said first function unit to generate first operation data at the time of the graphics processing and performing predetermined image processing with respect to image data read from said memory or image data supplied from the outside in accordance with the source address set in the register of said register unit to generate second operation data at the time of the image processing, a third function unit for performing predetermined operation processing with respect to the first operation data from said second function unit based on the color data from said rasterizer set in the register of said register unit to generate third operation data at the time of the graphics processing and performing predetermined operation processing with respect to the second operation data from said second function unit according to need to generate fourth operation data at the time of the image processing, a fourth function unit for performing processing required for pixel writing based on the window coordinate data among the graphics pixel data from said rasterizer set in the register of said register unit and the third operation data generated at said third function unit and writing predetermined results into said memory according to need at the time of the graphics processing and writing the second operation data generated at said second function unit or the fourth operation data generated at the third function unit at the destination address from said rasterizer set in the register of said register unit of said memory according to need at the time of the image processing, and a crossbar circuit switched in accordance with the processing and connecting said rasterizer, register unit, first function unit, third function unit, and fourth function unit to each other.

49. An image processing apparatus as set forth in claim 48, wherein each register of said register unit has an input connected to the crossbar circuit and an output directly connected to the input of either of said first function unit, second function unit, third function unit, and fourth function unit.

50. An image processing apparatus as set forth in claim 49, wherein:

the first operation data from said second function unit is transferred through said crossbar circuit and set in a predetermined register of said register unit, the set data being directly supplied to said third function unit, and the third operation data from said third function unit is transferred through said crossbar circuit and set in a predetermined register of said register unit, the set data being directly supplied to said fourth function unit.

51. An image processing apparatus as set forth in claim 48, wherein:

at least the coordinate data and source address data among the graphics pixel data from said rasterizer are set in a predetermined register, the set data being supplied to said first function unit, and said first function unit performs said predetermined graphics processing with respect to the supplied graphics pixel data and outputs the source address for the image processing straight through.

52. An image processing apparatus as set forth in claim 51, wherein the output of said first function unit and the input of the second function unit are directly connected by an interconnect, and the output data of said first function unit is directly supplied to the second function unit.

53. An image processing apparatus as set forth in claim 48, wherein:

said register unit includes a specific register having an output connected to said fourth function unit, the window coordinates and destination address for the image processing among the graphics pixel data from said rasterizer are set in the specific register of said register unit, and the set data is directly supplied to said fourth function unit.

54. An image processing apparatus as set forth in claim 48, wherein:

each register of said register unit has an input connected to the crossbar circuit and an output directly connected to the input of any of said first function unit, second function unit, third function unit, and fourth function unit, the output of said first function unit and the input of the second function unit are directly connected by an interconnect, at least the coordinate data and the source address data among the graphics pixel data from said rasterizer are set in a predetermined register, the set data being directly supplied to said first function unit, said first function unit performs said predetermined graphics processing with respect to the supplied graphics pixel data and outputs the source address for the image processing straight through, the output data being directly supplied to the second function unit, the first operation data from said second function unit is transferred through said crossbar circuit and set in a predetermined register of said register unit, the set data being directly supplied to said third function unit, the third operation data from said third function unit is transferred through said crossbar circuit and set in a predetermined register of said register unit, the set data being directly supplied to said fourth function unit, and further said register unit includes a specific register having an output connected to the input of said fourth function unit, and the window coordinates among the graphics pixel data and the destination address for the image processing from said rasterizer are set in a specific register of said register unit, the set data being directly supplied to said fourth function unit.

55. An image processing apparatus as set forth in claim 48, wherein:

said second function unit and third function unit include operation processing elements each having an output connected to at least the crossbar circuit, said register unit includes a plurality of registers each having an input connected to the crossbar circuit and an output directly connected to the inputs of the second function unit and the third function unit, and the outputs of a plurality of registers of said register unit and inputs of the operation processing elements of said second function unit and third function unit are in a one-to-one correspondence.

56. An image processing apparatus as set forth in claim 55, wherein the output of at least one operation processing element of said third function unit is connected to also the input of the other operation processing element.

57. An image processing apparatus as set forth in claim 48, wherein:

said rasterizer generates at least window coordinates, texture coordinates, and color data at the time of the graphics processing and supplies said texture coordinates via said register unit to said first function unit, the first function unit performs predetermined graphics processing based on said texture coordinates and supplies the same to said second function unit, said register unit includes a first register having an output connected to the input of said third function unit and a second register having an output connected to the input of the fourth function unit, said color data is set in the first register of said register unit and directly supplied from the first register to said third function unit, and said window coordinates are set in the second register of said register unit and directly supplied from the second register to said fourth function unit.

58. An image processing apparatus as set forth in claim 57, wherein the output of said first function unit and the input of the second function unit are directly connected by an interconnect, and the output data of said first function unit is directly supplied to the second function unit.

59. An image processing apparatus as set forth in claim 57, wherein:

said second function unit includes a plurality of operation processing elements provided corresponding to a plurality of ports of said memory, generates an address for reading texel data required for said predetermined operation processing based on the graphics data from said first function unit, and then finds operation parameters and supplies the same to said plurality of operation processing elements, and said plurality of operation processing elements perform parallel operation processing based on said operation parameters and the processing data read from said memory to generate continuous stream data.

60. An image processing apparatus as set forth in claim 59, wherein a plurality of operation processing elements of said second function unit perform predetermined operation processing with respect to element data read from the ports of said memory, add operation results at one operation processing element among said plurality of operation processing elements, and output the addition result data of the one operation processing element.

61. An image processing apparatus as set forth in claim 57, wherein:

the same supply line is shared for the window coordinates generated at the time of the graphics processing and the destination address generated at the time of the image processing by said rasterizer, and the same supply line is shared for the texture coordinates and the source address.

62. An image processing apparatus having a graphics processing function and an image processing function comprising:

a memory for storing processing data relating to an image;

a rasterizer for generating graphics pixel data including at least coordinate data and color data based on image parameters of a primitive at the time of the graphics processing and generating a source address for reading the processing data relating to the image stored in said memory and a destination address for storing processing results in said memory at the time of the image processing; and at least one core for performing predetermined graphics processing or image processing based on the data generated at said rasterizer, wherein said core includes:

a register unit having a plurality of registers for holding data processed in function units, a first function unit for receiving as input the coordinate data among the graphics pixel data from said rasterizer set in at least one first register of said register unit, performing predetermined graphics processing with respect to the input data and outputting the graphics data, receiving as input the source address for the image processing from said rasterizer set in the second register of said register unit and outputting the same as is, a second function unit for performing predetermined operation processing based on the graphics data generated at said first function unit to generate first operation data at the time of the graphics processing, and performing predetermined image processing with respect to the image data read from said memory or the image data supplied from the outside in accordance with the source address passing straight through said first function unit to generate second operation data at the time of the image processing, a third function unit for performing predetermined operation processing with respect to at least the first operation data from said second function unit set in at least one fourth register of said register unit based on the color data set in the third register of said register unit to generate third operation data at the time of the graphics processing, and performing predetermined operation processing with respect to the second operation data from said second function unit set in the fourth register according to need to generate fourth operation data at the time of the image processing, a fourth function unit for performing processing required for pixel writing based on the window coordinate data among the graphics pixel data from said rasterizer set in the fifth register of said register unit and the third operation data generated by said third function unit set in at least one sixth register of said register unit, writing predetermined results into said memory according to need at the time of the graphics processing, and writing the second operation data generated by said second function unit set in at least one seventh register of said register unit or the fourth operation data generated at said third function unit at the destination address of said memory from said rasterizer set in an eighth register of said register unit at the time of the image processing, and a crossbar circuit switched in accordance with the processing and performing the input of the graphics pixel data from said rasterizer to said first register, the input of the source address from the rasterizer to said second register, the input of the color data from the rasterizer to said third register, the input of the first operation data from said second function unit to said fourth register, the input of the graphics pixel data from said rasterizer to said fifth register, the input of the third operation data generated by said third function unit to said sixth register, the input of the second operation data generated by said second function unit to said seventh register, and the input of the destination address from said rasterizer to said eighth register.

63. An image processing apparatus as set forth in claim 62, wherein:

said third function unit includes operation processing elements each having an output connected to at least the crossbar circuit, and the outputs of a fourth register of said register unit and inputs of the operation processing elements of said third function unit are in a one-to-one correspondence.

64. An image processing apparatus as set forth in claim 63, wherein the output of at least one operation processing element of said third function unit is also connected to the input of other operation processing element.

65. An image processing apparatus as set forth in claim 62, wherein:

said rasterizer generates at least window coordinates, texture coordinates, and color data at the time of the graphics processing and supplies said texture coordinates via said register unit to said first function unit, the first function unit performs predetermined graphics processing based on said texture coordinates and supplies the same to said second function unit, said color data is set in the third register of said register unit and directly supplied from the first register to said third function unit, and said window coordinates are set in the eighth register of said register unit and directly supplied from the eighth register to said fourth function unit.

66. An image processing apparatus as set forth in claim 65, wherein the output of said first function unit and the input of the second function unit are directly connected by an interconnect, and the output data of said first function unit is directly supplied to the second function unit.

67. An image processing apparatus as set forth in claim 65, wherein:

said second function unit includes a plurality of operation processing elements provided corresponding to a plurality of ports of said memory, generates an address for reading texel data required for said predetermined operation processing based on the graphics data from said first function unit, and then finds operation parameters and supplies the same to said plurality of operation processing elements, and said plurality of operation processing elements perform parallel operation processing based on said operation parameters and the processing data read from said memory to generate continuous stream data.

68. An image processing apparatus as set forth in claim 67, wherein a plurality of operation processing elements of said second function unit perform predetermined operation processing with respect to element data read from the ports of said memory, add operation results at one operation processing element among said plurality of operation processing elements, and output the addition result data of the one operation processing element.

69. An image processing apparatus as set forth in claim 65, further comprising a cache for storing at least the processing data read from the ports of said memory and supplying the storage data to the operation processing elements of said second function unit.

70. An image processing apparatus where a plurality of modules share operation processing data for parallel processing, comprising:

a global module and a plurality of local modules each having a graphics processing function and an image processing function, wherein said global module is connected in parallel to said plurality of local modules and, when receiving a request from a local module, outputs processing data to the local module issuing the request in accordance with said request, each of said plurality of local modules comprises:

a memory for storing processing data relating to an image, a rasterizer for generating graphics pixel data including at least coordinate data and color data based on image parameters of a primitive at the time of the graphics processing, and generating at least a source address for reading the processing data relating to the image stored in said memory at the time of the image processing, and at least one core for performing predetermined graphics processing or image processing based on the data generated at said rasterizer, and said core includes:

a register unit having a plurality of registers for setting at least said pixel data and address data generated by said rasterizer, a first function unit for performing predetermined graphics processing with respect to the coordinate data among graphics pixel data from said rasterizer set in the register of said register unit and performing predetermined operation processing based on the generated graphics data and the color data from said rasterizer set in the register of said register unit to generate first operation data at the time of the graphics processing, performing predetermined image processing with respect to image data read from said memory or image data supplied from the outside in accordance with the source address set in the register of said register unit to generate second operation data at the time of the image processing, a second function unit for performing processing required for pixel writing based on the window coordinate data among the graphics pixel data from said rasterizer set in the register of said register unit and the first operation data generated by said first function unit and writing the predetermined result into said memory according to need at the time of the graphics processing, and a crossbar circuit switched in accordance with the processing and connecting said rasterizer, register unit, first function unit, and second function unit to each other.

71. An image processing apparatus where a plurality of modules share processing data for parallel processing, comprising:

a global module and a plurality of local modules each having a graphics processing function and an image processing function, wherein said global module is connected in parallel to said plurality of local modules and, when receiving a request from a local module, outputs processing data to the local module issuing the request in accordance with said request, each of said plurality of local modules comprises:

a memory for storing processing data relating to an image, a rasterizer for generating graphics pixel data including at least coordinate data and color data based on image parameters of a primitive at the time of the graphics processing and generating a source address for reading the processing data relating to the image stored in said memory and a destination address for storing processing results in said memory at the time of the image processing, and at least one core for performing predetermined graphics processing or image processing based on the data generated at said rasterizer, and said core includes:

a register unit having a plurality of registers for setting at least said pixel data and address data generated by said rasterizer, a first function unit for performing predetermined graphics processing with respect to the coordinate data among graphics pixel data from said rasterizer set in the register of said register unit and performing predetermined operation processing based on the generated graphics data and the color data from said rasterizer set in the register of said register unit to generate first operation data at the time of the graphics processing, performing predetermined image processing with respect to the image data read from said memory or the image data supplied from the outside in accordance with the source address set in the register of said register unit to generate second operation data at the time of the image processing, a second function unit for performing processing required for pixel writing based on the window coordinate data among the graphics pixel data from said rasterizer set in the register of said register unit and the first operation data generated by said first function unit and writing the predetermined result into said memory according to need at the time of the graphics processing, and writing the second operation data generated by said first function unit at the destination address from said rasterizer set in the register of said register unit of said memory according to need at the time of the image processing, and a crossbar circuit switched in accordance with the processing and connecting said rasterizer, register unit, first function unit, and second function unit to each other.

72. An image processing apparatus where a plurality of modules share processing data for parallel processing, comprising:

a global module and a plurality of local modules each having a graphics processing function and an image processing function, wherein said global module is connected in parallel to said plurality of local modules and, when receiving a request from a local module, outputs processing data to the local module issuing the request in accordance with said request, each of said plurality of local modules comprises:

a memory for storing processing data relating to an image, a rasterizer for generating graphics pixel data including at least coordinate data and color data based on image parameters of a primitive at the time of the graphics processing and generating at least a source address for reading the processing data relating to the image stored in said memory at the time of the image processing, and at least one core for performing predetermined graphics processing or image processing based on the data generated at said rasterizer, and said core includes:

a register unit having a plurality of registers for setting at least said pixel data and address data generated by said rasterizer, a first function unit for performing predetermined graphics processing with respect to the coordinate data among graphics pixel data from said rasterizer set in the register of said register unit and outputting graphics data, a second function unit for performing predetermined operation processing based on the graphics data generated at said first function unit to generate first operation data at the time of the graphics processing and performing predetermined image processing with respect to image data read from said memory or image data supplied from the outside in accordance with the source address set in the register of said register unit to generate second operation data at the time of the image processing, a third function unit for performing predetermined operation processing with respect to the first operation data from said second function unit based on the color data from said rasterizer set in the register of said register unit to generate third operation data at the time of the graphics processing and performing predetermined operation processing with respect to the second operation data from said second function unit according to need to generate fourth operation data at the time of the image processing, a fourth function unit for performing processing required for pixel writing based on the window coordinate data among the graphics pixel data from said rasterizer set in the register of said register unit and the third operation data generated at said third function unit and writing predetermined results into said memory according to need at the time of the graphics processing, and a crossbar circuit switched in accordance with the processing and connecting said rasterizer, register unit, first function unit, third function unit, and fourth function unit to each other.

73. An image processing apparatus where a plurality of modules share processing data for parallel processing, comprising:

a global module and a plurality of local modules each having a graphics processing function and an image processing function, wherein said global module is connected in parallel to said plurality of local modules and, when receiving a request from a local module, outputs processing data to the local module issuing the request in accordance with said request, each of said plurality of local modules comprises:

a memory for storing processing data relating to an image, a rasterizer for generating graphics pixel data including at least coordinate data and color data based on image parameters of a primitive at the time of the graphics processing and generating a source address for reading the processing data relating to the image stored in said memory and a destination address for storing processing results in said memory at the time of the image processing, and at least one core for performing predetermined graphics processing or image processing based on the data generated at said rasterizer, and said core includes:

a register unit having a plurality of registers for setting at least said pixel data and address data generated by said rasterizer, a first function unit for performing predetermined graphics processing with respect to the coordinate data among graphics pixel data from said rasterizer set in the register of said register unit and outputting graphics data, a second function unit for performing predetermined operation processing based on the graphics data generated at said first function unit to generate first operation data at the time of the graphics processing and performing predetermined image processing with respect to image data read from said memory or image data supplied from the outside in accordance with the source address set in the register of said register unit to generate second operation data at the time of the image processing, a third function unit for performing predetermined operation processing with respect to the first operation data from said second function unit based on the color data from said rasterizer set in the register of said register unit to generate third operation data at the time of the graphics processing and performing predetermined operation processing with respect to the second operation data from said second function unit according to need to generate fourth operation data at the time of the image processing, a fourth function unit for performing processing required for pixel writing based on the window coordinate data among the graphics pixel data from said rasterizer set in the register of said register unit and the third operation data generated at said third function unit and writing predetermined results into said memory according to need at the time of the graphics processing, and writing the second operation data generated at said second function unit or the fourth operation data generated at the third function unit at the destination address from said rasterizer set in the register of said register unit of said memory according to need at the time of the image processing, and a crossbar circuit switched in accordance with the processing and connecting said rasterizer, register unit, first function unit, third function unit, and fourth function unit to each other.

74. An image processing apparatus where a plurality of modules share processing data for parallel processing, comprising:

a global module and a plurality of local modules each having a graphics processing function and an image processing function, wherein said global module is connected in parallel to said plurality of local modules and, when receiving a request from a local module, outputs processing data to the local module issuing the request in accordance with said request, each of said plurality of local modules comprises:

a memory for storing processing data relating to an image, a rasterizer for generating graphics pixel data including at least coordinate data and color data based on image parameters of a primitive at the time of the graphics processing and generating a source address for reading the processing data relating to the image stored in said memory and a destination address for storing processing results in said memory at the time of the image processing, and at least one core for performing predetermined graphics processing or image processing based on the data generated at said rasterizer, and said core includes:

a register unit having a plurality of registers for holding data processed in function units, a first function unit for receiving as input the coordinate data among the graphics pixel data from said rasterizer set in at least one first register of said register unit, performing predetermined graphics processing with respect to the input data and outputting the graphics data, receiving as input the source address for the image processing by said rasterizer set in the second register of said register unit and outputting the same as is, a second function unit for performing predetermined operation processing based on the graphics data generated at said first function unit to generate first operation data at the time of the graphics processing and performing predetermined image processing with respect to the image data read from said memory or the image data supplied from the outside in accordance with the source address passing straight through said first function unit to generate second operation data at the time of the image processing, a third function unit for performing predetermined operation processing with respect to at least the first operation data from said second function unit set in at least one fourth register of said register unit based on the color data set in the third register of said register unit to generate third operation data at the time of the graphics processing and performing predetermined operation processing with respect to the second operation data from said second function unit set in the fourth register according to need to generate fourth operation data at the time of the image processing, a fourth function unit for performing processing required for pixel writing based on the window coordinate data among the graphics pixel data from said rasterizer set in the fifth register of said register unit and the third operation data generated by said third function unit set in at least one sixth register of said register unit, writing predetermined results into said memory according to need at the time of the graphics processing, and writing the second operation data generated by said second function unit set in at least one seventh register of said register unit or the fourth operation data generated at said third function unit at the destination address of said memory by said rasterizer set in an eighth register of said register unit at the time of the image processing, and a crossbar circuit switched in accordance with the processing and performing the input of the graphics pixel data from said rasterizer to said first register, the input of the source address from the rasterizer to said second register, the input of the color data from the rasterizer to said third register, the input of the first operation data from said second function unit to said fourth register, the input of the graphics pixel data from said rasterizer to said fifth register, the input of the third operation data generated by said third function unit to said sixth register, the input of the second operation data generated by said second function unit to said seventh register, and the input of the destination address from said rasterizer to said eighth register.

75. An image processing method for performing graphics processing and image processing by a rasterizer, a register unit including a plurality of registers, a first function unit, a second function unit, and a crossbar circuit switched in accordance with the processing and connecting said rasterizer, register unit, first function unit, and second function unit to each other, comprising the steps of:

at the time of graphics processing, in said rasterizer, generating graphics pixel data including at least window coordinates, texture coordinate data, and color data based on image parameters of a primitive, setting generated texture coordinate data via said crossbar circuit in a predetermined register of said register unit and directly supplying the set data to said first function unit, setting generated color data via said crossbar circuit in a predetermined register of said register unit and directly supplying the set data to said first function unit, and setting generated window coordinates in a specific register of said register unit and directly supplying the set data to said second function unit, in said first function unit, performing predetermined graphics processing with respect to said texture coordinate data, performing predetermined operation processing based on the generated graphics data, performing predetermined operation processing with respect to the operation data from said second function unit based on the color data from said rasterizer set in the register of said register unit, setting the operation data of said first function unit in a predetermined register of said register unit via the crossbar circuit and directly supplying the set data to said second function unit, in said second function unit, performing processing required for the pixel writing based on said window coordinate data and the operation data generated at said first function unit, writing predetermined results into said memory according to need and, at the time of the image processing, in said rasterizer, generating the source address for reading the processing data relating to the image stored in the memory and performing predetermined image processing with respect to the image data read from said memory or the image data supplied from the outside in accordance with the source address and setting the processing data from said first function unit in a predetermined register of said register unit via the crossbar circuit.

76. An image processing method for performing graphics processing and image processing by a rasterizer, a register unit including a plurality of registers, a first function unit, a second function unit, and a crossbar circuit switched in accordance with the processing and connecting said rasterizer, register unit, first function unit, and second function unit to each other, comprising the steps of, at the time of graphics processing, in said rasterizer, generating graphics pixel data including at least window coordinates, texture coordinate data, and color data based on image parameters of a primitive, setting generated texture coordinate data via said crossbar circuit in a predetermined register of said register unit and directly supplying the set data to said first function unit, setting generated color data via said crossbar circuit in a predetermined register of said register unit and directly supplying the set data to said first function unit, and setting generated window coordinates in a specific register of said register unit and directly supplying the set data to said second function unit, in said first function unit, performing predetermined graphics processing with respect to said texture coordinate data, performing predetermined operation processing based on the generated graphics data, performing predetermined operation processing with respect to the operation data from said second function unit based on the color data from said rasterizer set in the register of said register unit, and setting the operation data of said first function unit in a predetermined register of said register unit via the crossbar circuit and directly supplying the set data to said second function unit, in said second function unit, performing processing required for the pixel writing based on said window coordinate data and the operation data generated at said first function unit and writing predetermined results into sad memory according to need and, at the time of the image processing, in said rasterizer, generating the source address for reading the processing data relating to the image stored in the memory and the destination address for storing the processing results in said memory, setting a generated source address via said crossbar circuit in a predetermined register of said register unit and directly supplying the set data to said first function unit, setting a generated destination address in the specific register of said register unit and directly supplying the set data to said second function unit, and setting a generated source address via said crossbar circuit in the specific register of said register unit and directly supplying the set data to said first function unit, in said first function unit, performing predetermined image processing with respect to the image data read from said memory or the image data supplied from the outside in accordance with the source address, and setting the processing data from said first function unit in a predetermined register of said register unit via the crossbar circuit and directly supplying the set data to said second function unit, and in said second function unit, writing the processing data generated at said function unit at the destination address of said memory according to need.

77. An image processing method for performing graphics processing and image processing by a rasterizer, a register unit including a plurality of registers, a first function unit, a second function unit, a third function unit, a fourth function unit, and a crossbar circuit switched in accordance with the processing and connecting said rasterizer, register unit, first function unit, second function unit, third function unit, and fourth function unit to each other, comprising the steps of:

at the time of graphics processing, in said rasterizer, generating graphics pixel data including at least window coordinates, texture coordinate data, and color data based on image parameters of a primitive, setting generated texture coordinate data via said crossbar circuit in a predetermined register of said register unit and directly supplying the set data to said first function unit, setting generated color data via said crossbar circuit in a predetermined register of said register unit and directly supplying the set data to said third function unit, and setting generated window coordinates in a specific register of said register unit and directly supplying the set data to said fourth function unit, in said first function unit, performing predetermined graphics processing with respect to said texture coordinate data and directly supplying the graphics data to said second function unit, in said second function unit, performing predetermined operation processing based on the graphics data generated at said first function unit and setting the operation data of said second function unit via the crossbar circuit in a predetermined register of said register unit and directly supplying the set data to said third function unit, in said third function unit, performing predetermined operation processing with respect to the operation data from said second function unit based on the color data from said rasterizer set in the register of said register unit and setting the operation data of said third function unit via the crossbar circuit in a predetermined register of said register unit and directly supplying the set data to said fourth function unit, in said fourth function unit, performing processing required for pixel writing based on said window coordinate data and the operation data generated at said third function unit and writing predetermined results into said memory according to need and, at the time of the image processing, in said rasterizer, generating a source address for reading the processing data relating to the image stored in the memory, setting generated source address in a predetermined register of said register unit via said crossbar circuit, directly supplying the set data to said first function unit, and passing the same straight through the first function unit and supplying the same to said second function unit, and in said second function unit and/or said third function unit, performing predetermined image processing by reading the image data in accordance with the source address from said memory and setting the processing data from said second function unit or third function unit via the crossbar circuit in a predetermined register of said register unit.

78. An image processing method for performing graphics processing and image processing by a rasterizer, a register unit including a plurality of registers, a first function unit, a second function unit, a third function unit, a fourth function unit, and a crossbar circuit switched in accordance with the processing and connecting said rasterizer, register unit, first function unit, second function unit, third function unit, and fourth function unit to each other, comprising the steps of:

at the time of graphics processing, in said rasterizer, generating graphics pixel data including at least window coordinates, texture coordinate data, and color data based on image parameters of a primitive, setting generated texture coordinate data via said crossbar circuit in a predetermined register of said register unit and directly supplying the set data to said first function unit, setting generated color data via said crossbar circuit in a predetermined register of said register unit and directly supplying the set data to said third function unit, and setting generated window coordinates in a specific register of said register unit and directly supplying the set data to said fourth function unit, in said first function unit, performing predetermined graphics processing with respect to said texture coordinate data and directly supplying the graphics data to said second function unit, in said second function unit, performing predetermined operation processing based on the graphics data generated at said first function unit and setting the operation data of said second function unit via the crossbar circuit in a predetermined register of said register unit and directly supplying the set data to said third function unit, in said third function unit, performing predetermined operation processing with respect to the operation data from said second function unit based on the color data from said rasterizer set in the register of said register unit and setting the operation data of said third function unit via the crossbar circuit in a predetermined register of said register unit and directly supplying the set data to said fourth function unit, and in said fourth function unit, performing processing required for pixel writing based on said window coordinate data and the operation data generated at said third function unit and writing predetermined results into said memory according to need and, at the time of the image processing, in said rasterizer, generating a source address for reading the processing data relating to the image stored in the memory and a destination address for storing the processing results in said memory, setting a generated source address in a predetermined register of said register unit via said crossbar circuit, directly supplying the set data to said first function unit, passing the same straight through the first function unit and supplying the same to said second function unit, and setting a generated destination address in a specific register of said register unit and directly supplying the set data to said fourth function unit, in said second function unit and/or said third function unit, performing predetermined image processing by reading the image data in accordance with the source address from said memory and setting the processing data from said second function unit or third function unit via the crossbar circuit in a predetermined register of said register unit and directly supplying the set data to said fourth function unit, and in said fourth function unit, writing the processing data generated at the second function unit at the destination address of said memory.

79. An image processing method as set forth in claim 78, wherein:

the same supply line is shared for the window coordinates generated at the time of the graphics processing and the destination address generated at the time of the image processing by said rasterizer, and the same supply line is shared for the texture coordinates and the source address.

* * * * *